US007698716B2

(12) United States Patent
LeBlanc, III et al.

(10) Patent No.: US 7,698,716 B2
(45) Date of Patent: Apr. 13, 2010

(54) OPTICAL MEDIA, READ INHIBITING AGENTS AND METHODS OF MAKING AND USING SAME

(75) Inventors: Arthur R. LeBlanc, III, Kennebunk, ME (US); Robert F. Thompson, Kennebunk, ME (US); Louis Cincotta, Andover, ME (US); Edward Lindholm, Brookline, ME (US); Joseph W. Paulus, Portland, ME (US)

(73) Assignee: Flexplay Technologies, Inc., Atlanta, GA (US)

( * ) Notice: Subject to any disclaimer, the term of this patent is extended or adjusted under 35 U.S.C. 154(b) by 1093 days.

(21) Appl. No.: 11/274,550

(22) Filed: Nov. 14, 2005

(65) Prior Publication Data

US 2006/0136948 A1     Jun. 22, 2006

Related U.S. Application Data

(60) Provisional application No. 60/627,787, filed on Nov. 12, 2004, provisional application No. 60/627,638, filed on Nov. 12, 2004, provisional application No. 60/627,209, filed on Nov. 12, 2004, provisional application No. 60/627,386, filed on Nov. 12, 2004, provisional application No. 60/711,616, filed on Aug. 26, 2005.

(51) Int. Cl.
G11B 17/04    (2006.01)
(52) U.S. Cl. ........................................................ 720/619
(58) Field of Classification Search ............. 369/275.4, 369/275.3, 284, 282, 272.1, 288, 280, 286; 720/718, 719, 618, 619
See application file for complete search history.

(56) References Cited

U.S. PATENT DOCUMENTS

| | | | | |
|---|---|---|---|---|
| 2002/0064123 | A1* | 5/2002 | Takamatsu et al. | 369/192 |
| 2006/0105134 | A1* | 5/2006 | LeBlanc et al. | 428/64.4 |
| 2006/0136947 | A1* | 6/2006 | LeBlanc et al. | 720/619 |
| 2006/0136958 | A1* | 6/2006 | LeBlanc et al. | 720/719 |

* cited by examiner

Primary Examiner—Allen T Cao
(74) Attorney, Agent, or Firm—Seyfarth Shaw LLP

(57) ABSTRACT

Apparatuses, products, devices and methods of manufacture consistent with the invention include optically readable media with at least one mechanism, chemical, agent, and/or process for limiting the time period that at least a portion of encoded information can be read and/or accessed by an optical beam and/or reader capable of reading the encoded information.

21 Claims, 22 Drawing Sheets

OPTICAL MEDIA, READ INHIBITING AGENTS AND METHODS OF MAKING AND USING SAME

CROSS REFERENCE TO RELATED APPLICATIONS

Priority is hereby claimed under 35 U.S.C. 119(e) from U.S. Provisional Patent Application No. 60/627,787 filed Nov. 12, 2004; U.S. Provisional Patent Application No. 60/627,638 filed Nov. 12, 2004; U.S. Provisional Patent Application No. 60/627,209 filed Nov. 12, 2004; U.S. Provisional Patent Application No. 60/627,386 filed Nov. 12, 2004; and U.S. Provisional Patent Application No. 60/711,616 filed Aug. 26, 2005. The disclosures of all of the above prior patent applications are hereby incorporated by reference as if set forth herein in their entirety.

FIELD OF THE INVENTION

The present invention relates generally to optically readable media. More specifically, apparatuses, products, devices and methods of manufacture consistent with the invention are disclosed that include numerous configurations and/or novel designs for limiting the time period that at least a portion of the encoded information stored on the optically readable media can be read and/or accessed by an optical beam and/or reader capable of reading information encoded thereon.

BACKGROUND

Optical, magnetic and magneto-optic media are primary sources of high performance storage technology, which enable high storage capacity coupled with a reasonable price per megabyte of data stored. The use of optical media has become widespread in audio, video, and computer data storage applications in such formats as compact disc (CD), digital versatile disc (DVD, including multi-layer structures like DVD-5, DVD-9 and multi-sided formats such as DVD-10, and DVD-18), magneto-optical disc (MO), and other write-once and re-writable formats such as CD-R, CD-RW, DVD-R, DVD-RW, DVD+RW, DVD-RAM, and the like, hereinafter collectively "data storage media". In these formats, data are encoded onto a substrate into a digital data series. In pre-recorded optical media, such as CD, the data are typically pits and grooves embossed on the surface of a plastic substrate using a method such as injection molding, stamping or the like.

In recordable media, the data are encoded by laser, which illuminates an active data layer that undergoes a phase change, thus producing a series of highly reflecting or non-reflecting regions making up the data stream. In these formats, a laser beam first travels through a plastic substrate before reaching the data layer. At the data layer, the beam is either reflected or not, in accordance with the encoded data. The laser light then travels back through the plastic and into an optical detector system where the data are interpreted.

In some applications, it is desirable to have a limited life for an optical disc. For example, sample computer programs are provided to potential customers in order to entice them to purchase the software. The programs are intended to be used for a limited period of time. Additionally, music, movies, and other forms of digital entertainment are currently rented for a limited time period. In each of these applications and others, when that time has expired, the disc must be returned. A need exists for machine-readable optical discs that do not need to be returned at the end of a rental period. Limited-play discs provide a solution to this problem.

Several approaches have been proposed to make a limited play optical disc based on a layer that changes from a non-interfering state (transparent) where it does not interfere with the reliable reading of the information on the optical disc, via an interrogating beam of light, to an interfering state (opaque) where the layer interferes with the optical reading of the data on the disc. The interference with the reading light source may be due to the layer becoming dark, reflective, highly birefringent, pitting, corroding, bending, changing refractive properties or any combination of these. (See for example, U.S. Pat. No. 6,011,772 and U.S. Pat. No. 5,815,484 and herein incorporated by reference in their entirety). It should be pointed out that it is not essential in all applications that the interfering layer cover an entire surface of the disc. It may be desirable to inhibit only the reading of areas containing critical information content.

SUMMARY OF INVENTION

In one embodiment of the invention, the stimulus triggering the reaction is exposure to atmospheric oxygen. Upon exposure to oxygen, a reactive material, which is essentially colorless, is oxidized to form an opaque or semi-opaque layer. Data storage media with the opaque/semi-opaque layer can no longer be played in media players. By adjusting the time it takes to turn opaque, this method can be used to provide limited-play data storage media having the desired life for the given application.

In one embodiment consistent with the invention a limited life CD, CD-ROM, and/or CD-R optical disc utilizing a corrosive agent and/or agent for degrading the integrity of a reflective layer and/or portion there of located in a layer and/or region adjacent to the reflective layer of the disc is described.

In another embodiment a limited life CD, CD-ROM, and/or CD-R utilizing a dye in the optical path of the 780 nm laser is described. The optical disc employs two substrates bonded together with a dye adhesive while the data layer resides on top of the substrate stack at approximately 1.2 mm above the bottom surface of the layered disc.

In yet another embodiment a limited play DVD combined with a CD data layer or recordable layer is described. In yet still a further embodiment a corrosive agent and/or agent for degrading the integrity of a reflective layer and/or portion thereof located adjacent to one or more reflective layers of the DVD and/or CD data layer is described.

In a further embodiment a dye material is incorporated in the optical path of the reading laser.

In another embodiment a permanent play and/or recordable layer survives after the limited play mechanism and/or process is activated and the limited play layer(s) has ceased to play.

In an embodiment consistent with the invention a limited play DVD including recordable and dual layer disc halves using a corrosive material and/or an agent for degrading the integrity of at least one reflective layer and/or portion thereof in a layer adjacent to any reflective layer within the optical disc is disclosed. In an overlapping embodiment a permanent play and/or recordable DVD layer survives after the limited play mechanism is activated and the limited play layer(s) has ceased to play.

In another embodiment a limited play DVD including recordable and dual layer disc halves using a dye material to inhibit the ability of the reading laser to read a data layer within the optical disc is disclosed. In an overlapping embodiment a permanent play and/or recordable DVD layer survives after the limited play mechanism is activated and the limited play layer(s) has ceased to play.

In a further embodiment consistent with the invention an optical disc combining HD-DVD, HD-DVD-R/RW and/or DVD/DVD-/+R/RW data layers within one disc where any one or more of the data and/or recordable layers is limited play is disclosed. In an overlapping embodiment, the limited play mechanism is a corrosive agent that is adjacent to one or more reflective layer. In a further overlapping embodiment a permanent play and/or recordable DVD layer survives after the limited play mechanism is activated and the limited play layer(s) has ceased to play. In yet another overlapping embodiment the read limiting agent is a dye that inhibits the reading of at least one data layer. In an overlapping embodiment with the dye, a permanent play and/or recordable layer survives after the limited play mechanism is activated and the limited play layer(s) has ceased to play.

In another embodiment an optical medium combining HD-DVD, HD-DVD-/+R/RW and CD, CD-ROM, CD-R, and/or CD-RW data layers within one disc where any one or more of the data and/or recordable layers is limited play is disclosed. The limited play mechanism is selected from a corrosive material, dye material and/or combinations thereof. If the limited play mechanism is a corrosive material it is located adjacent to at least one reflective layer. In an overlapping embodiment a permanent play and/or recordable layer survives after the limited play mechanism is activated and the limited play layer(s) has ceased to play.

In an embodiment consistent with the invention an optical medium combining Blu-ray and DVD data and/or recordable layers within one disc where any one or more of the data and/or recordable layers is limited play is disclosed. The limited play mechanism is selected from a corrosive material, dye material and/or combinations thereof. If the limited play mechanism is a corrosive material it is located adjacent to at least one reflective layer. In an overlapping embodiment a permanent play and/or recordable layer survives after the limited play mechanism is activated and the limited play layer(s) has ceased to play.

In another embodiment an optical medium combining Blu-ray and HD-DVD data and/or recordable layers within one disc where any one or more of the data and/or recordable layers is limited play is disclosed. The limited play mechanism is selected from a corrosive material, dye material and/or combinations thereof. If the limited play mechanism is a corrosive material it is located adjacent to at least one reflective layer. In an overlapping embodiment a permanent play and/or recordable layer survives after the limited play mechanism is activated and the limited play layer(s) has ceased to play.

In another embodiment consistent with the invention limited play Blu-Ray optical media are disclosed.

In a further embodiment consistent with the invention limited play HD-DVD optical media are disclosed.

In yet a further embodiment consistent with the invention authoring techniques are employed in conjunction with read inhibiting agent(s).

In another embodiment consistent with the invention the read inhibiting agent is localized to sub-regions of an optical medium.

In a further embodiment consistent with the invention methods and processes of making limited play optical media are disclosed.

These and other features and advantages of the present invention will be presented in more detail in the following detailed description and the accompanying figures which illustrate by way of example the principles of the invention.

DETAILED DESCRIPTION OF PREFERRED EMBODIMENTS

Figure 1:
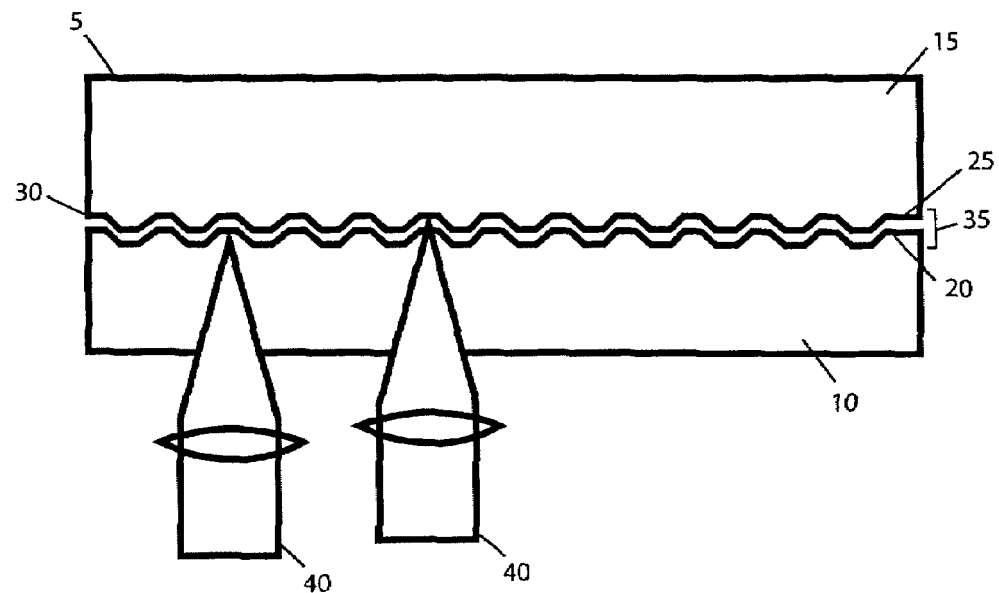
FIG. 1 illustrates a cross section of an optical medium of a limited life HD-DVD embodiment consistent with the present invention

Reference will now be made in detail to embodiments of the present invention as illustrated in the accompanying drawings. The same reference numbers may be used throughout the drawings and the following description to refer to the same or like parts. The following description is presented to enable any person skilled in the art to make and use the inventive body of work. Descriptions of specific embodiments and applications are provided only as examples, and various modifications will be readily apparent to those skilled in the art. For example, although many of the examples are described in the context of certain data type combinations any single data type may be made limited play, it should be understood that embodiments of the present invention could be used in any data type combinations even those combinations not expressly stated, or the like. Similarly, although for the sake of illustration many of the examples describe a read limiting agent and/or mechanism in the bonding layer, those of ordinary skill in the art will appreciate that the apparatus, devices and products of the present invention can be applied to any suitable read limiting agent and/or read inhibiting agent and/or reactive agent anywhere in and/or on the optical medium. The general principles described herein may be applied to other embodiments and applications without departing from the spirit and scope of the invention. Thus, the present invention is to be accorded the widest scope, encompassing numerous alternatives, modifications, combinations and equivalents consistent with the principles and features disclosed herein. For purpose of clarity, details relating to technical material that is known in the fields related to the invention have not been described in detail so as not to unnecessarily obscure the present invention.

The disclosure frequently makes reference to "substrates," "dye material," and "corrosive material." For purposes of clarity, substrate is meant to include any structural member of an optical medium used for support and/or to receive a subsequent layer such as for example, a data layer, reflective layer, bonding layer, buffer layer, lacquer layer, and additional substrate layer(s). Dye material refers to any material that prevents the reading beam from reading at least a portion of any data region after a predetermined time. Corrosive material refers to any material that degrades the integrity of at least a portion of any reflective layer and thus prevents the reading beam from reading a portion of any data region after a predetermined time. The disclosure uses reactive agent, read inhibiting agent and read limiting agent interchangeably to refer to any (either passive or active) mechanism, process, chemical, agent that limits access to encoded information stored and/or otherwise contained on optical media after a predetermined time and/or after a specified event. Further, permanent play is used interchangeably to refer to any optical media that is long playing such that the encoded information remains accessible after the read inhibiting agent has prevented access to selected encoded information.

The following U.S. patents and patent applications are hereby incorporated by reference in their entirety. U.S. Pat. Nos. 6,641,886; 6,838,144; 6,511,728; 6,537,635; 6,839,316; 6,678,239; 6,011,772; 6,343,063; 6,434,109; 6,756,103; 6,917,579; and U.S. patent application Ser. Nos. 10/162,417; 10/016,263; 10/163,473; 10/163,855; 10/163,472; 10/651,627; 60/627,209; and 60/627,386.

HD-DVD

The HD-DVD optical media format, proposed and developed by Toshiba and NEC and as described by the DVD Forum, consists of two substrates bonded together as in current DVD manufacturing. At least one of the two substrates supports encoded information. At least one of the two substrates is optically transparent to a reading laser. The HD-DVD format is similar to current DVD-9 design, as described by the DVD Forum (www.dvdforum.com) and ECMA standard (http://www.ecma-international.org/publications/standards/Ecma-267.htm), in that up to two layers are read by a reading laser from one side of the disc. The two data layers of the HD-DVD disc are similar to DVD-9 construction but have narrower track pitches with smaller pit structures. The reading laser of a HD-DVD reading device has a wavelength of approximately 405 nm.

The present invention discloses a number of reactive agents that can be used, either alone or in combination, with a HD-DVD disc such that at least a portion of the encoded information on the HD-DVD disc becomes irreversibly unreadable by the reading laser after a predetermined time. The reactive agents contemplated by the present invention can reside inside and/or on the surface of a HD-DVD disc and/or in the optical path and/or outside the optical path of the reading laser. FIG. 1 illustrates an HD-DVD limited play embodiment 5 consistent with the invention. FIG. 1 shows two substrates 10 and 15, wherein substrate 10 is commonly referred to as the L0 side and as referenced through which side the optical beam reads the encoded information. Substrate 15 is commonly referred to as the L1 side. Reflective layers 20 and 25 are separated by at least one intervening layer 30. In the embodiment shown, a read inhibiting agent resides in 30, wherein the reading inhibit agent can be one of a masking compound, such as for example a reactive day and/or a destructive agent, such as a material that corrodes the reflectivity of at least one reflective layer. The encoded information is readable by an optical beam(s) 40.

The HD-DVD format uses a similar disc construct to standard DVDs. It is therefore largely compatible with existing manufacturing processes. Manufacturing begins with the injection molding of two 0.6 mm thick disc substrates. Data can be molded into one or both substrates depending on whether a single or dual layer disc is being manufactured. The substrates with a data layer are then metallized with either a semi-reflective and/or reflective film and then the two substrates are bonded together. In a dual layer product, the bonding resin is in the optical path of the laser. For a single layer product, the bonding resin is not normally in the optical path. As described in U.S. patent application Ser. Nos. 10/163,473, 10/163,855, 10/163,472, 10/837,826, 10/163,821, 10/651,627 and U.S. Pat. No. 6,756,103, all hereafter incorporated by reference in their entirety, the single data layer can be inverted physically and moved to the L1 substrate creating a single layer disc construct that moves the data layer so that the laser must pass through the bonding resin, therefore putting the bonding layer in the optical path for a single layer HD-DVD. In this sense, the HD-DVD product is similar to DVD Formats disclosed in U.S. patent application Ser. Nos. 10/163,473, 10/163,855, 10/163,472, 10/837,826, 10/163,821, 10/651, 627 and U.S. Pat. No. 6,756,103, all hereafter incorporated by reference in their entirety) and DVD-9 product. The differences lie in the reading laser wavelength as described above. This enables higher data density through a tighter track pitch and smaller pit sizes, raising storage capacity from 4.7 Gbytes as available on a standard DVD-5 to 15 Gbytes on a single layer HD-DVD.

Blu-Ray

The Blu-ray optical format, proposed and developed by a number of companies and lead by Sony, includes of a single substrate. The substrate of a Blu-ray disc does not need to be optically transparent to the reading laser because the data is read through a cover layer approximately 0.1 mm thick. This cover layer is in the optical path of the reading laser and is either bonded to the substrate and/or spin coated in one or more layers on the substrate. The reactive agents and/or read inhibiting agents and/or read limiting agents contemplated by the present can be used, either alone or in combination, with a Blu-ray disc such that at least a portion of the encoded information on the Blu-ray disc becomes irreversibly unreadable by the reading laser after a predetermined time. The reactive agents contemplated by the present invention can reside inside and/or on the surface of a Blu-ray disc and/or in the optical path and/or outside the optical path of the reading laser.

Figure 2:
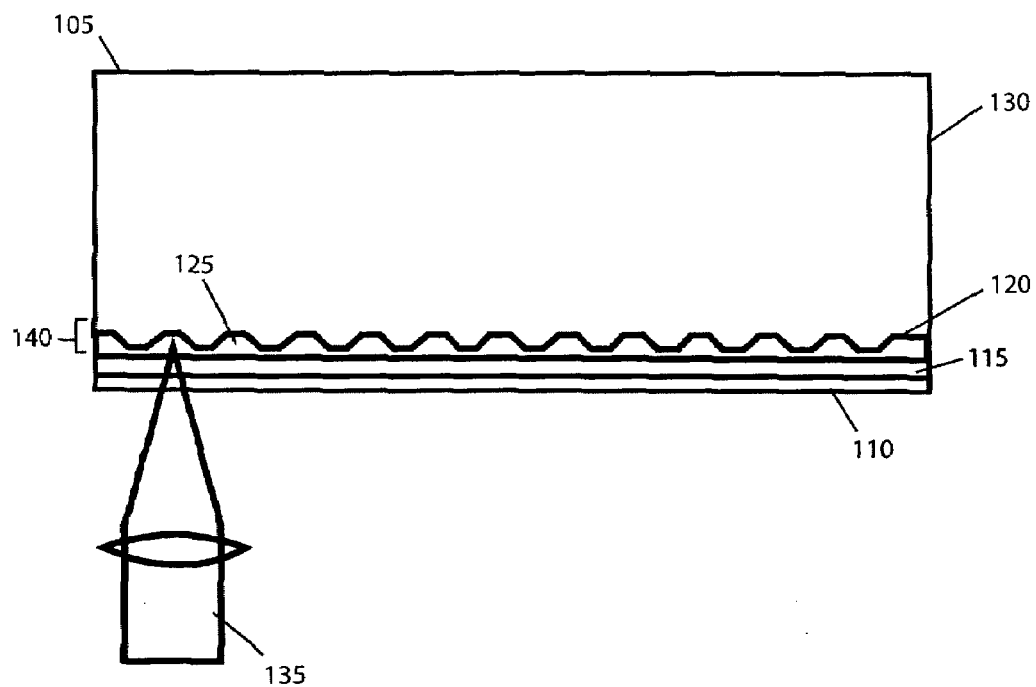
FIG. 2 illustrates a cross section of an optical medium of a limited life Blu-ray disc embodiment consistent with the present invention.

In one embodiment consistent with the invention, a reactive dye is integrated into any of the cover layers that form the optical path of the Blu-ray disc and blocks the read laser from reading the encoded information after the reactive dye is exposed to a stimulus. FIG. 2 illustrates a limited play Blu-ray embodiment 105 consistent with the invention. FIG. 2 shows a substrate 130 supporting encoded information 140 with a reflective layer 120 a bonding layer 125 with a cover layer 115 and a hard coat 110. The read inhibiting agent can reside in at least one of the bonding layer 125, the cover layer 115, and a hard coat 110. The encoded information 140 is readable by an optical beam 135. In the embodiment shown the reading inhibit agent can be one of a masking compound, such as for example a reactive day and/or a destructive agent, such as a material that corrodes the reflectivity of at least one reflective layer.

Figure 3:
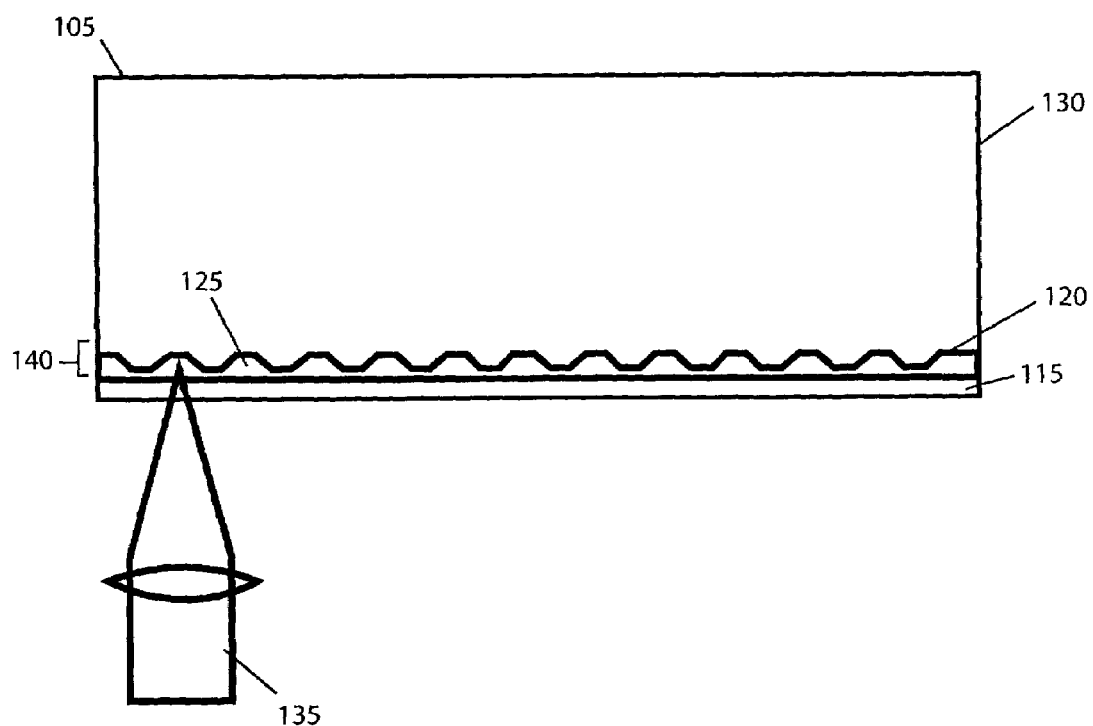
FIG. 3 illustrates a cross section of an optical medium of a limited life Blu-ray disc embodiment consistent with the invention.

FIG. 3 illustrates a limited play Blu-ray embodiment 105 consistent with the invention without a hard coat 110. In the embodiment shown the reading inhibit agent can be one of a masking compound, such as for example a reactive day and/or a destructive agent, such as a material that corrodes the reflectivity of at least one reflective layer and resides in one of the bonding layer 125 and cover layer 115.

Blu-ray discs use a different manufacturing approach than that used for standard DVDs and HD-DVDs. In Blu-ray discs, the disc substrate is removed from the optical path, which eliminates issues related to stress induced birefringence of the molded substrate. A second reason the disc substrate is removed from the optical path of the reading laser is that is reduces the disc tilt at the read surface. Disc tilt occurs when the surface of the disc is not perpendicular to the read laser. A system with a higher numerical aperture (NA) lens is more sensitive to disc tilt. In Blu-ray, the numerical aperture is increased from 0.6 mm in standard DVD NA, to 0.85 mm. The recording layer and/or data storage layer of a Blu-ray disc is placed on the surface of a 1.1 mm substrate, protected by a 0.1 mm cover layer. The cover layer is in the optical path and is much thinner than the standard DVD L0 layer and HD-DVD 0.6 mm substrate. The 0.85 NA enables the use of the high numerical aperture lens at the 405 nm wavelength as the read optics can be closer to the data layer. Substrate birefringence is eliminated, and surface tilt issues reduced. However, new problems are introduced that require the cover layer to be manufactured according to very stringent specifications, and surface defects such as scratches or fingerprints are a much more significant issue than in standard DVD and HD-DVD formats. Hard coatings with the ability to be wiped or cleaned without scratching are being developed by the Blu-ray group, which is lead by Sony. These hard coatings are also in the optical path and are typically spin coated onto the surface of the cover layer.

According to one embodiment consistent with the invention, a limited play Blu-ray disc is disclosed. The limited play Blu-ray disc incorporates dye absorption technology, i.e., a reactive material and/or read inhibiting agent and/or read limiting agent, in the optical path. The reactive material responds to a stimulus thereby converting from a substantially transparent state at the 405 nm wavelength to a substantially opaque state that inhibits the reading of at least a portion of the data layer by the read laser. Dyes selected from those disclosed herein can be integrated into the 0.1 mm cover layer and/or surface coating of the Blu-ray disc. This puts the reactive material in the optical path of the reading laser. This methodology applies to both single and dual layer Blu-ray discs.

A reactive dye can be incorporated into any or all layers within the optical path including the bonding layer, 100 micron cover material and/or hard coat layer. A corrosive agent can be contiguous with the reflective layer and may incorporate the bonding and cover layer, which could also serve as a hard surface coat.

CD

In one embodiment consistent with the invention a compact disc (hereafter "CD") includes a mechanism, chemical, agent and/or process for limiting the period of time encoded information stored on the CD can be read and/or accessed. The mechanism, chemical, agent and/or process for limiting the access time can be applied to CDs that have the encoded information encoded during the manufacturing process (i.e., CD-Read Only Memory, hereafter "CD-ROM") and/or encoded information encoded by recording directly onto the CD (i.e., CD-Recordable and/or CD-Rewritable and the like). Further, the mechanism, chemical, agent and/or process for limiting the access time is independent of the type and/or kind of data and/or information encoded on the CD (i.e., audio, video, data, software, images, text, games, combinations thereof, etc.). CD standards, put forth by industry groups such as ECMA International, describe the technical and manufacturing aspects of the various CD formats, i.e., CD-Audio, CD-ROM CD-Recordable, CD-Rewritable, CD-Interactive, CD-Video.

The various available CD formats generally adhere to a disc structure based on a 1.2 mm thick molded substrate with a data layer on the top surface coated with a reflective layer. The data layer is read from the bottom side of the substrate by a 720 nm laser.

In one embodiment consistent with the invention a limited play optical CD can be constructed using a corrosive material layer adjacent to the reflective layer. The corrosive agent responds to a stimulus and/or triggering event, such as for example, exposure to oxygen, which causes the corrosive agent to react with the reflective layer such that the associated data layer, or a portion thereof, is no longer readable by the read laser of the reading device.

In another embodiment consistent with the invention a 1.2 mm thick optically transparent substrate is constructed with multiple layers, at least two, of molded substrates. Two 0.6 mm thick substrates are bonded together using a reactive dye material to form a 1.2 mm thick substrate. However, it should be noted that two halves and/or substrates of equal thickness are not required, for example, one substrate could be 0.4 mm thick and the other 0.8 mm thick and variations thereof. Moreover, the total overall thickness of 1.2 mm is used here, as an exemplary embodiment and to comply with the specifications set forth by ECMA, ISO, and the DVD Forum so that discs will play in a large percentage of the players currently in the homes of consumers. However, as the standards bodies change the specifications so too the embodiments consistent with the invention and disclosed herein can be changed and still meet the metes and bounds of the present invention. This statement also applies for CD, DVD, High Definition, Blu-ray, and other next generation optical media. The disclosed specific dimensions herein are made to provide examples of limited play optical media consistent with the invention and to maximize playability in the current install base of current CD and DVD readers and recorders.

Figure 4:
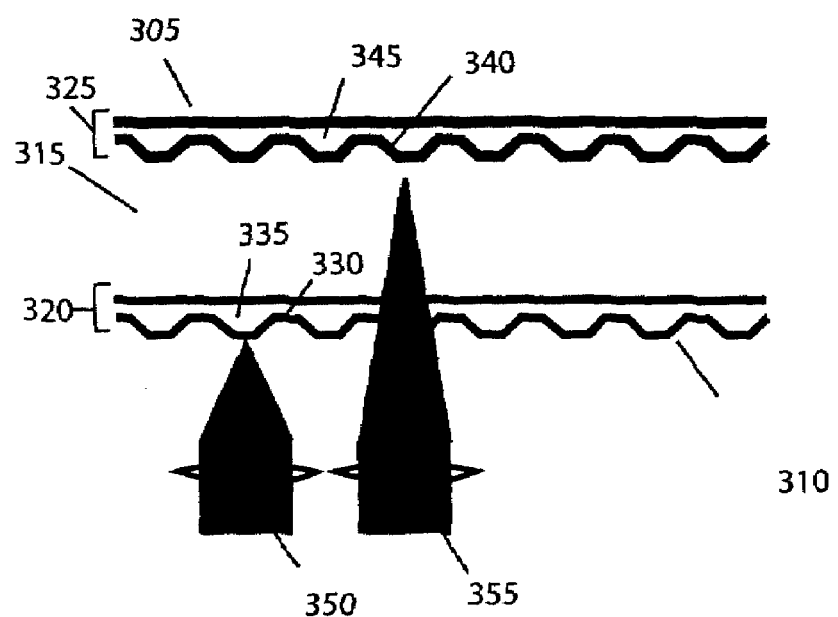
FIG. 4 illustrates a cross section of a combined CD and DVD embodiment consistent with the invention.

FIG. 4 illustrates an embodiment consistent with the invention showing a CD and DVD optical medium 205. The bottom substrate 210, or L0 substrate as it is referred to in a DVD construct, would be a blank disc with no data structures molded on either surface of the L0 substrate. The second substrate 225, or L1 substrate, is molded with a CD data layer or recordable structures 220 on the top surface. The surface is then coated with a reflective layer or recordable layers 230 to complete the disc according to its format specifications and as specified by disc standards bodies such as, for example, ECMA and ISO. The reflective layer or recordable layers 230 are covered by a protective layer 240. The bottom of the L1 substrate 225 is molded with a DVD data layer or recordable structures 215. The DVD data layer 215 and the CD data layer 220 are readable by optical beams 245 and 250, respectively. The reactive dye in the bonding layer 235, when exposed to a stimulus and/or triggering event, such as for example exposure to oxygen, will disable the ability of the laser to read and/or record data from the disc.

The above embodiments do not require that the limited play mechanism, for example, corrosive agent and/or reactive dye, be an entire layer or be throughout a single layer and either can be present in limited regions of the media. For example, the limited play mechanism can be localized to a region and/or regions that prevent the entire encoded information stored on the media from being read by the reading beam. Alternatively, the regions with the localized mechanism will be the regions associated with the limited play mechanism.

CD Hybrids

In yet another embodiment consistent with the invention an optical media that includes at least two different types of data structures and/or data formats and at least one mechanism, chemical, agent and/or process for limiting access to the data region of either type of data structure and/or data format, all the types of data structures and/or data formats contained on the optical media, and/or portions thereof is described. This embodiment includes, for example, combinations of at least two data structures and/or data formats selected from Read Only Memory (ROM), Write Once, Read Many (WORM), Interactive (I), Erasable (E), CD-ROM, CD-WORM, CD-I, DVI, CD-EMO, OD3, ODD, Video Disk, IVD, Blu-ray, HD-DVD, DVD, DVD-R, DVD-Video, DVD-RAM, DVD-Audio, DVD-RAM, DVD-RW, DVD+RW, DVD+R, DVD-Video, SACD, variants of the above, and/or any data structure and/or data format that is readable by an optical beam and/or optical reading device, including holographic, holographic versatile discs and 3-D optical storage devices. In this embodiment, the at least two data structures and/or data formats may be accessed by the reading beam(s) through the same substrate layer and/or substrate side, i.e., without physically flipping the disc over; each through a unique substrate layer and/or substrate side, i.e., physically flipping the disc over to access the data of the other type; or a combination thereof. In an overlapping embodiment consistent with the invention at least one data structure and/or data format may be accessed by the reading beam(s) through the same substrate layer and/or substrate side, i.e., without physically flipping the disc over; each through a unique substrate layer and/or substrate side, i.e., physically flipping the disc over to access the data of the other type; or a combination thereof.

Recordable Format

In still another embodiment consistent with the invention an optical media includes a mechanism for recording information and storing it on the optical media and a mechanism, chemical, agent and/or process for limiting the period of time the recorded information is accessible. The data format recorded is not limited to CD, DVD, High Definition, Blu-ray, 3-D, and/or holographic data formats and includes any recordable data format.

CD/DVD Hybrid

The present invention includes a number of optical media embodiments that employ at least one reactive agent and/or material to limit access to encoded information stored thereon. The disclosed embodiments of the present invention can be configured to limit either partial or full access to the encoded information, i.e., only a portion of the encoded information will remain permanently accessible or the entire encoded information will become inaccessible after a predetermined period. The disclosed embodiments include read only and/or recordable configuration. The disc embodiments can employ a reactive agent that masks the encoded information, i.e., dye compounds that absorb the wavelength of the reading beam, and/or read inhibiting agent(s) that erodes, corrodes, destroys the integrity of the reflective layer, and/or destroys the integrity of a substrate material after a predetermined time. The reactive agent and/or material can be in the optical path of the reading beam and/or outside the path of the optical reading beam. In addition, limited play characteristics are disclosed in the present invention that combine recordable media layers, which allow limited access to pre-recorded media, with recordable media layer(s) that retain the ability to record permanent data to the optical disc after the pre-recorded media is no longer accessible. These embodiments include the combinations of a limited play DVD with long playing DVD or CD recordable layers.

There exists a need for an optical medium that provides both long life content and limited life content because content owners desire a platform in which to conveniently and inexpensively rent their content to consumers while minimizing waste. The dual life optical medium disclosed in at least one of the embodiments of the present invention provides the consumer the necessary incentive to keep the optical medium long after the limited life content has expired.

Figure 5:
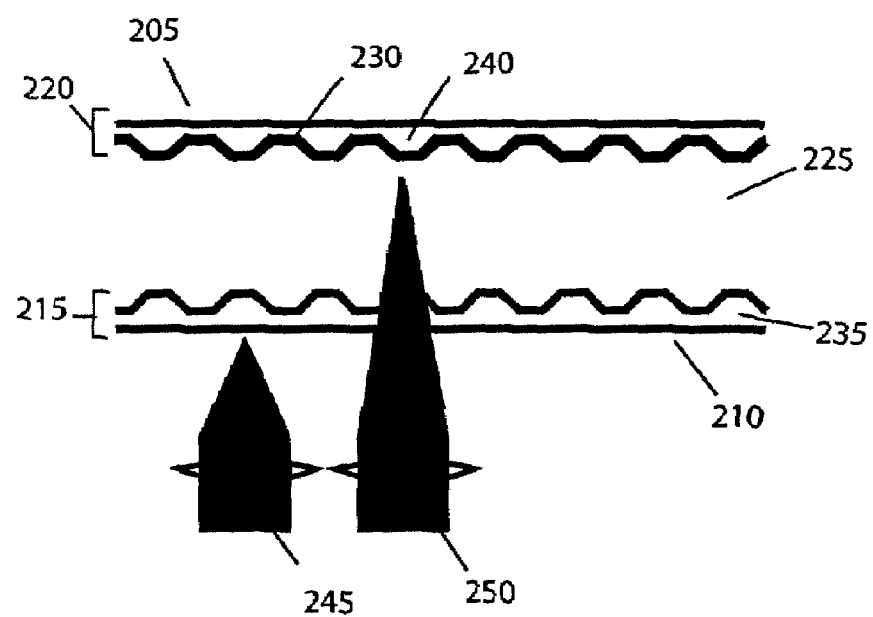
FIG. 5 illustrates a cross section of a combined CD and DVD embodiment consistent with the invention.

FIG. 5 illustrates an embodiment consistent with the present invention. This embodiment provides an optical medium 305 that contains encoded information with two separate life times. The L0 side 310 includes encoded information 320 that is the limited life side. After a predetermined time the encoded information 320 on this side becomes irreversibly inaccessible. The L1 side 315 includes encoded information 325 that is the long life side. After the L0 side 310 encoded information 320 is not longer accessible the L1 315 encoded information 325 will remain accessible. This construct can use either a masking dye and/or corrosion agent, which resides in the bonding layer 335. If a corrosion agent is employed it eliminates the L0 silver semi-reflective layer 330 and thus removes the reflected signal from that layer. To prevent the thicker silver layer from being affected an alternative reflective material can be substituted for the silver in this layer. The top of the L1 side 315 includes encoded information 325, a reflective layer 340, and a protective layer 345. The encoded information 320 and 325 is read by optical beams 350 and 355, respectively.

These embodiments provide optical media that contains encoded information with two separate life times, a limited life and an indefinite life. In these embodiments the encoded information is read for both DVD and CD from one side. Both metallic and dielectric semi-reflective layers can be used. Metallic semi-reflective films have an effect on the reading of the 780 nm laser used to read the CD layer. In thinner films, the read signal is still acceptable. Dielectric films can be used as the semi-reflective layer. Dielectric films are transparent at 780 nm and reflective at 650 nm. A combination of semi-reflective films may also be used to form a layered semi-reflective film with the corrosive sensitive region of the layer facing the bonding material. Signals for the CD reading laser are improved in this construct but are not always necessary. This construct uses corrosion chemistry with the bonding layer. The corrosion chemistry will eliminate the L0 silver semi-reflective layer and remove that reflected signal from that layer. The thicker full reflective layers bulk properties are designed not to be affected by the corrosion chemistry. This can be accomplished either by the bulk properties of materials (thick film vs. very thin) similar to the semi-reflective film or by changing the full reflective layer to a different material such as Au, or silver alloy that does not get impacted by the corrosion mechanism. With a dye that is transparent at the CD 780 nm wavelength but absorptive at the DVD wavelength the DVD will be blocked while the CD will play.

In embodiments consistent with the invention limited play media constructs with modified disc thicknesses are disclosed. In this embodiment a thin CD is placed back to back with a thin DVD. The CD, DVD, portions of either and/or both, or both disc types include a limited play mechanism, such as for example, a dye in the optical path and/or corrosion of the reflective layer or portions thereof. As described above, the CD substrate can be, for example, an audio, ROM, recordable, or rewritable disc while the DVD side can be, for example, a DVD-5, an inverse DVD-5, DVD-9, DVD-Recordable, or DVD-Rewritable. These two substrates with associated data structures, recording layers, and appropriate reflective layers can be combined together in any combination.

In yet another embodiment consistent with the invention a CD data layer and a DVD data layer use two substrates bonded together and are read from one substrate side.

In still another embodiment consistent with the invention an optical medium includes encoded information with two separate life times, a limited life and an indefinite life. In this embodiment the medium is played and/or read, for both DVD and CD, from one substrate side. The reflective layers can be selected from metallic films, dielectric semi-reflective films, metallic semi-reflective films, dielectric films, and/or combinations thereof.

Metallic semi-reflective films have an effect on the reading of the 780 nm laser used to read the CD layer. Dielectric films can be made which are transparent at 780 nm and reflective at 650 nm. A combination of semi-reflective films may also be used to form a layered semi-reflective film. A mechanism for limited the time a reflective layer and/or semi-reflective layer can be read by a reading beam and/or for limiting the integrity of a reflective layer and/or semi-reflective layer with the inclusion of a dye, corrosive material and/or other reading limiting agent in the optical path and/or adjacent to a reflective layer and/or semi-reflective layer. For example, in one embodiment consistent with the invention wherein the CD data layer and DVD data layer are read from one substrate side a corrosive material eliminates the L0 semi-reflective layer and removes that reflected signal from that layer after a predefined period of time.

CD/DVD with Semi-Reflective Layer on DVD-5.

A variant of the above embodiments is to make the DVD portion an inverse DVD-5 as disclosed in U.S. patent application Ser. Nos. 10/163,473, 10/163,855, 10/163,472, 10/837,826, 10/163,821, 10/651,627 and U.S. Pat. No. 6,756,103, all hereafter incorporated by reference in their entirety. The L1 side has CD data structures on the top side, and DVD data structures on the bottom of the same disc half (data structures on both sides of the top disc half, i.e., L1 side). This embodiment enables the use of bonding resins based on either corrosion chemistry as in the two examples above or reactive dye chemistry as the bonding layer is located within the optical path. Both metallic and dielectric semi-reflective layers can be used. Metallic semi-reflective films do have an effect on the reading of the 780 nm laser used for the CD layer. In thinner films, the read signal is still acceptable. Dielectric films such as silicon, silicon oxides, or silicon nitrides can be used as the semi-reflective layer which are transparent at 780 nm and reflective at 650 nm. Using reactive dye chemistry, dielectric films do not need to be eroded with a corrosion effect so that they can be optimized for their optical properties. This provides signals for the CD layer that meet all specifications and provide a wider processing window.

Two Discs Bonded Together

Another embodiment consistent with the invention provides an optical medium that contains encoded information with two separate life times, a limited life and an indefinite life. In this embodiment, disc thickness is kept below 1.5 mm which means the two disc halves are manufactured below the lower disc specifications on disc thickness and as specified by the DVD Forum and ECMA. For example, a DVD disc half would normally be manufactured at 0.6 mm and a CD substrate at 1.2 mm. Combining the two would create a disc thickness in excess of 1.8 mm when bonded together back to back. By reducing the two substrates to just below minimum thickness specifications, it is possible to achieve a disc thickness below 1.5 mm. while still maintaining playability in an estimated 98% of players. Two graphics are shown with the first showing a CD with protective lacquer over the metal layer before bonding, the second without the lacquer as it is replaced by the bonding material. In this example the limited play mechanism uses the corrosion chemistry to erode the semi-reflective film as described earlier in the text. The first illustration shows a CD with a protective lacquer over the metal layer before bonding, the second illustration shows a CD without the lacquer as it is replaced by the bonding material.

Figure 6:
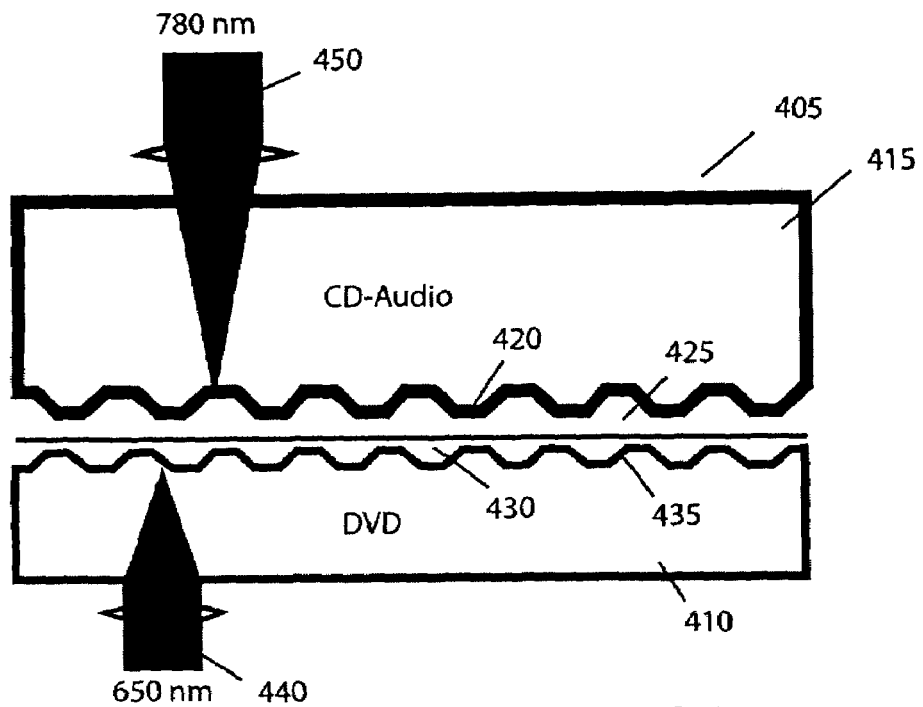
FIG. 6 illustrates a cross section of a combined CD and DVD embodiment consistent with the invention.

FIG. 6 illustrates another embodiment consistent with the invention. A hybrid optical medium 405 containing two optically readable formats wherein the format residing on the L0 side 410 is of limited life. Each format is readably via optical beams 450 and 440 through its own substrate side. In this illustration the CD format is read through the L1 side 415. A reflective layer 420 resides at the bottom of the L1 side 415. A protective layer 425 separates the reflective layer 420 from the L0 side 410. The L0 side 410 contains the DVD format. At the top of the L0 side 410 is a reflective layer 435. An adhesive layer 430 separates the L0 side 410 from the L1 side 415. A read inhibiting agent resides in the adhesive layer 430.

Figure 7:
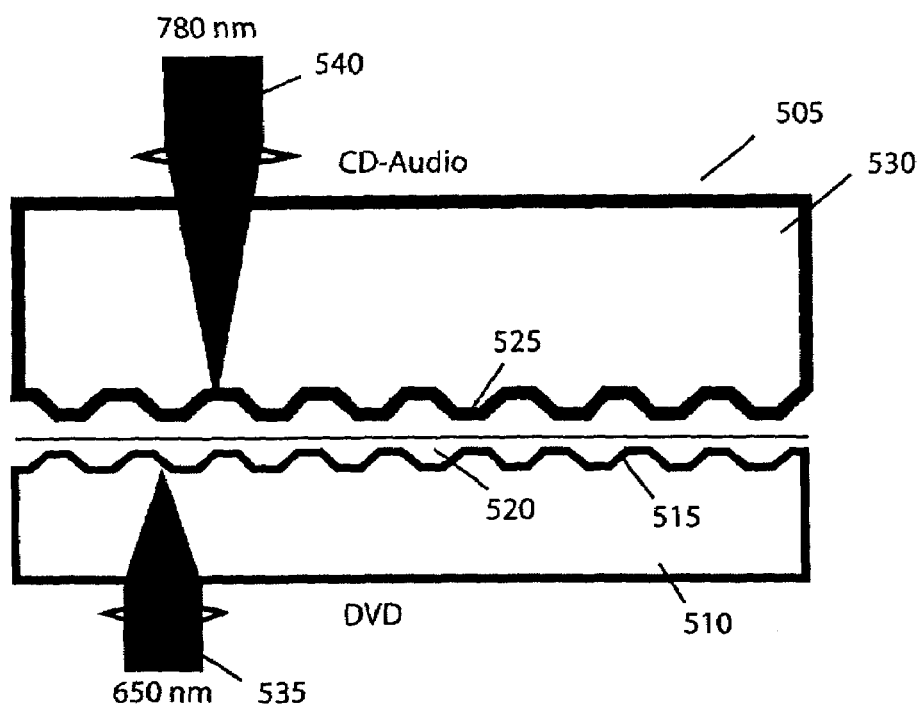
FIG. 7 illustrates a cross section of a limited play DVD with a CD recordable layer embodiment consistent with the invention.

FIG. 7 illustrates another embodiment consistent with the invention. A hybrid optical medium 505 containing two optically readable formats wherein at least one of the formats is of limited life. Each format is readably via optical beams 535 and 540 through its own substrate side. In this illustration the CD format is read through the L1 side 530. A reflective layer 525 resides at the bottom of the L1 side 530. The L0 side 510 contains the DVD format. At the top of the L0 side 510 is a reflective layer 515. An adhesive layer 520 separates the reflective layer 525 on the L1 side 530 from the reflective layer 515 on L0 side 510. A read inhibiting agent resides in the adhesive layer 520. The read inhibiting agent makes at least one of the two formats unreadable and/or inaccessible after a predefined period of time and/or event.

In another embodiment consistent with the invention, thicker, full reflective layers are not affected by the corrosive material. This can be accomplished either by the bulk properties of materials (thick film vs. very thin) similar to the semi-reflective film or by changing the full reflective layer to a different material such as Au, or silver alloy that does not get impacted by the corrosion mechanism. Thus, providing an optically readable medium with two time scales of accessibility.

In an overlapping embodiment consistent with the invention a bonding resin is in the optical path of the CD read laser. With a dielectric reflective layer on L0, the CD laser is not blocked by this first reflective layer. The CD laser then reads the L1 data through the bonding resin that includes a reactive dye material that absorbs the read laser after a predetermined period of time. In this embodiment the CD data is of limited duration and/or limited accessibility. Alternatively, the semi-reflective L0 layer is bonded with a material that results in corrosion of the L0 reflective layer after a predefined period of time. This configuration degrades the DVD reflective layer and creates a limited play DVD layer with a CD that is permanent play.

An overlapping embodiment of the above the DVD portion is made using an inverse DVD-5 as disclosed in U.S. patent application Ser. Nos. 10/163,473, 10/163,855, 10/163,472, 10/837,826, 10/163,821, 10/651,627 and U.S. Pat. No. 6,756,103, all hereafter incorporated by reference in their entirety. In this embodiment, the L1 disc has CD data structures on the top side, and DVD data structures on the bottom of the same disc half (data structures on both sides of the top disc half). This embodiment enables the use of bonding resins based on either corrosive materials as in the examples above or dye materials as the bonding layer is located within the optical path of the reading beam(s). Both metallic and dielectric semi-reflective layers can be used. Metallic semi-reflective films do have an effect on the reading of the 780 nm laser used for the CD layer. In thinner films, the read signal is still acceptable. Dielectric films such as silicon, silicon oxides, or silicon nitrides can be used as the semi-reflective layer, which are transparent at 780 nm and reflective at 650 nm. Using dye materials, dielectric films do not need to be eroded with a corrosive material so that they can be optimized for their optical properties. This provides signals for the CD layer that meet all ECMA, DVD Forum and ISO specifications and provide a wider processing window.

In another embodiment consistent with the invention an optical medium includes encoded information with two separate discs bonded back to back. In this embodiment, disc thickness is kept approximately in the range of 1.5 mm or lower to keep the overall disc thickness within the ranges specified by ECMA and/or ISO. However, as specifications of ECMA and ISO change so to can the disc thickness and be consistent with the invention. In this embodiment the two disc halves are manufactured below the lower disc specifications on disc thickness and as specified by the DVD Forum and ECMA. For example, a standard long playing DVD disc half is currently manufactured at a thickness of 0.6 mm and a CD substrate at 1.2 mm. Combining the two formats into a single disc without modification would create a disc thickness in excess of 1.8 mm when bonded together back to back. By reducing the two substrates to just below minimum thickness specifications, it is possible to achieve a disc thickness below 1.5 mm while still maintaining playability in an estimated 98% of players currently on the market. FIG. 5 shows a CD with protective lacquer over the metal layer before bonding. FIG. 6 shows the discs bonded without the lacquer layer as it is replaced by the bonding material. In this example the limited play mechanism uses a corrosive material to erode the semi-reflective film.

DVD-9 Bonded to a CD

Figure 8:
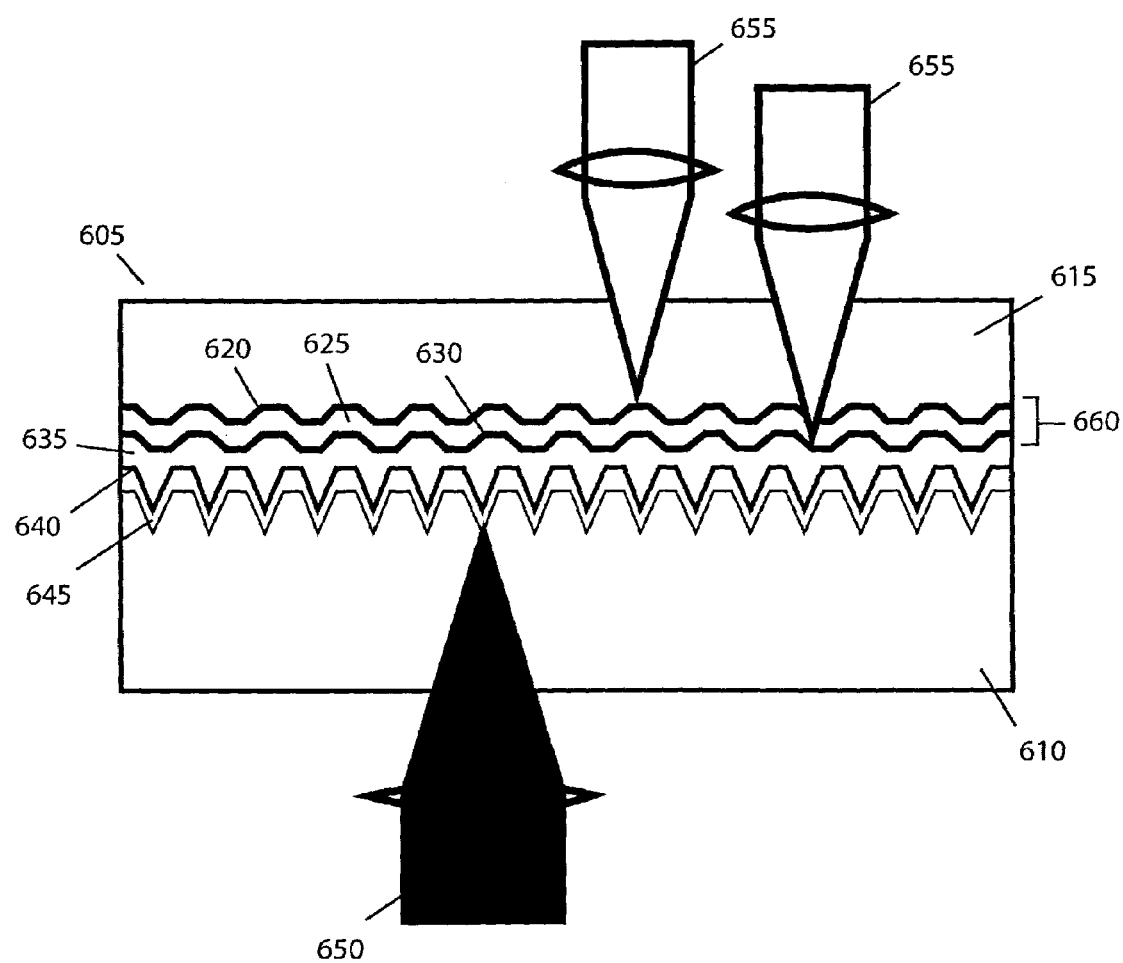
FIG. 8 illustrates a cross section of a DVD and recordable CD embodiment consistent with the invention.

Using a peel technique in the construction of the L1 substrate to make a DVD-9 disc half, a limited play DVD-9 can be bonded back to back with a CD to make a further embodiment consistent with the invention of a limited play DVD combined with a permanent play CD format substrate. FIG. 8 illustrates a dual layer DVD format bonded to a recordable CD format consistent with the present invention. An L1 side 615 contains two DVD data layers 660, similar to a DVD-9, with two reflective layers 620 and 630 at the top of the L1 side 615 bonded 635 to an L0 side 610. Separating the two DVD data layers is an intervening layer 625, wherein a read inhibiting agent resides. The L0 side 610 contains a recordable CD format including a reflective layer 640 and a recordable material 645. At least one of the DVD format layers is of limited life. The CD format and DVD format are read through their respective L0 and L1 sides via optical reading beams 650 and 655. The L0 disc half is molded thinner than ECMA, ISO, DVD Forum specifications to keep total disc thickness below 1.5 mm. Since the disc is flipped to be read from each side, the reflective layers are optimized for each side, CD and DVD. This DVD-9 limited play disc half is then bonded to either a permanent play or recordable CD, again molded with a thinner substrate.

DVD Formats

These embodiments provide an optical medium that contains encoded information with two separate life times. In one embodiment the L0 encoded information is the limited life side. After a predetermined time the encoded information on this side becomes irreversibly inaccessible. The L1 encoded information is the long life side. After the L0 encoded information is no longer accessible the L1 encoded information will remain accessible. The corrosion agent eliminates the L0 silver reflective layer and thus removes the reflected signal from that layer. To prevent the L1 reflective layer from being affected by the same mechanism, it can be made thicker and/or an alternative reflective material can be substituted in this layer.

EXAMPLE

DVD-10 discs were made using an L0 reflective layer which was varied in thickness and corresponding reflectivity. It was determined that a great majority of consumer players will play a DVD-5 disc half at much lower reflectivities than DVD ECMA, DVD Forum and/or ISO specifications. To create a limited play optical media, the reflective film was reduced in reflectivity to that of an equivalent layer used in DVD-9 manufacturing of the L0 layer. This reflectivity ranges from 18 to 30%. Discs were also made at reflectivities increasing until the DVD specification (as defined by ECMA, ISO and DVD Forum) of 45% was reached. This reflective layer is susceptible to corrosion effects. By varying the thickness of the reflective layer, one can also effect the play time of the media. Playability was acceptable in our testing with a range of consumer players such as the Pioneer DV-563A, JVC XV-N50, and Panasonic DVD S-25.

When the L0 reflective layer was increased until DVD-5 specifications (as defined by ECMA, ISO, and DVD Forum) were met with a minimum reflectivity of 45%, the L0 reflective layer can still be produced with significantly less thickness than the L1 layer. This allows the L1 to be made with the same material but still maintain its reflective properties for permanent play. As mentioned previously, the L1 layer can also be made with alternate reflective materials such as gold (Au) which would not react to degrade the reflectivity of the layer with the read limiting mechanism, rendering one side of the disc playable after one side has failed to play.

DVD-9 with One Recordable Layer

In another embodiment consistent with the present invention a limited play disc with a recordable layer is described. A read limiting agent is integrated within a bonding adhesive, which is used to bond two substrates together. The L1 disc half is bonded using an adhesive containing a read limiting agent to a L0 substrate with a recordable dye coated on a grooved surface as specified in recordable formats by the various standards bodies. A disc is provided with a limited play L1 data layer and a recordable L0 layer that will play after the L1 data has become unreadable. Using authoring techniques the entire L0 layer or a part of it can also be defined as a limited play area. Further, the limited mechanism, does not have to be an entire layer or through out the disc and instead may be localized to a select region(s), such localization may, depending on the configuration, prevent access to all the data on a particular layer or selection regions only. The L0 layer could then still be recordable. The disc is authored so that when inserted into a player, the L1 would be recognized as having been recorded and the L0 available for recording.

Figure 9:
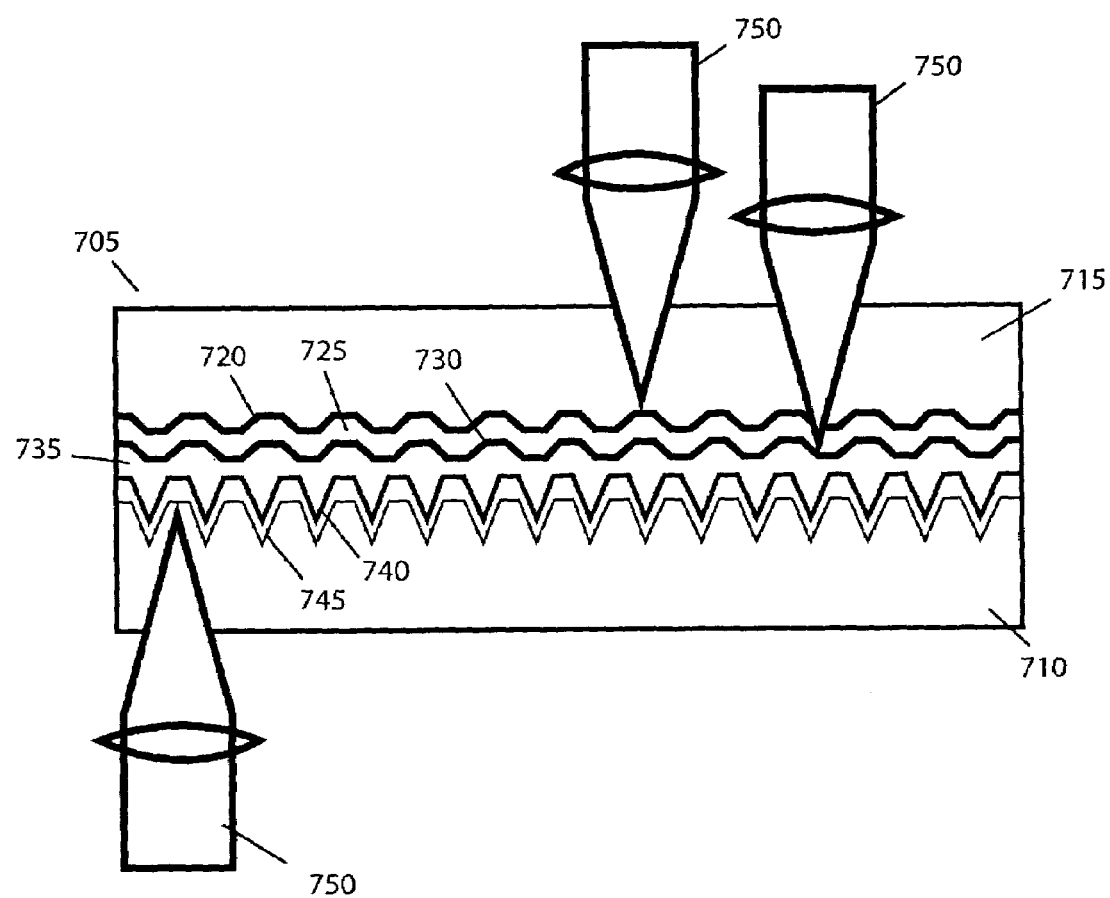
FIG. 9 illustrates a cross section of a DVD recordable and DVD ROM disc embodiment consistent with the invention.

FIG. 9 illustrates a DVD-9 with a recordable DVD layer consistent with the invention, wherein at least one layer of the DVD-9 side is of a limited life. An optical medium 705 is formed by bonding two substrates 715 and 710 together. The L1 substrate 715 contains two reflective layers 720 and 730 separated by an intervening layer 725 at the bottom of the L1 substrate 715. The L0 substrate contains a reflective layer 740 and a recording material 745 for recording encoded information. The L0 substrate 715 and L1 substrate are joined together by a bonding and/or adhesive layer 735. The read inhibiting agent resides in at least one of the intervening layer 725 and the bonding layer 735.

DVD-R/DVD-5 Limited Play Disc

In yet another embodiment consistent with the invention a disc is constructed using a DVD-R bonded to a DVD-5. One side plays the DVD-5 content, for example, movie or video content. Once flipped over a single layer DVD-R is available for recording data. The bonding resin employs a material that corrodes the reflective DVD-5 film without attacking the reflective layer of the recordable side.

Figure 10:
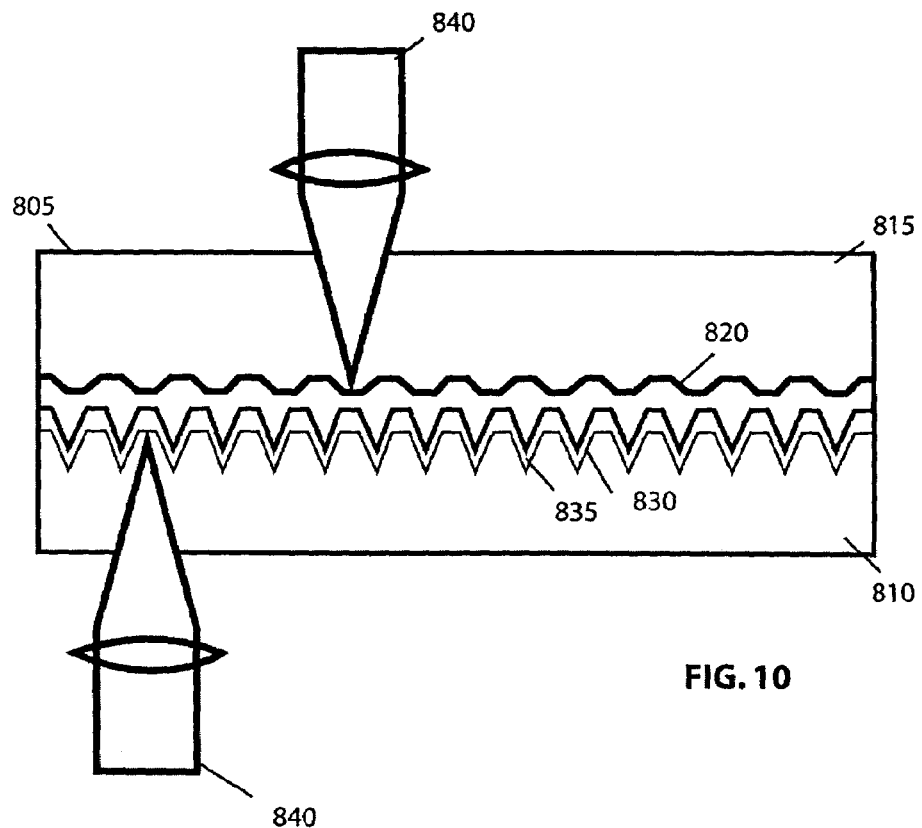
FIG. 10 illustrates a cross section of a DVD recordable and DVD ROM disc embodiment consistent with the invention.

FIG. 10 illustrates an embodiment consistent with the invention, wherein an optical medium 805 with a recordable layer and limited play layer are combined. The recordable layer and the limited play layer are read through their own unique substrates. As illustrated, the L0 substrate 810 contains the recordable layer, wherein the top of the L0 substrate 810 includes a reflective layer 830 and a recording material 835. The L0 substrate 810 is bonded to the L1 substrate 815 via a bonding and/or adhesive layer 835. The L1 substrate 815 contains the limited play data layer. The bottom of the L1 substrate 810 includes a reflective layer 820. The reading inhibiting agent resides in the bonding layer 835 and allows for the L1 substrate 815 data layer to be of limited life while allowing the recordable layer to be long playing. The data layers are read by optical beams 840.

Figure 11:
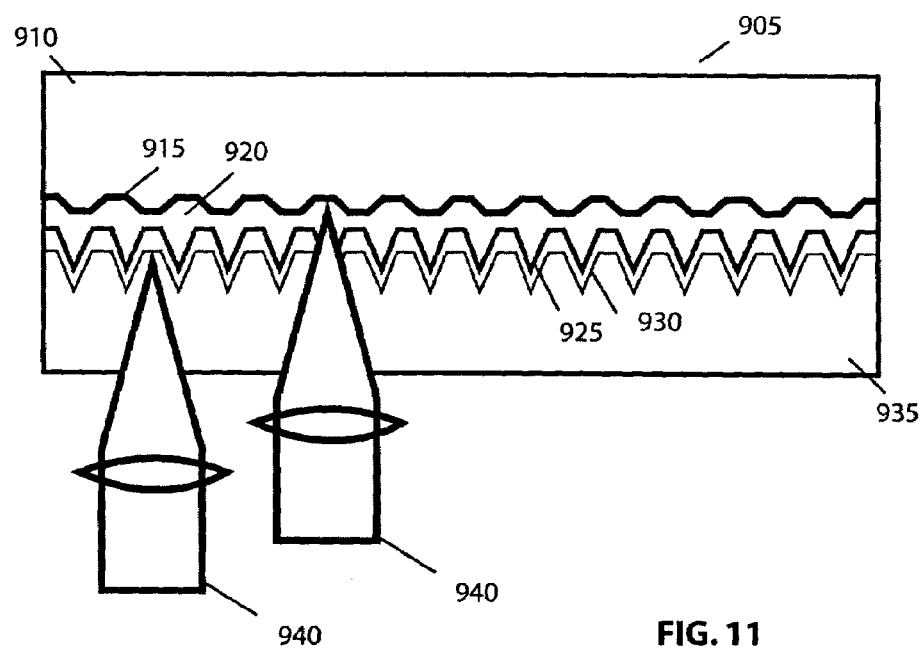
FIG. 11 illustrates a cross section of a limited play DVD with a permanent play DVD read from the bottom side embodiment consistent with the invention.

FIG. 11 illustrates an embodiment consistent with the invention, wherein an optical medium 905 with a recordable layer and limited play layer are combined. The recordable layer and the limited play layer are read through same substrate side. As illustrated, the L0 substrate 935 contains the recordable layer, wherein the top of the L0 substrate 935 includes a reflective layer 925 and a recording material 930. The L0 substrate 935 is bonded to the L1 substrate 910 via a bonding and/or adhesive layer 920. The L1 substrate 910 contains the limited play data layer. The bottom of the L1 substrate includes a reflective layer 915. The reading inhibiting agent resides in the bonding layer 920 and allows for the L1 substrate 910 data layer to be of limited life while allowing the recordable layer to be long playing. The data layers are read by optical beams 940.

DVD 14/18 Constructs

Using existing dye technology, and as disclosed in the above referenced U.S. patents and applications, DVD 14 discs can be manufactured which combine a limited play DVD-9 with a permanent play DVD-5 layer. In this embodiment the limited play techniques disclosed to make DVD-9 product including partial dispense and authoring techniques. Once the DVD-9 is manufactured, the top substrate is mechanically peeled away as in a standard DVD-14 process, and a new top substrate bonded to the disc. This new substrate can be either a permanent play DVD-5, a second permanent play peeled DVD-9 half, limited play peeled DVD-9 half, or a recordable DVD-5 half or dual layer recordable DVD disc half. In this way several combinations of disc halves can be combined using recordable, permanent play, or limited play disc halves. For example, a limited play DVD-9 bonded to a permanent play DVD-5 can be read by flipping the disc over. A DVD-9 limited play disc half bonded to a single layer recordable DVD disc half that must be recorded by flipping the disc over. In this way disc capacities can be increased, recordable layers combined with limited play data regions, and permanent play areas extended to entire layers. This provides significant flexibility to address many applications of permanent play, limited play, and recordable applications.

Figure 12:
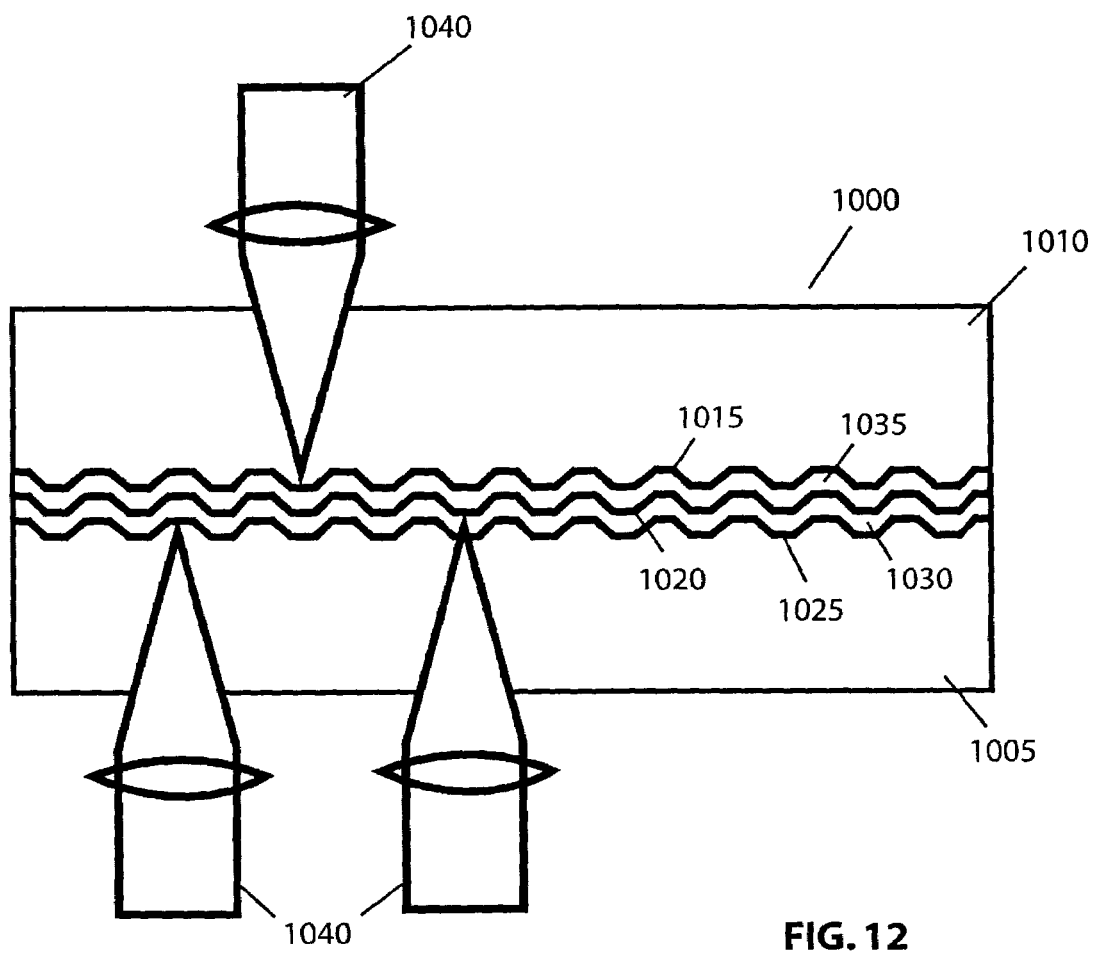
FIG. 12 illustrates a cross section of a limited play DVD with a permanent play DVD layer embodiment consistent with the invention.

FIG. 12 illustrates an embodiment consistent with the invention. An optical medium 1000 includes a DVD-9 format bonded to a DVD-5 format. At least one layer or portion thereof can be of limited life. The L1 substrate 1010 includes a DVD-5 format with a reflective layer 1015 at the bottom of the L1 substrate 1010. The L1 substrate 1010 is bonded to the L0 substrate 1005 via a bonding and/or adhesive layer 1035. The L0 substrate 1005 includes a DVD-9 format at its top, with two reflective layers 1020 and 1025 separated by an intervening layer 1030. The DVD-9 and DVD-5 formats are read through their own substrates by optical beams 1040. At least one encoded information layer or a portion thereof is of limited life.

HD-DVD Formats

It is clear from the discussion and depiction of various constructs above that many different forms or combinations of optical disc formats can be combined with limited play technology. This also applies to bringing together various high density disc formats with conventional DVD formats, or even combining both proposed high density formats, HD- DVD and Blu-ray, on a single disc. The following embodiments consistent with the invention combine limited play and/or conventional HD-DVD and/or Blu-ray data layers with limited play and/or conventional DVD layers. The Blu-ray and HD-DVD limited play constructs have been discussed above. In a further embodiment, all data layers could be limited play or conventional permanent data layers. These constructs provide a large matrix of possibilities combining formats with and without limited play access to either all or selected sections of the encoded information on a data layer.

Limited play optical media can be produced incorporating reactive materials in the disc substrate, bonding layer, coatings within the structure of the disc and/or layered on the surface of the disc. A long playing Digital Versatile Disc (DVD) is normally constructed with the bonding of two 0.6 mm substrates. The current proposed specifications for Blu-ray and HD-DVD discs differ in their data layer location and disc construction. Blu-ray and HD-DVD data layers can be combined in one disc using reactive materials that can be incorporated into the construct of the disc which can eliminate the playability of all or part of the stored data on the disc. Because these discs are still constructed from layered substrates, novel constructs can be created which were not anticipated by those who developed the high definition video disc specifications for both Blu-ray and HD-DVD. In particular, the combination of both formats into a single disc with and without limited play data layers is envisioned. Additionally, selected layers can also include recordable functionality.

HD-DVD and DVD 5/9/Recordable Data Layers

Figure 13:
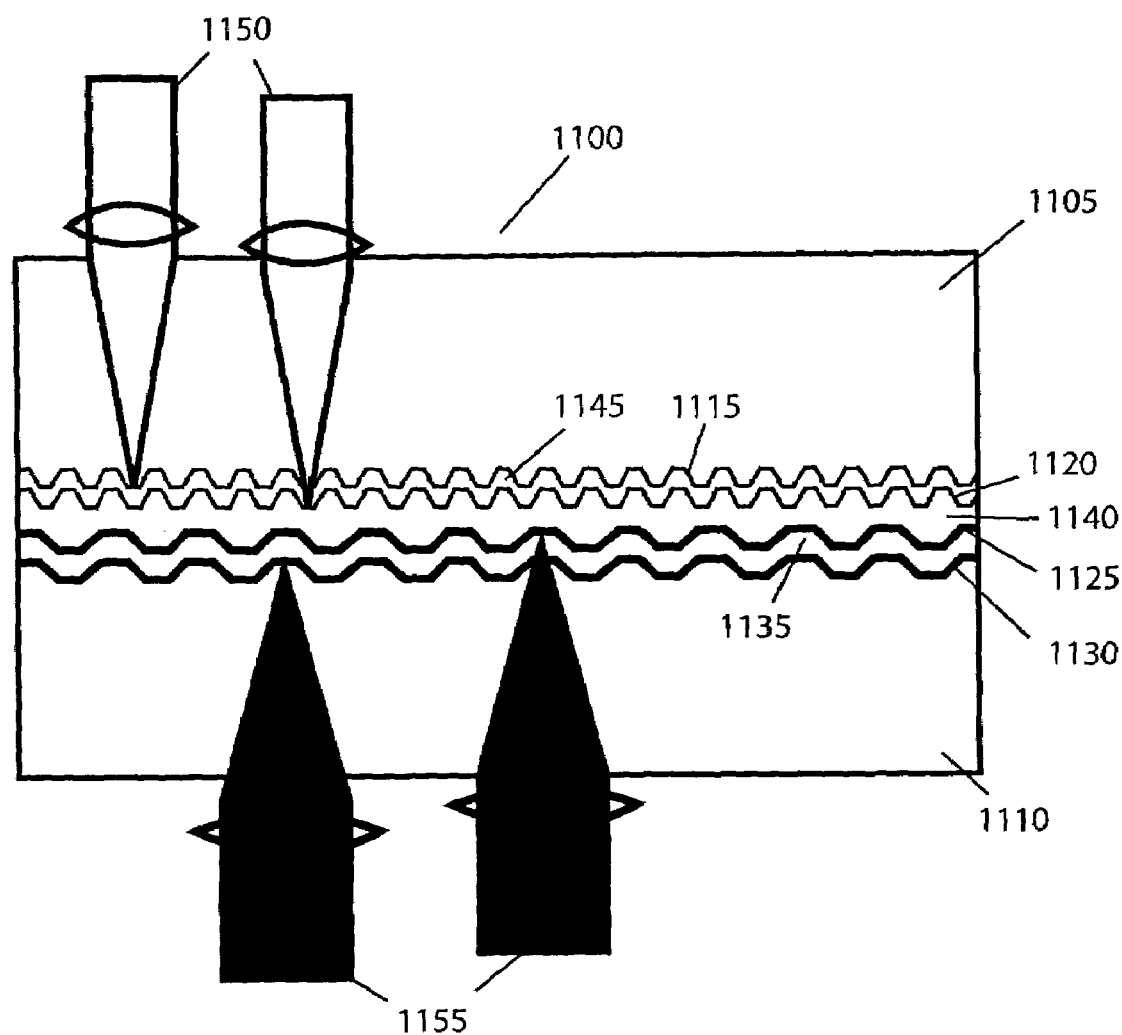
FIG. 13 illustrates a cross section of a limited play HD-DVD dual layer top substrate bonded with a DVD embodiment consistent with the invention, wherein either or both the HD-DVD layer or the DVD layer are limited life layers.

In the HD-DVD specification set forth by the DVD Forum, the product essentially uses two 0.6 mm substrates bonded together much in the same way as standard DVD. In an embodiment consistent with the invention, standard DVD data layers, both permanent and limited play are combined together with HD-DVD data layers, both permanent and limited play. For single layer HD-DVD and single layer DVD combinations, the two disc substrates are simply bonded together giving a DVD 5 or single layer DVD-R played or recorded from one side and a single layer HD-DVD or recordable HD-DVD played or recorded from the other. Either substrate could also have a second data layer added through standard DVD-14/18 bonding stripping techniques, or recordable layers added through standard dual layer recordable manufacturing processes. FIG. 13 below illustrates two dual layer substrates bonded together to form an HD-DVD dual layer disc combined with a DVD-9. Any of the data layers can be made limited play through the addition of reactive materials into the bonding resin, reflective layers, and/or substrates of the disc. The limited play capability could limit access to a part of any data layer or all of the data stored on the disc.

FIG. 13 illustrates an embodiment consistent with the present invention. The L1 substrate 1105 includes an HD-DVD data format. The L1 substrate 1105 is bonded via a bonding layer and/or adhesive layer 1140 to an L0 substrate 1110. The L0 substrate 1110 includes a DVD-9 data format. The bottom of the L1 substrate 1105 includes two reflective layers 1115 and 1120 separated by an intervening layer 1145. The top of the L0 substrate 1110 includes two reflective layers 1125 and 1130 separated by an intervening layer 1135. The HD-DVD and DVD-9 formats are read through their own substrates sides via optical beams 1150 and 1155, respectively. A read inhibiting agent limits the life of at least the HD-DVD and DVD-9 format. The read inhibiting agent resides in at least one of intervening layer 1145, bonding layer 1140, and intervening layer 1135.

Blu-Ray and DVD 9/5/Recordable Hybrid Disc

Figure 14:
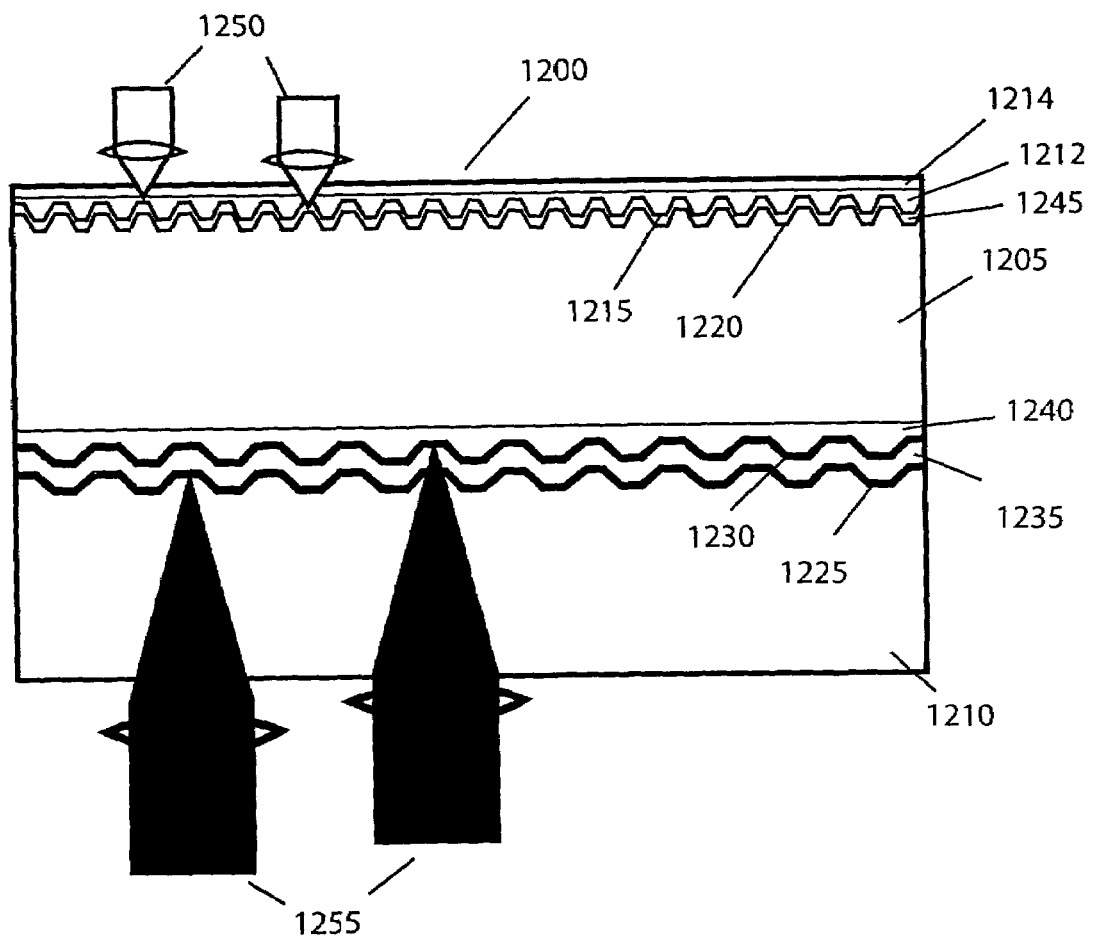
FIG. 14 illustrates a cross section of a Blu-ray data layer(s) combined with DVD data and/or recordable layers embodiment consistent with the invention.

As described above, the Blue-ray disc is constructed with a 1.1 mm substrate that is not in the optical path. Therefore it is possible to create that substrate using two substrate layers bonded together. Instead of molding substrates with HD-DVD layers, it is also possible to use standard DVD data layers including DVD-5, DVD-9, and single or dual layer recordable data layers within the 1.1 mm substrate of the Blu-ray disc an example of which is shown in FIG. 14. This embodiment combines limited play capability to a part and/or all of the data stored and/or recorded onto the disc or any of its data layers.

FIG. 14 illustrates an embodiment consistent with the present invention. The L1 substrate 1205 includes an Blu-ray data format. The L1 substrate 1205 is bonded via a bonding layer and/or adhesive layer 1240 to an L0 substrate 1210. The L0 substrate 1210 includes a DVD-9 data format. The top of the L1 substrate 1205 includes two reflective layers 1215 and 1220 separated by an intervening layer 1245. The L1 substrate 1205 further includes a bonding layer 1212 and a cover layer 1214. The top of the L0 substrate 1210 includes two reflective layers 1225 and 1230 separated by an intervening layer 1235. The Blu-ray and DVD-9 formats are read through their own substrates sides via optical beams 1250 and 1255, respectively. A read inhibiting agent limits the life of at least the Blu-ray and DVD-9 format and/or a portion thereof. The read inhibiting agent resides in at least one of intervening layer 1245, bonding layer 1240, intervening layer 1235, the bonding layer 1212, and the cover layer 1214.

To achieve a dual layer DVD-9 using the above construct, a mold, bond, and strip process and/or peel process is typically used to form the second layer as in DVD-14/18 manufacturing processes. This could be eliminated if data layers were molded on both sides of the top substrate as shown below in FIG. 15.

Figure 15:
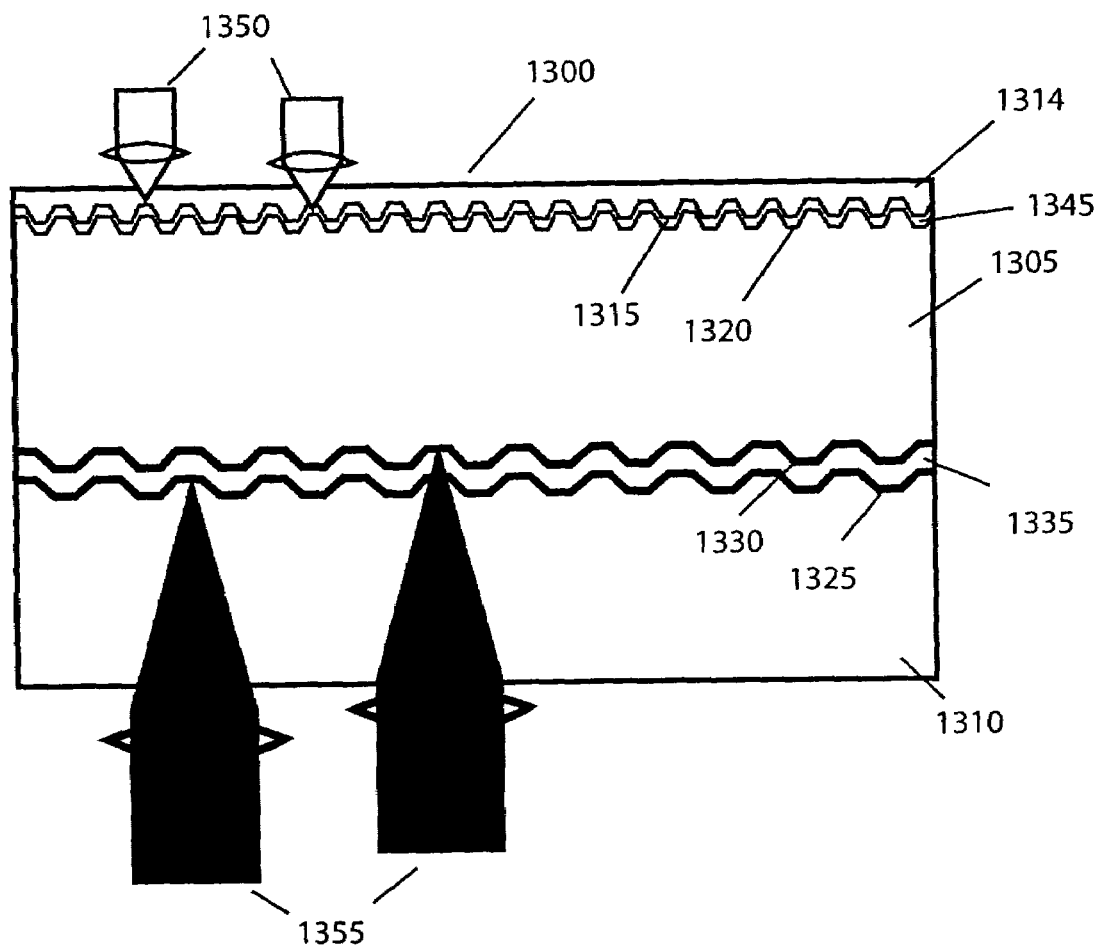
FIG. 15 illustrates a cross section of a Blu-ray data layer(s) combined with DVD data and/or recordable layers embodiment consistent with the invention.

FIG. 15 illustrates an embodiment consistent with the present invention. The L1 substrate 1305 includes a Blu-ray data format. The L1 substrate 1305 is bonded via a bonding layer and/or adhesive layer 1335 to an L0 substrate 1310. The L0 substrate 1310 includes a DVD-9 data format. The top of the L1 substrate 1305 includes two reflective layers 1315 and 1320 separated by an intervening bonding layer 1335. The L1 substrate 1305 further includes a cover layer 1314. The top of the L0 substrate 1310 includes two reflective layers 1325 and 1330 separated by an intervening layer 1335. The Blu-ray and DVD-9 formats are read through their own substrates sides via optical beams 1350 and 1355, respectively. A read inhibiting agent limits the life of at least the Blu-ray and DVD-9 format and/or a portion thereof. The read inhibiting agent resides in at least one of bonding layer 1335, intervening layer 1315, and the cover layer 1314.

Hybrid HD-DVD and Blu-Ray Disc

Figure 16:
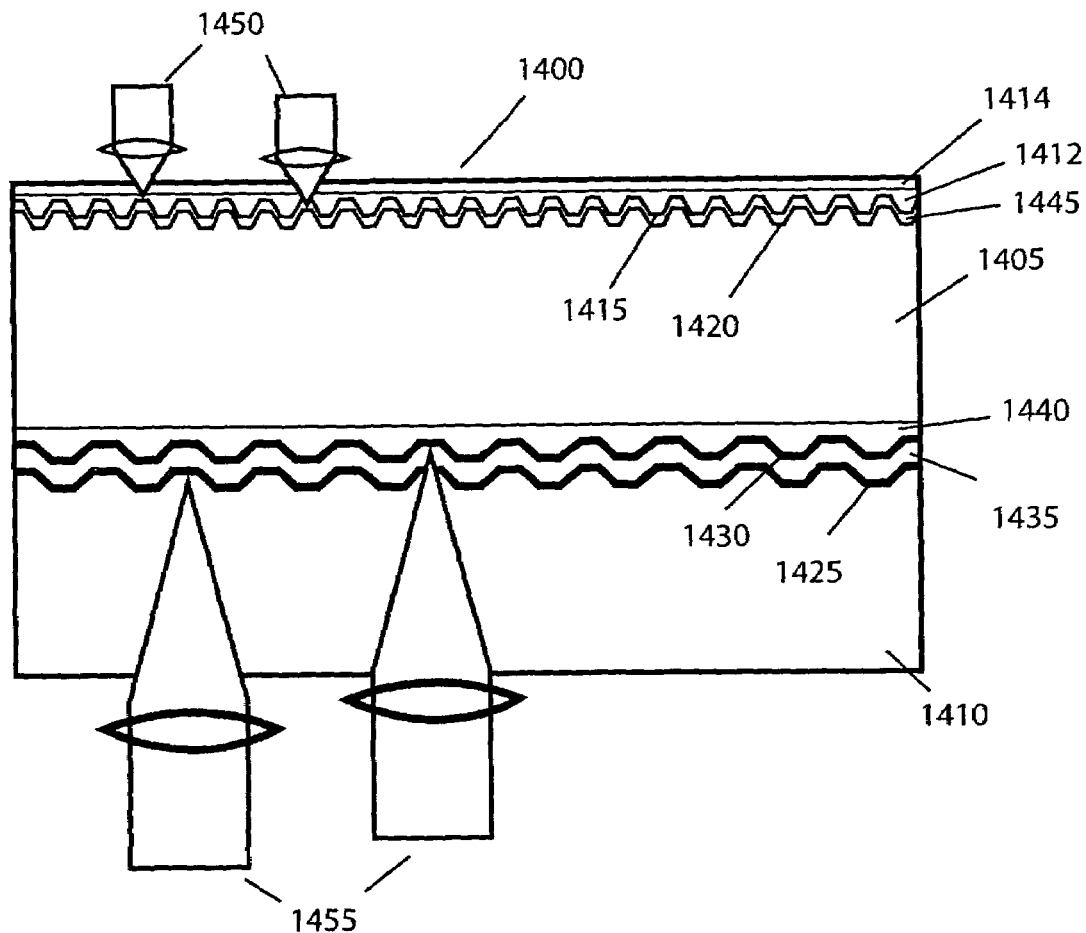
FIG. 16 illustrates a cross section of a Blue-ray top data layer (dual layer shown) combined with HD-DVD data layer (dual layer shown) read from the bottom embodiment consistent with the invention.

In another embodiment consistent with the invention both optical disc formats (for example HD-DVD and/or DVD and Blu-Ray) are combined into one disc as shown in FIG. 16. A Blue-ray substrate is 1.1 mm thick and is not in the optical path of the laser. The data layer is on the top surface and bonded to a cover layer through a variety of techniques including a spincoated layer, and/or bonding a thin 0.1 mm cover layer, and/or bonding/adhering a film layer to the disc to form the cover layer. Since the 1.1 mm substrate is not in the optical path of a Blu-ray disc player, that substrate could be two layers bonded together as in DVD or HD-DVD manufacturing. The first layer would be 0.6 mm thick while the second would be 0.5 mm. The bonding layer could be a nominal 55 microns thick for DVD or thinner for the HD-DVD bonding layer. The second disc substrate thickness would be adjusted accordingly depending on the bonding layer thickness. When bonded the total substrate thickness would meet the 1.1 mm Blu-ray substrate specification.

FIG. 16 illustrates an embodiment consistent with the present invention. The L1 substrate 1405 includes a Blu-ray data format. The L1 substrate 1405 is bonded via a bonding layer and/or adhesive layer 1440 to an L0 substrate 1410. The L0 substrate 1410 includes a HD-DVD data format. The top of the L1 substrate 1405 includes two reflective layers 1415 and 1420 separated by an intervening layer 1445. The L1 substrate 1405 further includes a bonding layer 1412 and a cover layer 1414. The top of the L0 substrate 1410 includes two reflective layers 1425 and 1430 separated by an intervening layer 1435. The Blu-ray and HD-DVD formats are read through their own substrates sides via optical beams 1450 and 1455, respectively. A read inhibiting agent limits the life of at least the Blu-ray and HD-DVD format and/or a portion thereof. The read inhibiting agent resides in at least one of intervening layer 1445, bonding layer 1440, intervening layer 1435, the bonding layer 1412, and the cover layer 1414.

FIG. 16 above illustrates the hybrid construct of a Blu-ray disc combined with an HD-DVD optical disc. This is a unique and novel construction combining data layers that meet the specifications of two different proposed formats within a single optical disc. By using normal bonding and spincoating resins and/or other cover layer constructs for each format, both data layers would be permanent play data layers. The incorporation of reactive materials and/or limited play mechanisms within the bonding layers, and/or cover layer, and or/disc substrate, and/or reflective layers adds limited play capability to part of or entire data layers. In addition, the present invention also contemplates the combination of limited play characteristics, permanent play characteristics, and/or recordable layers within the construct of a single disc containing Blu-ray and HD-DVD data layers.

Recordable Limited Life Optical Media

In applications of on-demand recording of digital data including but not limited to audio or video such as music or movies, it may be desirable to be able to record information onto an optical disc that offers limited play capability for all or part of the recorded information. This can also be combined with a pre-recorded area or data layer within the disc structure.

In yet another embodiment consistent with the invention an optical medium is disclosed that can be used at point of distribution to selectively record data, including for example but not limited to software, songs, albums, music videos, feature films, or video segments that the customer desires to purchase. The method of distribution and recording could be a customer service station at a retail location with the associated recording device and appropriate packaging system or a fully integrated kiosk that is used directly by the consumer to automate the process and transaction.

An optical disc product to meet these use requirements has been designed combining a recordable data layer and a limited life mechanism. This basic construct can be combined with any of the preceding embodiment, including a pre-recorded second layer in a limited play DVD-9 format. The use of a second recordable layer is also possible In one embodiment consistent with the invention the disc construct follows the standard DVD-9 configuration of a bottom L0 disc half and/or substrate bonded to a top L1 disc half and/or substrate. This grooved substrate is then coated with a DVD recordable dye and metallized with a semi-reflective film to create the recordable L0 data layer within a dual layer DVD-9 construct. A read limiting dye is integrated within the adhesive used to bond the L0 and L1 substrates. The L1 substrate is molded as a pre-recorded data layer as is typical in a DVD-9 L1 data layer and metallized with a full reflective layer. Optionally, a second recordable layer may be used in a dual layer recordable construct. In either product configuration, the read limiting dye in the bonding layer limits access to the entire or selected areas of the second data layer after a predetermined period of time, limiting access to all or parts of the data stored on the optical disc. Interactions between the reflective layers and the reactive bonding layer can be prevented with a buffer layer applied to the reflective layer prior to bonding.

The disc is authored so that when inserted into a player, the L1 would be recognized as having been recorded and the L0 available for recording. The pre-recorded L1 data layer offers the ability to place data on the L1 that can serve as a check region or provide software for use in the player, kiosk, or recorder application. The use of check regions within the data structure of the disc can be employed to enhance the capability of a recordable limited play product, defining the limited play areas and providing access to selected parts of the recorded and pre-recorded information. The L0 layer may also have pre-recorded data in the recordable data area that contains information for the player, recording drive, or kiosk station to use as a check disc region, application information, or product configuration information.

The use of partially dispensing the reactive adhesive within the bonding layer may also be utilized to block the ability of the read laser to read limited areas of the recordable and/or pre-recorded data layers. In this way, the media can be configured to selectively allow limited play features to all of, or portions of, the data pre-recorded and/or recorded within the disc.

While numerous embodiments, including the preferred embodiments, of the invention have been illustrated and described, it will be appreciated that various changes and/or combinations can be made therein without departing from the spirit and scope of the invention.

Controlled Application of Read Inhibiting Agent(s)

These embodiments provide an optical medium that contains encoded information with two separate life times, a limited life and an indefinite life. A DVD-9 with read inhibiting agent on only a portion of the disc has been produced. Although this was done on a DVD-9 format, the technique applies to all disc formats and constructs. Authoring is accomplished so as to either restrict access to data not physically blocked, or enabling access to that data. These authoring techniques are an extension of those disclosed in U.S. patent application Ser. Nos. 10/163,473, 10/163,855, 10/163,472, 10/837,826, 10/163,821, 10/651,627 and U.S. Pat. No. 6,756,103, all hereafter incorporated by reference in their entirety. A portion of the optical media without a read inhibiting agent to block the laser and authoring is used to enable access to a part of either layer which would play forever if enabled while other data would have at least a major part of it become physically unreadable on all players.

Figure 17:
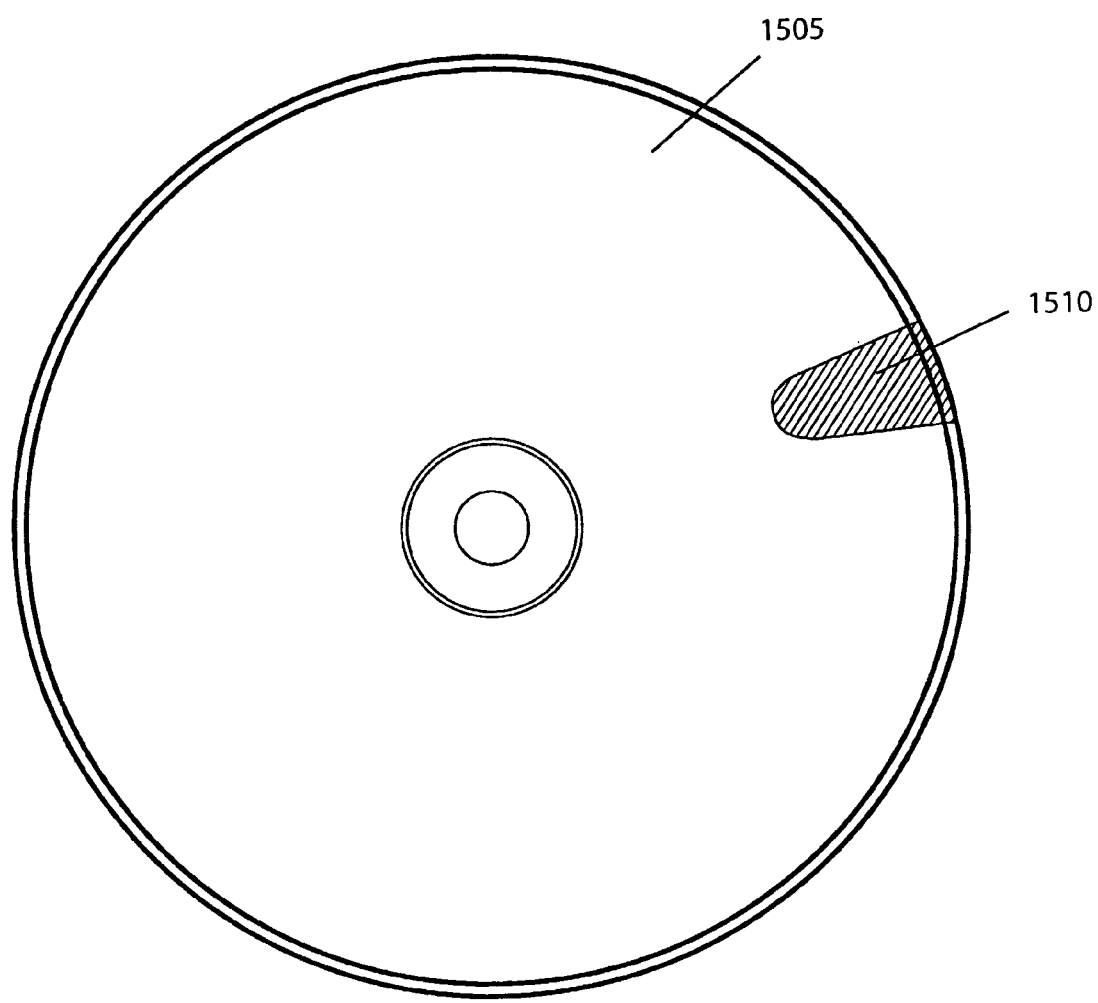
FIG. 17 illustrates a cut away top view with the read inhibiting agent localized to a prescribed region consistent with the invention.
Figure 18:
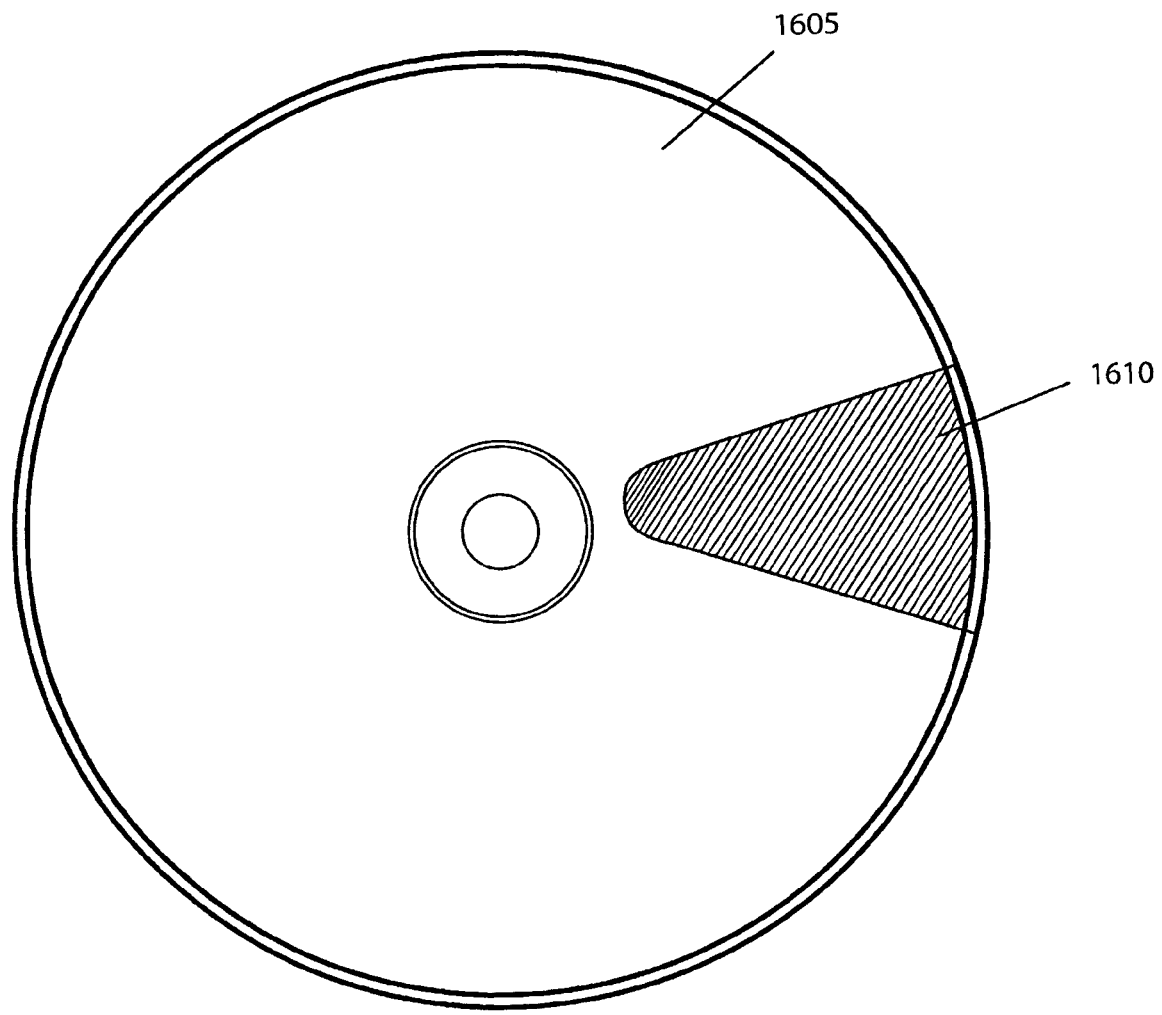
FIG. 18 illustrates a cut away top view with the read inhibiting agent localized to a prescribed region consistent with the invention.
Figure 19:
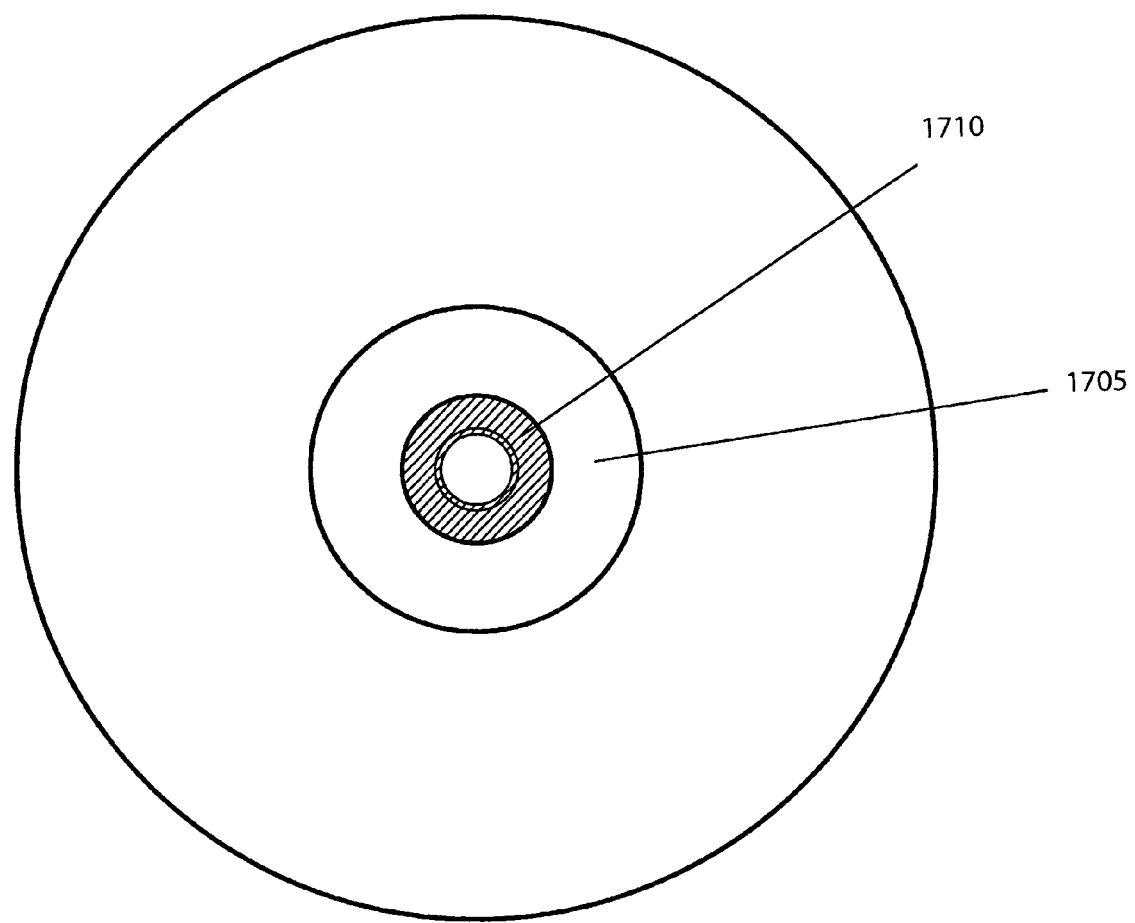
FIG. 19 illustrates a cut away top view with the read inhibiting agent localized to a prescribed region consistent with the invention.
Figure 20:
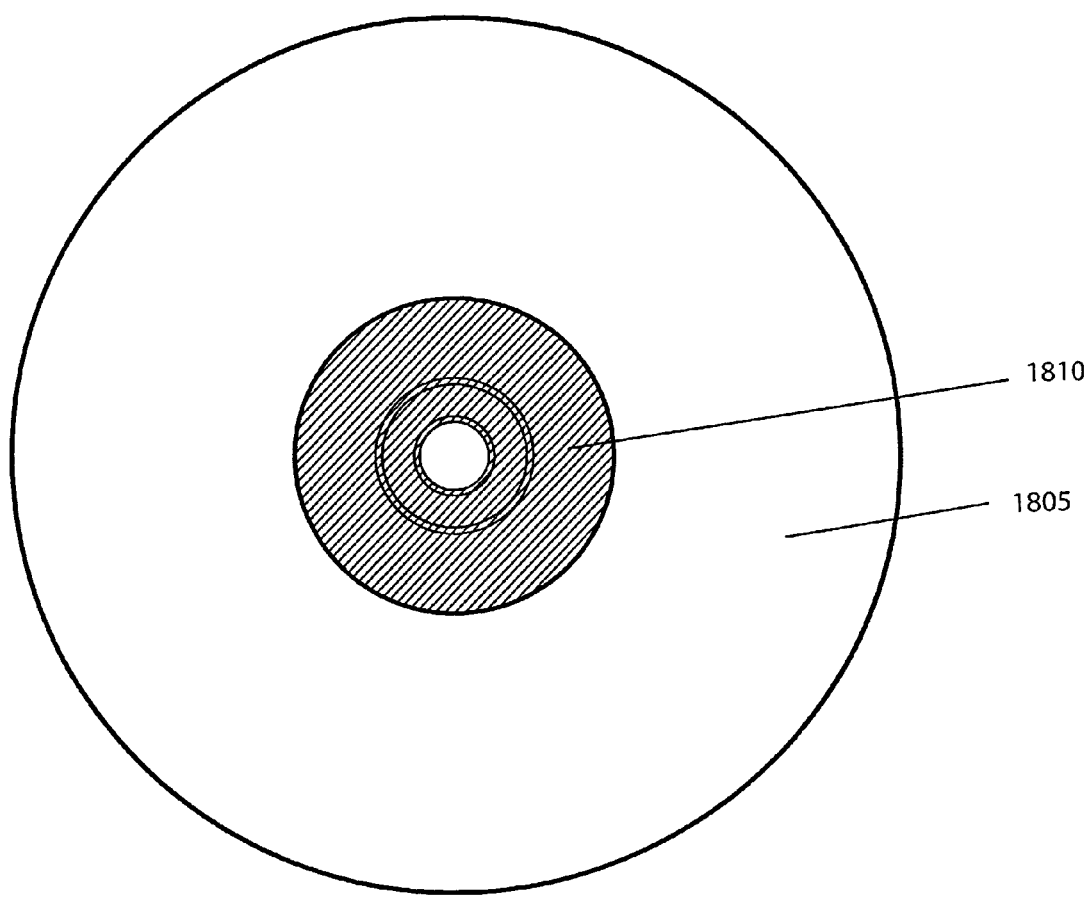
FIG. 20 illustrates a cut away top view with the read inhibiting agent localized to a prescribed region consistent with the invention.

Discs were made with reactive dye bonding material dispensed at the inner diameter (ID), middle, and outer diameter (OD) of the disc with a dual dispense system. FIGS. 17 through 20 illustrate distribution of the read inhibiting agent(s) consistent with the present invention. FIG. 17 illustrates a read inhibiting agent localized to a wedge section 1510 of the outer diameter. The remaining area 1505 can be a bonding agent and/or a secondary read inhibiting agent. FIG. 18 illustrates a read inhibiting agent localized to a larger wedge section 1610 of the outer diameter. The remaining area 1605 can be a bonding agent and/or a secondary read inhibiting agent. FIG. 19 illustrates a read inhibiting agent localized to a region surrounding the inner diameter 1710. The remaining area 1705 can be a bonding agent and/or a secondary read inhibiting agent. FIG. 20 illustrates a read inhibiting agent localized to a region surrounding the inner diameter 1810. The remaining area 1805 can be a bonding agent and/or a secondary read inhibiting agent.

If two bonding resins are dispensed within the standard dispense cycle, then a dramatic reduction in the use of costlier reactive dye bonding resin or corrosive chemistry bonding resin can be achieved with minor equipment and/or process modifications.

Benefits of dual dispense process include: active adhesive use reduction (subsequent cost reduction); use reduction allows for dye concentration increase (improved chemical stability); and separation of active/inactive adhesives: would allow for a secondary chemical failure mechanism to be implemented within the inactive adhesive chemistry, for example combining reactive dye chemistry with corrosion chemistry on different parts of the disc. The secondary failure mechanism is disclosed in U.S. patent application Ser. Nos. 10/163,473, 10/163,855, 10/163,472, 10/837,826, 10/163,821, 10/651,627 and U.S. Pat. No. 6,756,103, all hereafter incorporated by reference in their entirety.

A DVD-9 with a reactive agent and/or material (such as a reactive dye) on only a portion of the disc. This results in a portion of the disc without a reactive agent and thus will not prevent the laser from reading the encoded information in this region. Authoring is used to enable access to a part of the L1 layer, the portion without the reactive material, which would play forever while the data on a full side would have at least a major part of it become unreadable on all players.

The dual dispense system can also be used to reduce the cost of reactive dye or corrosion materials as mentioned above. For performance equivalent to a Flexplay DVD-5 or Flexplay DVD-9, the reactive bond resin can be applied at the ID of the disc while a non-reactive bond resin is applied outside of that radius. The two materials are then spun together leaving reactive material only at the inner portion of the disc, which will still cause a boot failure and eliminate access to the menu structure of the disc navigation. The disc will no longer function after the pre-determined stimulus activates the inner reactive dye or reactive corrosive material area.

Optical degradation of a limited-play optical medium occurs via exposure of a reactive dye or reactive corrosion agent to a stimulus, such as for example, oxygen. For example, oxygen transport to the reactive layer is limited by normal incidence bulk diffusion through the polycarbonate "dummy" substrate and any other intervening material layers. Oxygen transport can also occur through disc-edge diffusion at the interface between the reverse-mastered DVD-5 substrate and the dummy substrate or the edges of the L0 and L1 substrates of a DVD-9. Disc-edge diffusion is limited primarily to the inner and outer diameters of the DVD. Modifications to the oxygen diffusion rates of any intervening layers present between the external environment and the oxygen-active layers will significantly affect the rate of optical degradation of the limited-play media, thereby providing a mechanism to control the useable life of the product.

Disc-Edge Diffusion Control

Disc-edge diffusion rates will differ from the normal incidence bulk diffusion since the reactive layer is either exposed at that narrow area or is protected by a secondary barrier (e.g., protective acrylate coating), not typically of the same composition as other components of the typical limited-play optical media system. If bulk diffusion rates are low enough, then disc-edge diffusion will dominate, enabling useable disc life to be controlled by the preferential optical degradation at either the inner or outer diameter of the limited-play optical media. Disc-edge diffusion can be controlled through composition and thickness of the disc-edge barrier. Preferential disc failure through disc-edge diffusion is then achieved by a required playability verification at a predetermined point near either the inner diameter or outer diameter of the limited-play optical media. Dominant disc-edge diffusion rates can be achieved through the use of thin-film diffusion barriers on the dummy substrate, reduced oxygen diffusion rates through the dummy substrate (e.g., PMMA substrate), or topical diffusion barriers on the surface of the dummy substrate (e.g., protective barrier or semi-permeable coating).

In order to shift away from edge diffusion being the primary factor in the failure of the disc, a bonding technique has been developed which keeps the reactive dye or corrosion chemistry away from the outer edge of the disc yet still achieves appropriate bonding properties and spacer layer thickness. This embodiment involves dispensing two separate materials onto the disc during bonding. Two dispense systems were implemented to work in parallel to reduce cycle time. The reactive bond resin is applied at the ID of the disc while a non-reactive or secondary failure mechanism enabling bond resin is applied outside of that radius. The two materials are then spun together leaving reactive material only at the inner portion of the disc, which will still cause a boot failure and eliminate access to the menu structure of the disc navigation. The disc will no longer function after the pre-determined stimulus activates the inner reactive dye or reactive corrosive material area. The lifetime, or viewing window, of the encoded information stored on the disc is determined by the primary reactive agent in the center of the disc. In the case of a secondary failure mechanism employed as referenced in U.S. patent application Ser. Nos. 10/163,473, 10/163,855, 10/163,472, 10/837,826, 10/163,821, 10/651,627 and U.S. Pat. No. 6,756,103, all hereafter incorporated by reference in their entirety, the second material coated outside the ID could contain reactive corrosive chemistry which would erode the reflective layer after the reactive dye has rendered the disc unreadable. The dual dispense system can also be used to reduce the cost of reactive dye or corrosion materials by reducing the volume of material used per disc.

Bulk Diffusion Control

Figure 21:
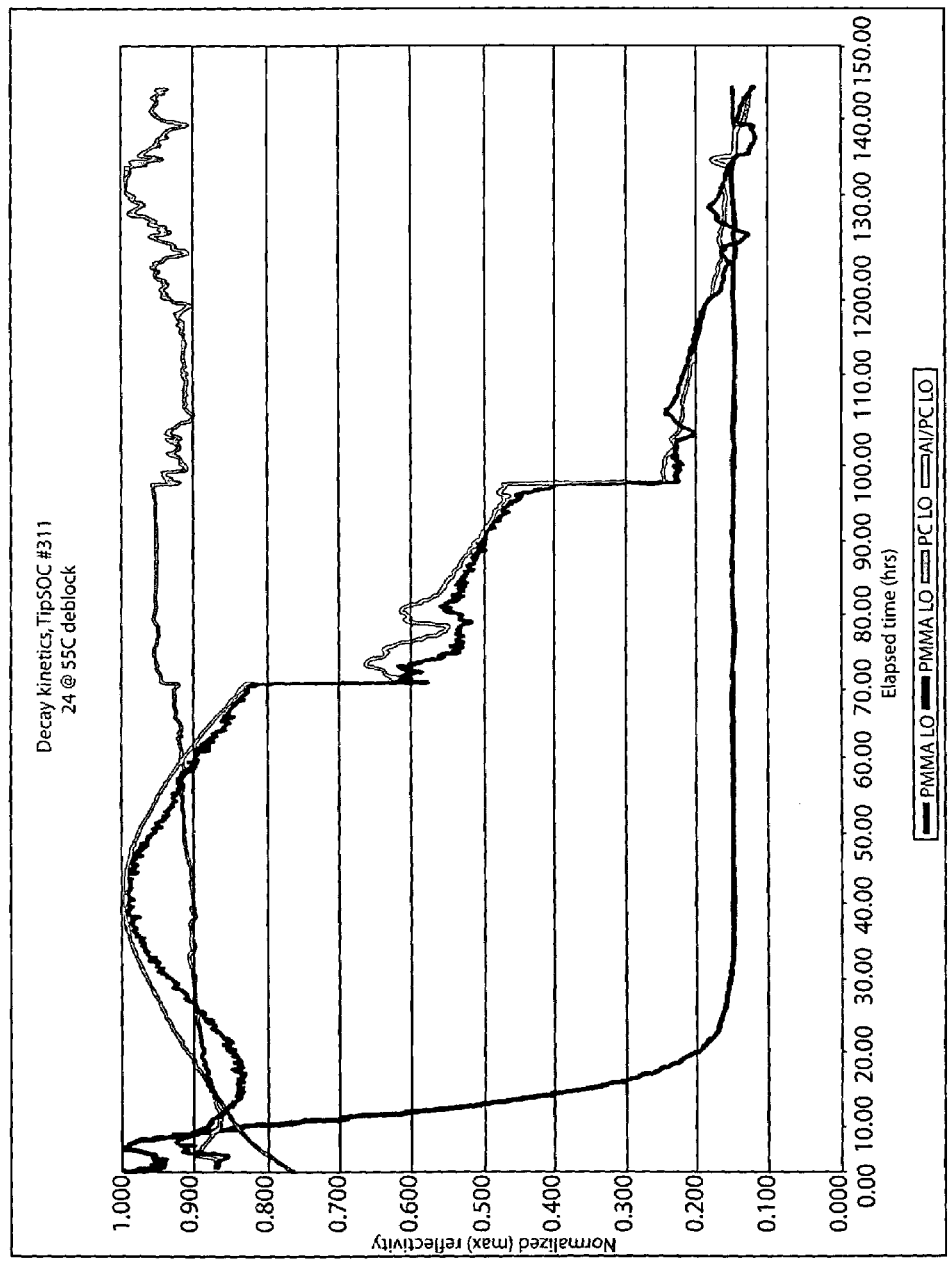
FIG. 21 is a graphic illustrating the decay kinetics of a read inhibiting agent in the presence of various film and/or barrier materials consistent with the present invention.

If disc-edge diffusion is not dominant in the limited-play DVD system, then diffusion rates of the pre-determined stimulus through the assembly will be limited primarily by the normal incidence bulk diffusion rates of the components in the disc assembly. Since diffusion rates through the fully reflective layer (e.g., 60 nm aluminum) are negligible, bulk diffusion through the bottom substrate or L0 substrate coated with a semi-reflective layer and any diffusion barriers applied to that substrate will determine total diffusion rates to the reactive layer. Possible bulk diffusion control mechanisms are described in the following preferred applications:

1) Diffusion limited substrate composition
2) Thin barrier or semi-permeable coating diffusion barrier
3) Thin-film diffusion barrier
4) Inclusion of anti-oxidants in the substrate, reflective, or bonding layers
5) Inclusion of reduction agents in the reactive dye layer or reactive corrosive layer Oxygen Diffusion Limited L0 (DVD-9) or Bottom Dummy (DVD-Inverse 5) Substrate Composition Current optical disc manufacturing utilizes optical grade polycarbonate (PC). Oxygen permeability for polycarbonate is approximately $100^{cc\text{-}mm}/_{m^2\text{-}d}$. Decreasing the oxygen permeability of the L0 or dummy substrate, in conjunction with rapid kinetics of reactive dye bonding resin, allows the product decay kinetics to be limited exclusively by the oxygen permeation rate of the dummy substrate. Discs made with polymethylmethacrylate (PMMA) for instance significantly increased the playtime as the material has a much lower oxygen permeability compared to normal optical grade polycarbonate. The material property is also very stable regarding permeability so that the stability of the product timing is very good and repeatable. The graphs below show readily the extended playtime achievable with changes in the bulk diffusion rate of oxygen as used in an oxygen reactive system with Flexplay reactive dye chemistry:

FIG. 21 illustrates the extended play time using standard PMMA, PC, and a barrier film of aluminum.

Figure 22:
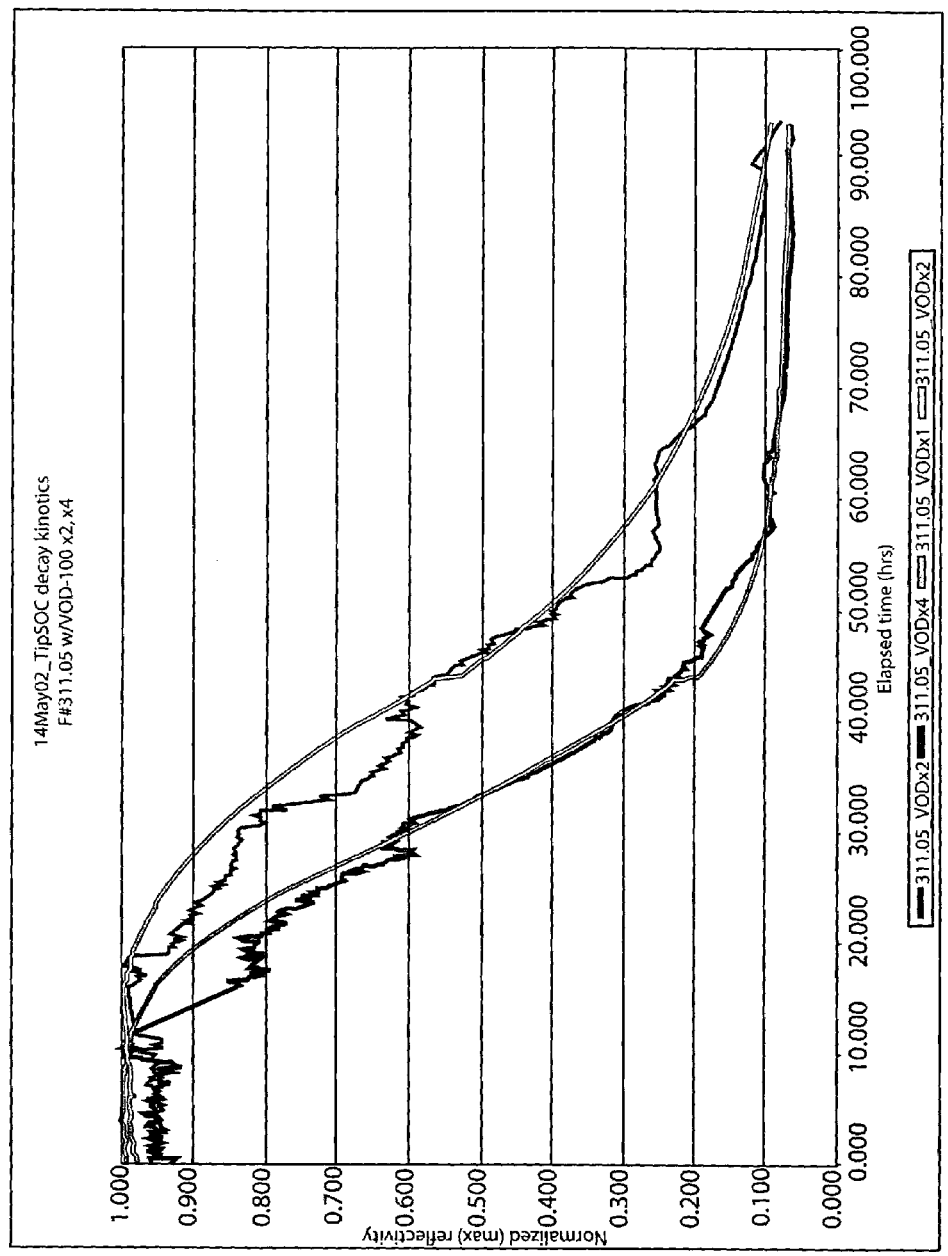
FIG. 22 is a graphic illustrating the decay kinetics of a read inhibiting agent consistent with the present invention.

FIG. 22 illustrates the decay rates of samples made with PMMA substrates with two different permeability rates for oxygen showing the tuning capability of playtime.

Thin Coating Diffusion Barrier

Figure 23:
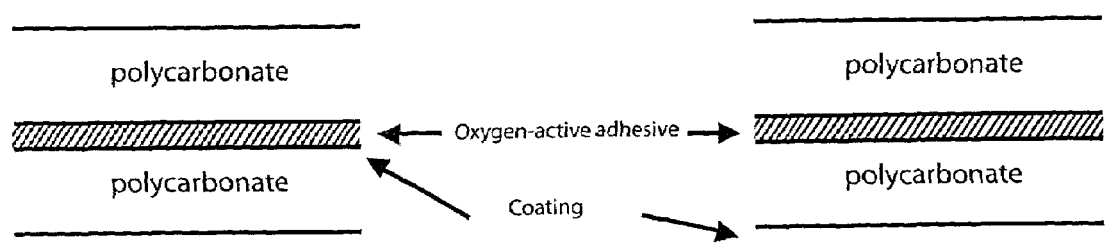
FIG. 23 illustrates two disc cross sections illustrating the placement of barrier films in an optical medium in accordance with the present invention.

Product decay kinetics control can be achieved by applying a thin coating to the internal or external surface of the L0 or dummy substrate. The coating has an index of refraction of approximately 1.55 and a very low optical absorbance at 650 nm. The coating is applied through a spin-coating process with thickness variation no greater than 10% (absolute). The coating thickness and permeability would determine the product decay. A nominal coating thickness of 10 □m should provide the appropriate product decay kinetics for commercially available optical hardcoatings. Anti-oxidants and/or reduction agents can also be integrated within these coatings. FIG. 23 illustrates coatings consistent with the invention.

Thin-Film Diffusion Barrier

Bulk oxygen or other pre-determined stimulus diffusion rates to the reactive layer can be reduced through the application of a thin-film diffusion barrier. The thin-film diffusion barrier can be applied to either the internal or external surface of the dummy or L0 substrate. In essence, the film can be applied to any surface between the environment and the reactive layer. Diffusion rates through the thin-film diffusion barrier can be controlled through film composition, thickness, and morphological structure. A wide variety of materials (metals, metal oxides, etc.) can be used to create the thin-film diffusion barrier, provided that precise deposition techniques such as sputtering or physical vapor deposition could be used to generate consistent barrier films in an optical disc manufacturing environment.

The thin-film diffusion barrier exhibit minimal optical reflection and absorbance for the wavelength used to read the data recorded within the optical media. If applied to the external surface of the substrate, it should also exhibit good mechanical wear and fracture properties.

Example 1 injection-molded 0.62 mm polycarbonate substrate with reverse-mastered DVD5* data features; sputter coated with a fully reflective metallic (aluminum) film: nominally 60 nm thick oxygen-active adhesive material: TipSOC chemistry, rapid kinetics—nominally 10 hour total deblocked life in limited-play DVD without diffusion barrier: nominally 50 □m thick injection-molded 0.56 mm polycarbonate featureless (mirror) substrate; sputter coated with 2 nm aluminum-oxide film (internal surface)

acrylate edge-coating to reduce disc-edge diffusion rates, allowing bulk oxygen diffusion to dominate The sputter coated thin film of aluminum-oxide provides a significant barrier to oxygen diffusion. Oxygen permeation rates to the oxygen-active adhesive are limited by grain-boundary diffusion through the sputter coated aluminum-oxide thin film. For room-temperature diffusion processes, grain boundary diffusion rates are several orders of magnitude faster than bulk diffusion rates. Utilization of ultra-thin metal-oxide films on a mirror surface minimizes the undesired dummy substrate reflections and metallic film optical absorbance, allowing data signal strength from the reverse-mastered substrate to remain within an acceptable operation level.

Preferential Optical Degradation

A limited-play DVD utilizing a thin-film diffusion barrier as described above could be further tailored so that sharp variations in aluminum-oxide sputtered film thickness would generate preferential failure of the limited-play DVD in a "check" region of the DVD program. This preferential failure would prevent content degradation from occurring prior to the expiration of the limited-play DVD by causing disc failure in a "check" region rather than a uniform optical degradation that includes the content region of the DVD.

Optical degradation rates will be significantly affected by slight variations in the thickness of the sputtered thin film diffusion barrier. Those sharp variations in aluminum-oxide film thickness can be obtained by physically masking the selected "check" region of the limited-play DVD. One effective means of obtaining the preferential play failure would be accomplished through using a 48.0 mm diameter center sputtering mask. This masking arrangement would completely cover the lead-in area of the DVD, resulting in a failure to successfully boot or navigate the play menu prior to any content degradation of the viewed product. Another effective method for preferential play failure would utilize a check region in the "lead-out" of the limited-play DVD and reduced diameter o.d. sputtering mask that places the mask radially internal to the physical location of the "lead-out" check region.

Example A injection-molded 0.62 mm polycarbonate substrate with reverse-mastered DVD5* data features; sputter coated with a fully reflective metallic (aluminum) film: nominally 60 nm thick oxygen-active adhesive material: TipSOC chemistry, normal kinetics—nominally 30 hour total deblocked life in limited-play DVD without diffusion barrier: nominally 50 □m thick injection-molded 0.56 mm polycarbonate featureless (mirror) substrate; sputter coated with 2 nm aluminum-oxide film (internal surface), i.d. sputtering mask 48.0 mm diameter Example B injection-molded 0.62 mm polycarbonate substrate with reverse-mastered DVD5* data features; sputter coated with a fully reflective metallic (aluminum) film: nominally 60 nm thick oxygen-active adhesive material: TipSOC chemistry, rapid kinetics—nominally 10 hour total deblocked life in limited-play DVD without diffusion barrier: nominally 50 □m thick injection-molded 0.56 mm polycarbonate featureless (mirror) substrate; sputter coated with 2 nm aluminum-oxide film (internal surface)—i.d. sputtering mask at 30.0 mm diameter; secondary sputter coating, nominal 2 nm aluminum-oxide film—i.d. sputtering mask at 48.0 mm diameter Authoring A limited play optical device becomes unreadable over time (e.g., 1-5 days), typically following some stimulus, such as exposure to oxygen. In embodiments of the present invention, The optical device is designed and authored, or the reading device is programmed, so that the reading device to read from a desired region before playing the rest of the content on the disc. If information in that region, referred to here as a "check region," is unreadable, the player will not read from the rest of the medium. This system is preferably used with discs that become unplayable over time (e.g., in a few days) and is particularly useful where the disc becomes unplayable not all at once but progressively.

The check region is preferably provided in a place where the disc would be expected to become unreadable earlier than most other regions. In the case of a disc that becomes unreadable over time in the presence of oxygen, the check region could be at an outer peripheral region. By checking the playability of the check region and preventing play if the check region is unplayable, the situation of having a partially playable but deteriorated disc is reduced or avoided. Authoring tools can be used to cause the check region to be read first, and to cause the reader to generate an error indicating that the disc is not readable. The reader could be programmed or modified to accomplish this result.

DVD authoring describes the process of creating a DVD video that can be played on a DVD player. DVD authoring software must conform to the specifications set by the DVD Forum group in 1995, and as they evolve from time to time to preserve maximum player compatibility. The specifications are complicated due to the number of companies that were involved in creating them.

Examples of authoring vendors include Apple, Authoringware, Avid, Blossom Technologies, Canopus, Daikin, DreamCom, DV Studio, Futuretel, Houpert Digital Audio, InnovaCom, Intec America, InterVideo, Margi Systems, Matrox, Mediachance, Microboards, Minerva, Minnetonka Audio Software, MTC, NEC, Nero, Optibase, Panasonic, Pegasys, Pinnacle, Philips, Pioneer, PixelTools, Q-Comm, Roxio, SADie, Sonic Solutions, Sony Media Software, Sony Professional, Spruce Technologies, Ulead, Visible Light, and Vitech.

Corrosion

In the embodiments of the present invention, optical media is disclosed wherein access to encoded information therein is limited by affecting the reflectivity of the semi-reflective and/or reflective layers. In optical disc media, the reading laser must be reflected back to the read optics by these reflective layers so that the encoded information stored thereon can be read. Depending on the layer (i.e., single or dual layer discs), the reflective material can be sensitive to the wavelength of the read laser. The reflective layer can be any metal, combination of metals, reflective dielectric film or films (e.g. SiN) or other reflective material capable of undergoing the required/desired redox reaction in the presence of oxygen or after the addition of oxygen to the system. Metallic reflective layers are much less sensitive to laser wavelength while dielectric films can be created which will be transparent at one wavelength while reflecting another. Both types of reflective layers can be used in optical media. Within the DVD, HD-DVD, and Blu-ray specifications, reflective layers are typically metallic and potentially subject to corrosion effects. The chemistry and examples described in the following section are independent of the read laser wavelength and will provide limited-play capabilities via corrosive destruction in all optical media formats that utilize metallic reflective layers including DVD, HD-DVD, and Blu-Ray.

The reflective layer can be irreversibly altered by oxidation or destruction of its reflective properties as a result of pitting, corroding, dissolution, etc., or any combination of these. (See U.S. Pat. Nos. 6,434,109, 6,343,063, 6,011,772, 6,641,886, 6,511,728, 6,537,635, 6,678,239, 6,756,103, and 5,815,484 and U.S. Patent Application Nos. 20030152019, 20030123379, 20030123302, 20030213710, 20030129408, 20030112737, 10/649,504, 10/162,417, 10/163,473, 10/163,855, 10/163,472, 10/837,826, 10/163,821, 10/651,627 and 20010046204, hereinafter incorporated by reference in their entirety.). It should be pointed out that it is not essential in all applications that the interfering layer covers an entire surface of the disc. It may be only necessary to inhibit the reading of areas containing critical information content. Various patents instruct that this reactive layer can be applied to the disc at several locations (on the surface of the disc, on the surface of the reflecting layer itself, in the adhesive, etc. see patents above) using a variety of techniques and can undergo the change from non-interfering to interfering in response to various stimuli including oxygen see U.S. Pat. Nos. 6,434,109, 6,343,063, 6,011,772, 6,641,886, 6,511,728, 6,537,635, 6,678,239, 6,756,103, and 5,815,484 and U.S. Patent Application Nos. 20030152019, 20030123379, 20030123302, 20030213710, 20030129408, 20030112737, 10/649,504, 10/162,417, 10/163,473, 10/163,855, 10/163,472, 10/837,826, 10/163,821, 10/651,627 and 20010046204, hereinafter incorporated by reference in their entirety.

It was desirable to determine the extent of corrosion of the semi-reflective layer (L0) of optical media resulting from its exposure to various corrosive agents under a variety of physical and chemical conditions. Simulated DVD-9 discs were made using bonding agents that contained the potentially corrosive materials of the present invention, a polycarbonate blank with a typical silver L0 layer, and a polycarbonate blank with no highly reflective layer (L1). These discs were made in this way so that visible-NIR light transmission of the thin L0 silver layer could be monitored; an increase in optical transmission indicates the dissolution or removal of the reflective metallic silver layer as a result of the action of the corrosive agents of the present invention. Using this spectrophotometric method it was possible to evaluate the efficacy of corrosive agent variables such as corrosive agent concentration, reflective silver layer (L0) thickness, adhesive composition, atmospheric composition, and the addition of kinetic regulators.

Figure 24:
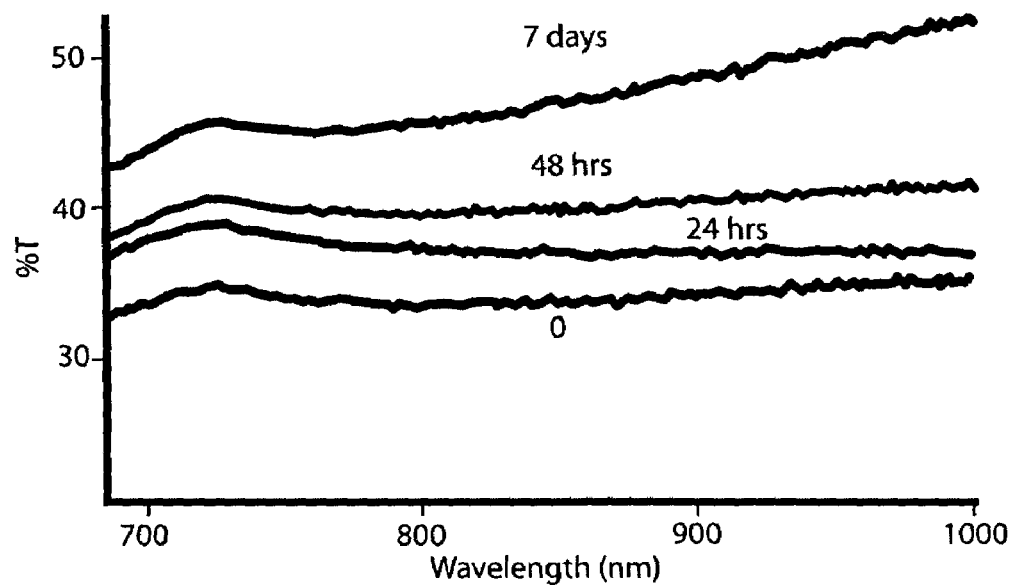
FIG. 24 is a graphic illustrating the optical transmission of the L0 substrate with 1% MBI consistent with the present invention.
Figure 25:
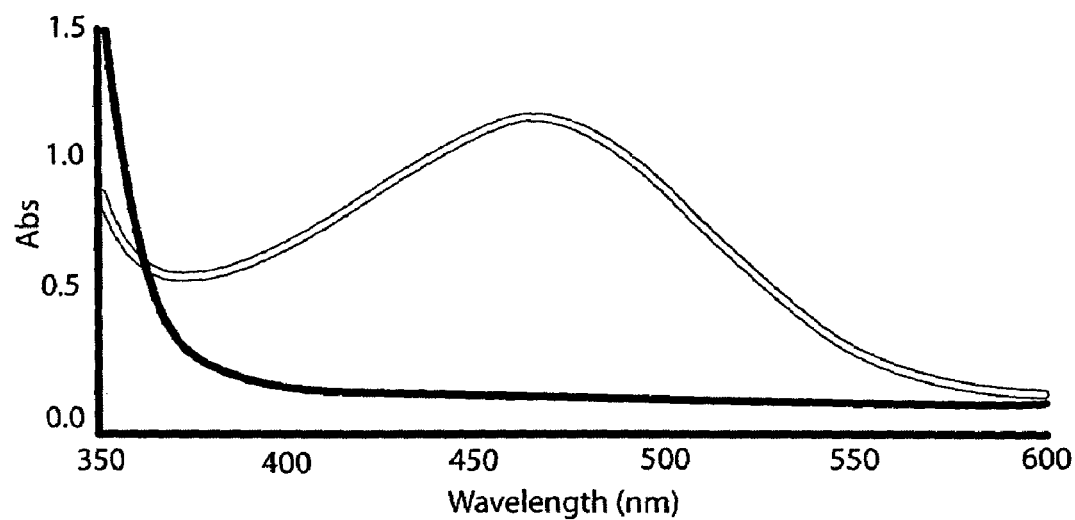
FIG. 25 is a graphic illustrating the optical density of the adhesive in accordance with the present invention.
Figure 26:
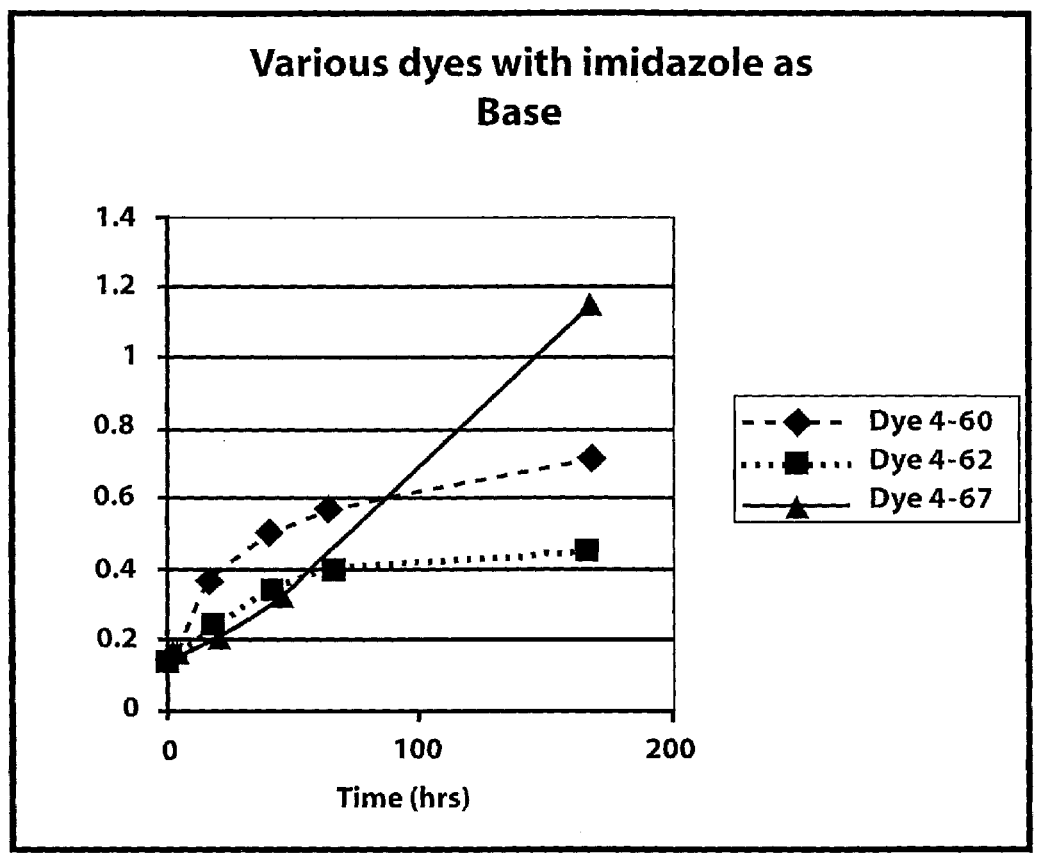
FIG. 26 is a graphic illustrating the optical density of read inhibit agents measured at a preselected wavelength consistent with the present invention.
Figure 27:
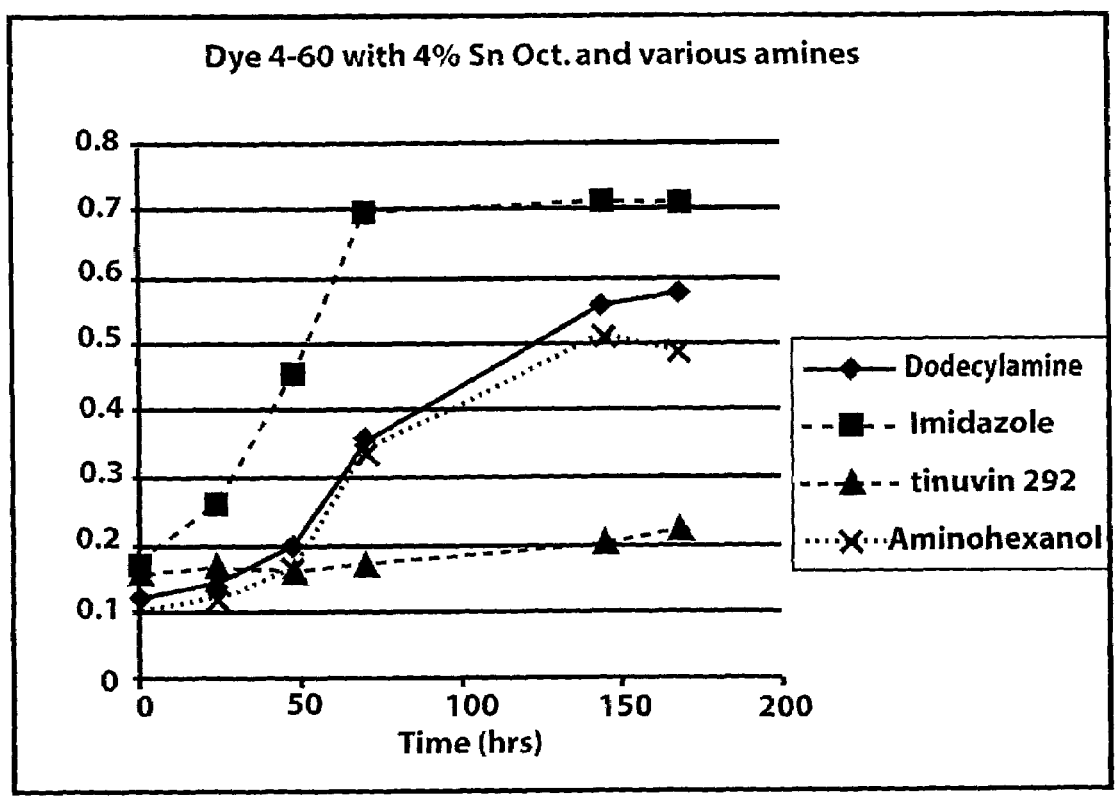
FIG. 27 is a graphic illustrating the absorbance of select read inhibiting agents measured at a preselected wavelength consistent with the present invention.

Bonding agent formulations which contained 1.0% of the test corrosive agent were used to prepare the simulated DVD-9 discs described above. The particular bonding agent of this test contained greater than 50% by weight of polyethylene oxide moieties in order to provide some polar character to the reaction matrix. Initial readings of the transmission of the discs were made on a Cary 50 Scan UV-Visible Spectrophotometer and the discs were then stored in the dark at ambient temperature and humidity. Readings were made periodically over a 7 day period. FIG. 24 represents typical transmission spectra of the L0 layer of the simulated DVD-9 disc that contained MBI in the bonding agent over this 7 day time period; the increasing % T over time is indicative of a loss of silver metal layer as a result of corrosion.

From the sulfur containing agents shown below, MBI was selected as the most reactive corrosive agent with current bonding agent formulations. Results of these tests are shown in TABLE 1. The less reactive materials in this test may prove more effective with changes in the bonding agent chemistry.

TABLE I

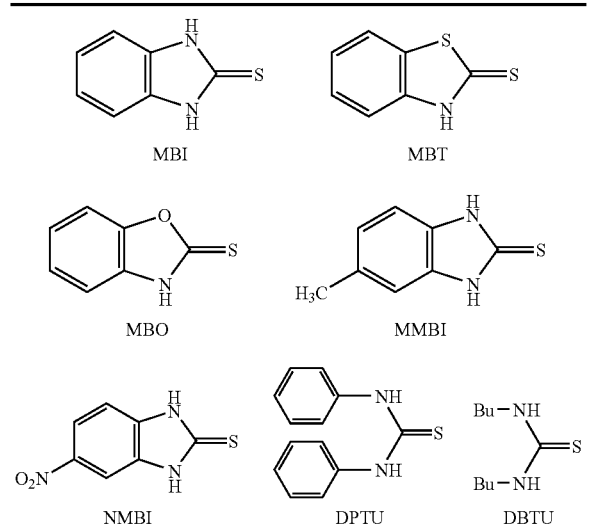

Comparison of the increase in light transmission at 1000 nm that occurred after 48 hours of ambient air storage of the simulated DVD-9 discs that contained the various sulfur containing agents in the bonding agent layer.

| | Corrosive Agent | % Increase in Transmission @ 1000 nm after 48 hours in air |
|---|---|---|
| MBI | 2-Mercaptobenzimidazole (CAS 583-39-1) | 8 |
| MMBI | 2-Mercapto-5-methylbenzimidazole (CAS 27231-36-3) | 5.6 |
| DPTU | N,N-Diphenylthiourea (CAS 102-08-9) | 4.8 |
| MNBI | 2-Nitro-5-methylbenzimidazole (CAS 6325-91-3) | 3.4 |
| MBT | 2-Mercaptobenzothiazole (CAS 149-30-4) | 0.8 |
| DBTU | N,N-Dibutylthiourea (CAS 109-46-6) | 0.7 |
| MBO | 2-Mercaptobenzoxazole (CAS 2382-96-9) | 0 |

Another quick screening method for the ability of various agents to corrode the L0 silver layer was used. Drops of SR495 containing 1% to 2% of the test agents were placed on the metal surface of a standard semi-reflective L0 silver coated substrate and observed over a 24-72 hour period while exposed to air. Changes in the appearance of the silver layer as well as its adhesion to the polycarbonate substrate were noted over time and compared to appropriate controls. The following table describes the corrosion effects that were observed.

| Test Additive | Effect on Silver Reflectivity |
|---|---|
| Control (no additive) | no effect, fully reflective silver remains after 72 hrs. |
| MBI | blackish at 1-2 hrs, silver dissolved in ~4 hrs |
| Dithiothreitol | dissolved silver in <24 hrs |
| Mercaptothiazoline | blackish discoloration |
| 3-Mercapto-1,2-propanediol | blackish discoloration |

-continued

| Test Additive | Effect on Silver Reflectivity |
|---|---|
| Cysteine methyl ester HCl | black/bronze discoloration with clearing in 72 hrs |
| Dimethylaminoethanethiol HCl | blackish discoloration with some clearing of silver |

These compounds are also known as "bleaching accelerators" in the photographic industry (U.S. Pat. Nos. 3,893,858; 4,865,956, herein incorporated by reference in their entirety) where they are used in conjunction with oxidizing agents to accelerate the oxidation of silver during the development of color photographic images. Therefore, the above type compounds were also tested in combination with the following benzoquinone oxidants and their reduced precursors to evaluate their ability to corrode the L0 silver layer. The "limited play" format may thus be further controlled in its timing characteristics by utilization of the inactive hydroquinone precurser in the manufacture of the DVD disc; subsequent exposure to air will generate the active benzoquinone oxidant at the proper time. Combinations of the following compounds with the above thiols appeared to improve/accelerate their ability to oxidize the silver layer in the test described above: 2,5-Di-t-amylhydroquinone (Lowinox AH25); 2,5-t-butylhydroquinone; 2,5-t-Butylbenzoquinone; 2,5-Dichlorohydroquinone; 2,5-Dichlorobenzoquinone; 2,3-Dicyanohydroquinone; and 2,3-Dicyanobenzoquinone. Also tested were imidazole, benzimidazole, benzotriazole, mercaptobenzimidazole, and 1-phenyltetrazole-5-thiol, as these were also described as bleach accelerators. Combinations of imidazole and the hydroquinones appeared particularly effective in dissolving the silver layer.

In the embodiments of the present invention, a corrosive agent is used to inhibit the reading of the encoded optical data layer via oxygen initiated corrosion of the reflective layer. The corrosion results in the destruction of the reflective layer to such an extent that the film no longer has sufficient reflectivity to support the optical reading of the reflective film by a conventional player. The corrosion reaction of the present embodiment involves the utilization of sulfur compounds, and, in particular thioureas, the leading example of which is 2-mercaptobenzimidazole (2-MBI, Sigma-Aldrich Catalog #M320-5, Milwaukee, Wis. 53201) which has the ability, in the presence of oxygen, to corrode reflective thin silver layers as are typically found within optical media. It has been demonstrated that stable high quality optical media can be manufactured containing 2-MBI in the bonding agent with standard replicating equipment when the completed discs are stored in a suitable oxygen free atmosphere and that said discs become unplayable within a predetermined time period after being exposed to ambient air.

Example 1

DVD-9 discs were made with silver L0 and L1 layers, both on "low gas permeation" polycarbonate utilizing bonding agents that had the following compositions; Formulation A was a control that contained no 2-MBI, Formulation B contained 0.25% 2-MBI, and Formulation C contained 0.5% 2-MBI. Common to all three formulations were the following materials: SR415 and SR495 (monomers, Sartomer Company, Inc.; Exton, Pa. 19341), and Irgacure 819 (photoinitiator, Ciba Specialty Chemicals, Tarrytown, N.Y. 10591).

| | Weight, grams | | |
|---|---|---|---|
| Component | A | B | C |
| SR415 | 201.0 | 201.0 | 201.0 |
| SR495 | 201.0 | 201.0 | 201.0 |
| IC819 | 7.70 | 7.70 | 7.70 |
| 2-MBI | | 1.025 | 2.05 |

Immediately after manufacture, the DVD-9 discs were sealed in plastic packages containing oxygen scavenger material as described in previous patent applications (see U.S. patent application Ser. No. 10/162,417, hereafter incorporated by reference in its entirety). To demonstrate the oxygen dependence of the limited play mechanism of the present invention, playability comparisons were made between discs that had been opened and stored in air and those that remained in the oxygen free packages and played as soon as they were opened; storage temperatures were room temperature and 60° C. The discs were periodically tested for playability on a typical DVD player (Samsung DVD P-231). The discs were considered to have failed when the player would not recognize that disc (boot failure). Results are shown in the following table.

| | Days Storage until Boot Failure | | | |
|---|---|---|---|---|
| | 60° C. | | RT (20° C.) | |
| Formulation | air | cryovac | air | cryovac |
| A: 0% MBI | >60 | >30 | >90 | >90 |
| B: 0.25% MBI | <3 | >14 | 20 | >77 |
| C: 0.50% MBI | <3 | >14 | 17 | >77 |

It will be noted that the above table provides evidence of the oxygen dependence of the limited play corrosion based system and the dependence of the corrosion rate on the concentration of MBI.

Example 2

Further work has shown that playtime failure is strongly dependent on the thickness of the L0 silver layer. DVD-9 discs were made with standard DVD grade polycarbonate using a bonding agent that was made up by blending 486 grams of SR415 (Sartomer Company, Inc.), 486 grams of SR495 (Sartomer), 18.6 grams of Irgacure 819 (Ciba Specialty Chemicals), and 10.0 grams of 2-mercaptobenzimidazole (2-MBI, Sigma-Aldrich). The thickness of the L0 silver layer of this set of discs was varied and characterized by reflectivity values from 16% R14H to 24% R14H. As described in Example 1, the discs were manufactured, stored in oxygen-free bags which were opened at the start of playtime testing, and tested on a typical DVD player. Playtime failure was determined as the number of elapsed hours from the time the discs were removed from the oxygen free bags to the time that the discs could not be recognized by the DVD player. These results are shown in the following table as two values: Last Hour Played (the last hour that the disc was successfully played)/First Hour of Boot Failure (the first hour that the disc could not be played).

| Storage Hours in Air to Boot Failure Last Hour Played/First Hour of Boot Failure | | | |
|---|---|---|---|
| 16% R14H | 18% R14H | 21% R14H | 24% R14H |
| 20/35 | 28/47 | 52/69 | 96/336 |

The table shows increasingly longer playtimes in the discs with the more reflective, and thus thicker, L0 silver layers.

The increased ease of silver oxidation in the present invention may be attributed to several features of the combination of the thin silver L0 coating and the chemical properties of mercaptans like MBI. The binding of MBI to the silver surface lowers the redox potential of the silver making it easier to undergo air oxidation (Tarasankai Pal, Current Science, 83, 627-628 (2002)). It also complexes with the generated oxidized form of silver, helping to maintain the low oxidation potential in the face of increasing silver ion concentrations (G. I. P. Levenson, "*The Theory of the Photographic Process 4th Edition*" chapter 15, T. H. James (ed.), Macmillan publishing Co. Inc., New York, 1977; U.S. Pat. No. 5,641,616 and references therein). In addition, heterogeneity in the thin silver L0 layer can lead to areas favoring increased air oxidation (Pal (2002), Wei Ping Cai et. al., J. Appl. Phys., 83, 1705-1710 (1998)). The fact that MBI is reportedly used as an antioxidant in the manufacture of industrial rubber (Zenovia Moldovan, Acta Chim. Slov., 49, 909-916 (2002); U.S. Pat. No. 5,666,994, herein incorporated by reference in its entirety) and as an agent to inhibit corrosion of brass and copper (Assouli et. al., Corrosion, 60, 604-612 (2004); Robert B. Falterrneier, Studies in Conservation, 44, 121-128 (1999)) supports our contention that the observed corrosion effects in our system are not expected. In addition, MBI has been used as a corrosion inhibiting agent in radiation curable compositions for optical media (U.S. Patent Application US 2003/0008950 A1, herein incorporated by reference in its entirety).

The chemical nature of the monomers and additives that are utilized to formulate the bonding agents of the present invention has an important effect on the rate of corrosion of the silver layers. Since it is well known that rates of redox reactions in polymer media are strongly dependent on the amount of humidity (water) present, the incorporation of water attracting materials and monomers has been found to be of advantage. In particular, the utilization of highly ethoxylated monomers has been found to be particularly advantageous. Examples of these monomers include CD9038, bisphenolA diacrylate with 30 units of ethylene oxide; SR415, trimethyolpropane triacrylate with 20 units of ethylene oxide; SR610, polyethylene glycol 600 diacrylate; and SR344, polyethylene glycol 400 diacrylate (all available from Sartomer Co.). The cured bonding agents containing MBI typically show increased corrosion rates, and thereby shorter limited life playtimes, as the concentration of ethylene oxide moieties is increased from about 5% by weight up to as high as 80% by weight. The preferred level of ethylene oxide is above 50% by weight. Additives and monomers that contain other hydrophilizing groups such as hydroxyl, carboxyl, amides, and amines, and various salts may also utilized both alone and in combination with others. This listing of hydrophilic moieties is not all inclusive and those skilled in the art may combine a wide variety of hydrophilic functionalities, both polymerizable and non-polymerizable, in order to balance the corrosion rates with the physical robustness of the limited play disc.

Another means of controlling the rate and timing of the corrosion reactions is via the addition of reducing agents. These reducing agents will, after the optical media is exposed to the atmosphere, preferentially react with the initial influx of oxygen until the reducing agent is consumed, at which point the corrosive agent will become active in causing destruction of the reflective properties of the metal layer(s). As an alternative explanation, the reducing agent may cause the active corrosive materials to exist in a lower oxidation state which is inert to the reflective metal; after the reducing agent is consumed, the corrosive agent precursor is converted (oxidized) by air to form the corrosive material. The following example utilizes tetrachlorohydroquinone (TCHQ) as a non-corrosive precursor in the bonding agent; after exposure to oxygen, TCHQ is oxidized to the benzoquinone form which has a higher oxidation potential and thus is more able to oxidize the reflective silver layers. As an alternative proposed corrosion mechanism, it is also possible that the benzoquinone form releases chloride ion which is known to cause corrosion of metal layers in optical media.

Example 3

The use of reducing agents has been successfully used to control the oxidation of silver layers by tetrachlorohydroquinone (TCHQ) in the bonding agent of the optical media. DVD-9 discs were made with Formulations D and E which contained TCHQ alone and TCHQ in combination with ascorbic acid.

|  | Weight, grams Formulation# | |
| --- | --- | --- |
| Component | D | E |
| SR415 | 97.88 | 97.63 |
| SR495 | 97.88 | 97.63 |
| IC819 | 3.74 | 3.74 |
| TCHQ | 0.50 | 0.50 |
| Ascorbic Acid |  | 0.50 |

The discs were equilibrated in the absence of air as previously described for one week and then opened and stored in air in a wet chamber to accelerate the corrosion reactions. The discs were tested for playability as described in Example 1; the increased playtime of formulation E is a result of the presence of ascorbic acid:

| Formulation | Last Day of Play | First Day of Boot Failure |
| --- | --- | --- |
| D | 2 | 3 |
| E | 6 | 10 |

Similar effects of increased playtime have been observed using ascorbyl palmitate and stannous octanoate as reducing agents. Many other reducing agents as described in U.S. patent application Ser. Nos. 10/163,473, 10/163,855, 10/163,472, 10/837,826, 10/163,821, 10/651,627 and U.S. Pat. No. 6,756,103, all hereafter incorporated by reference in their entirety, may be applicable here in varying formulations as may be formulated by those skilled in the art.

Stannous octanoate has been found to be the preferred reducing agent for the control of the corrosion based limited-play timing mechanisms of the present invention, but has the unfortunate ability to occasionally cause premature polymerization of typical monomer mixtures. To prevent this, the addition of increased levels of polymerization inhibitors, such as hydroquinones, has allowed the formulation of corrosive bonding agents that exhibit stable viscosities for up to several days in the presence of the stannous salt. The preferred hydroquinone is 2,5-di-tert-pentylhydroquinone (Lowinox AH250, Great Lakes Chemical Corporation, West Lafayette, Ind.) used at a 0.10% to 1.0% by weight concentration and preferably between 0.2% to 0.5% by weight concentration. Another compound that has shown success in controlling viscosity of monomer formulations in the presence of stannous salts is phenothiazine (CAS 92-84-2; Sigma-Aldrich Cat. No. P14831) when used at similar levels as Lowinox AH25 above.

An additional problem that arises in the use of stannous octanoate with the hydrophilic monomer mixtures that are preferred in the time-controlled corrosive bonding agent systems described above is the formation of hazy mixtures. Presumably, this is a result of poor solubility of the stannous salt in the predominantly polyethylene oxide containing mixture. We have found that clear solutions are formed when stannous octanoate is first dissolved in tripropylene glycol (TPG, CAS 24800-44-0; Sigma-Aldrich Cat. No. 187593). Since TPG is not expected to copolymerize within the cured bonding agents and may exhibit undesirable syneresis, tests were done on peeled discs at 60 C in order to accentuate the observation of any possible exudation of liquid; no syneresis or exudation was observed under these conditions when TPG was incorporated at levels up to 10% by weight of the cured bonding agent.

Example 4 demonstrates that the incorporation of TPG also has a beneficial effect on maintaining a high corrosion rate of silver metal layers in DVD-9 discs even when stored in air under low humidity conditions. Stannous octanoate was pre-dissolved in varying amounts of TPG and combined with Stock Solution F to make Bonding Agents G, H, and I. The resulting bonding agents contained 2.7%-3% MBI, 0.25% stannous octanoate and 0%, 5%, and 10% by weight TPG.

| Stock Solution F | | |
| --- | --- | --- |
| Component | Weight, grams | % by Weight |
| CD9038 | 540 | 54.00% |
| SR238 | 175 | 17.50% |
| SR495 | 142.5 | 14.25% |
| SR440 | 100 | 10.00% |
| Lowinox AH25 | 2.5 | 0.25% |
| IC819 | 10 | 1.00% |
| MBI | 30 | 3.00% |

|  | Formulation # Weight, grams | | |
| --- | --- | --- | --- |
| Component | G | H | I |
| Stock Solution F | 249.38 | 236.88 | 224.38 |
| TPG | 0 | 12.5 | 25 |
| Stannous Octanoate | 0.625 | 0.625 | 0.625 |

DVD-9 discs were made as described above in Examples 1 and 2; L0 thickness was quantified by a 24% R14H reflectivity and standard grade polycarbonate was used. The discs were stored in oxygen free bags for 4 days, then opened and stored in air at room temperature under the three different humidity conditions, dry (one gallon polyethylene container with desiccant packages), ambient (open to room air), and wet (one gallon polyethylene container with wet paper towels on the bottom). The results shown below as Average Playtime were determined as the midpoint between the last day that the disc was observed to play and the first day that the disc would not boot on the Samsung DVD Player.

|  |  | Average Playtime, Days | | |
|---|---|---|---|---|
|  |  | G 0% TPG | H 5% TPG | I 10% TPG |
| Air Storage Condition | Dry (<10% RH) | 17.5 | 12.5 | 9 |
|  | ambient | 5 | 3.5 | 3.5 |
|  | 100% RH | 2.5 | 2.5 | 2.5 |

These results show that increasing the TPG level has the benefit of reducing the variation in limited playtime between high and low humidity conditions.

Dye Compounds as Reactive Material and/or Read Inhibiting Agents

The reading laser wavelength for HD-DVD and Blu-ray discs has changed from standard CD (780 nm) and standard DVD (650 nm) optical media to 405 nm. In order to block the blue laser wavelength, the present invention discloses a group of reactive materials that exhibit absorptive properties at the 405 nm frequency. In addition to dyes that can simply absorb the read laser wavelength, dyes that can be both reduced to the colorless leuco-form as well as be re-oxidized by oxygen to the colored form or change absorption characteristics when exposed to a triggering stimulus can also be used. It is also desirable, but not necessary, that the reduced free dye (e.g., leuco dye) responds to a mechanism for controlling the rate of oxidation (e.g., the re-oxidation of leuco methylene blue (i.e., leuco dye) can be controlled by a reducing agent such as stannous octanoate. (US 2004/0137188 A1 herein incorporated by reference in its entirety).

One embodiment consistent with the present invention comprises the use of a chemically blocked and/or modified and/or protected reactive dye(s) in the reactive layer. These compounds will de-block within a predetermined time period after the disc is manufactured or packaged, and typically before the disc is used by the consumer. This is desirable when the stimulus that triggers the reaction that causes the disc to become unplayable (e.g., atmospheric oxygen) can trigger this reaction during the manufacturing of the disc, and thus measures need to be taken so that the reactive compound is not activated during the manufacturing of the disc. For example, in the case of oxygen triggered reactions, unless a blocked form of the reactive compound is used, manufacturing may need to take place in an oxygen free environment, such as a nitrogen atmosphere.

Specific exemplary blocked dyes and methods of preparing leuco-dye precursors are disclosed. Adhesive compositions which permit the de-blocking and oxidation of the leuco dye precursors at acceptable rates and methods of applying dyes and dye precursors to optical discs both on the surface of optical discs and as bonding layers for optical discs are disclosed (see previous patents for methods).

Also disclosed is the use of basic materials to increase the rate of de-blocking of the protected leuco dye precursors in blocked leuco dye-containing layers in or on optical discs.

Classes of dyes available for use in Blu-ray include for example, but are not limited to, azomethine dyes, acridines, styryl type dyes, cyanine dyes, oxonols, merocyanines, anthraquinones, naphthoquinones, quinoneimines, diaryl and triarylmethane type dyes, phenazine dyes, thiazine dyes, oxazine dyes, coumarin type dyes, and polyhydroxybenzenes or aminophenol derivatives. Preferred classes of these dyes are shown below. These structures are not intended to be all inclusive but to serve as examples of useful dye classes. Members belonging to these dye-classes are reduced easily, can be air oxidized, and either absorb in the desired spectral window of 400-450 nm for blocking the reading laser or slightly further to the red. The fact that their maximum absorption peak is not exactly in the effective window is not a problem as long as their absorption curves are broad and increased concentrations lead to the desired coverage in the window.

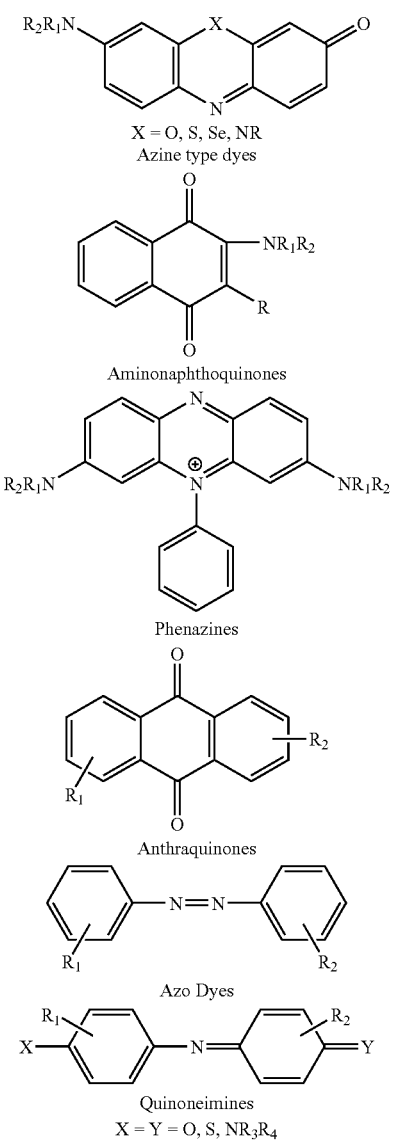

As an example, the following synthetic scheme starting with the well known phenothiazinone dye, methylene violet, leads to a reduced and blocked compound that after de-blocking leads to air oxidation and regeneration of the starting dye. This process is similar to that described in U.S. patent application Ser. Nos. 10/163,473, 10/163,855, 10/163,472, 10/837,826, 10/163,821, 10/651,627 and U.S. Pat. No. 6,756, 103, all hereafter incorporated by reference in their entirety, which describes the process for using methylene blue in 650 nm DVD applications. The methylene violet dye has a broad absorption peak at 580 nm with a strong secondary peak at 470 nm. At reasonable concentrations, it can provide good absorption in the 400-450 nm window.

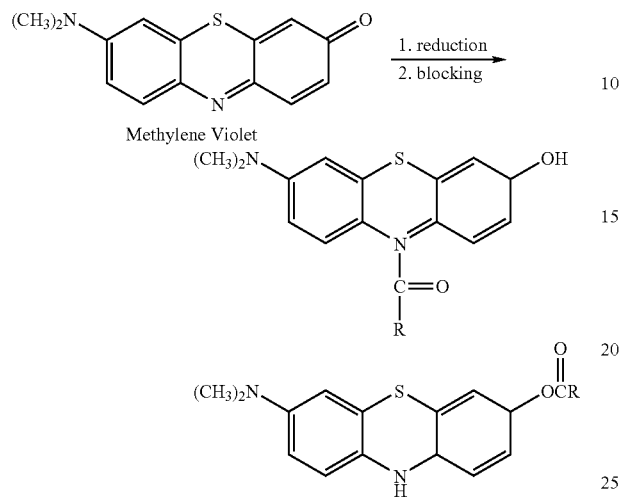

Methylene Violet

The compound has the added benefit that two blocked colorless forms of the dye can be made which are stable to air oxidation, but following de-blocking yield the leuco-form of the dye which rapidly air oxidizes to the colored form.

As stated above, other potential chromophores for use are the quinoneimines, including indamines, indophenols, and indoanilines, such as those disclosed in U.S. Pat. No. 5,424,475, herein incorporated by reference in its entirety.

Specific Examples

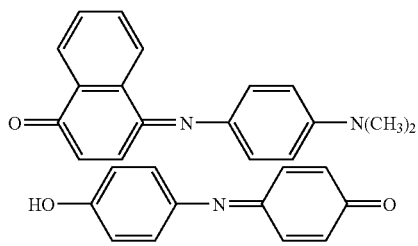

The quinoneimines along with the naphthoquinone and anthraquinone dyes are further described in the literature at M. Matsuoka, et al., *J. Soc. Dyers Colour,* vol 103, p 167 (1987) and "Chemistry and Applications of Leuco Dyes", chapter 2, edited by Ramaiah Muthyala, Plenum Press, NY (1997)

Specific Examples:

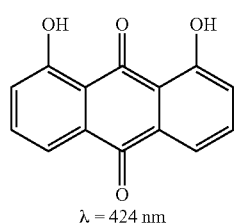

$\lambda = 424$ nm

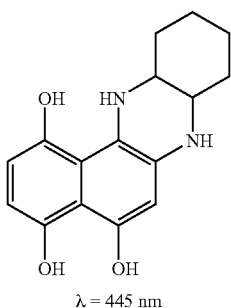

$\lambda = 445$ nm

Diarylmethane and triarylmethane dye types, such as those disclosed in U.S. Pat. No. 5,330,864 and herein incorporated by reference in its entirety, are also potentially useful for this application and include for example:

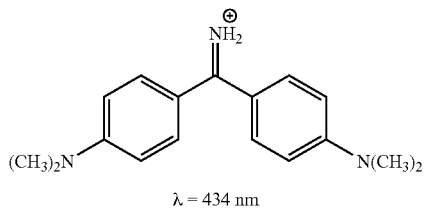

$\lambda = 434$ nm

Although it usually requires a strong oxidant to oxidize the reduced form of this type of dye, there are some that can be air oxidized in the presence of catalyst and light.

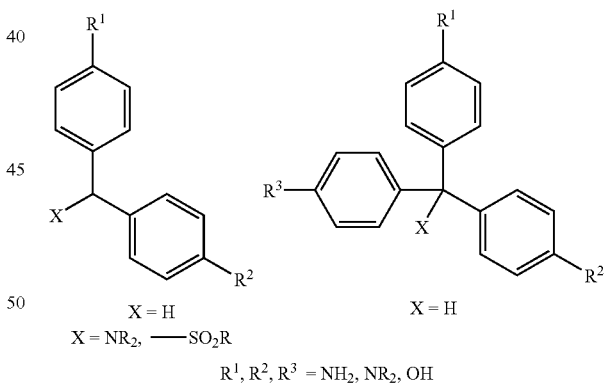

$X = H$
$X = NR_2, \text{—} SO_2R$ $X = H$ $R^1, R^2, R^3 = NH_2, NR_2, OH$

Further information can be found in the literature such as: Chemistry and Applications of Leuco Dyes", chapter 5, edited by Ramaiah Muthyala, Plenum Press, NY (1997)

Oxazine, thiazine, and phenazine dye types are also appropriate for the application in blue laser optical disc formats. Leuco forms of all these type dyes are known. Phenazines may be especially useful since they generally absorb close to the desired region. Derivatives of thiazine and oxazine dyes are known that are close enough to the desired region so that high concentrations give coverage.

General Structure of these Dyes:

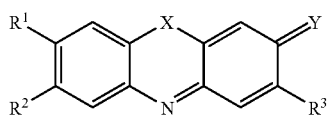

Where R1, R2, R3 is $NZ_2$, NHZ, hydrogen, alkyl, aryl, alkoxy, halogens, hydroxyl, CN, substituted thiols, SO2 alkyl, SO2 aryl, CO2 alkyl, or CO2 aryl, where alkyl and aryl can be substituted and may include atoms necessary to complete an aromatic or acyclic ring system, which may contain heteroatoms and substitution, where Z can be selected from the group of hydrogen, alkyl, aryl, alkoxy, substituted alkyl, alkoxy, and aryl, substituted alkyl, alkoxy, and aryl, SO2 alkyl, SO2 aryl, CO2 alkyl, or CO2 aryl, where alkyl and aryl can be substituted and may include atoms necessary to complete an aromatic or acyclic ring system, which may contain heteroatoms and substitution.

Where X is selected from NZ, O, S, N, or Se.
Where Y is selected from O or NR.

Specific Example:

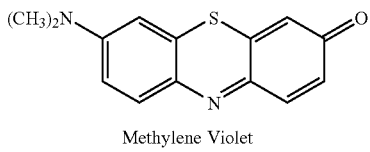

Methylene Violet

Further descriptions of these dyes are included but not limited to "Chemistry and Applications of Leuco Dyes", chapter 3, edited by Ramaiah Muthyala, Plenum Press, NY (1997). References for thiazine, oxazine and phenazines can be found at J. Daneke et al., *Ann Chem.*, vol 740, p 52 (1970); B. I. Stepanov, Izv. Vyssh. Zaved. Khim. Khim. Tekhnol., vol 24, p 341 (1989); U.S. Pat. Nos. 4,622,395; 4,670,374, herein incorporated by reference in their entirety; European patent 177,328; U.S. Pat. Nos. 4,478,687; 4,647,525; 4,889,931; 4,889,932, all herein incorporated by reference in their entirety and European patent 339,869

While members of the above classes of dyes can be useful for providing a reactive material to prevent a blue laser from reading encoded data in both HD-DVD and Blu-ray optical media formats, it was found that the use of 2-arylamino-1,4-naphthoquinones were especially useful do to the ease and cost of their synthesis. 2-arylamino-1,4-naphthoquinones with the donor groups confined to the quinoid ring form a class of compounds with a relatively low intensity visible band ($\epsilon \sim 4000$) in the range of 430-500 nm for a single amino-donor or near 550 nm if two amino groups are present. Substituents in the aryl ring have the effect for a typical donor-acceptor chromogen, and the absorption maxima fall in the range of 435-560 nm for electron withdrawing vs donating substituents respectively. The isomeric 4-arylamino-1,2-naphthoquinones may also be used and affords the advantage of greater absorption intensities ($\epsilon = 10,000$). In the case where oxygen (air) is the stimulus for causing the optical media to become unplayable, the reactive colorless leuco-form of these compounds are useful but must be protected from premature air oxidation during the manufacturing process. This can be accomplished by a variety of blocking groups including but not limited to esters, silyl ethers, carbonates, phosphinates, sulfonates, and ethers (see US 2004/0137188 A1 for other leaving groups). The type of blocking group can be chosen to give a specific rate of hydrolysis (de-blocking) in order to give control of the manufacturing process. Examples of synthesized dyes are given in FIGS. 1-3. The de-blocking of the protective group is accomplished with the aid of a variety of basic primary, secondary and tertiary amines including but not limited to imidazole, diisopropylamine, dodecylamine, tripentylamine, tinuvin 292, aminohexanol, aminoethylmorpholine, dihexylamine, diisobutylamine, aminoethylpiperazine, aminoethoxyethanol and dioctylamine. As would be expected, the hydrophilic/hydrophobic character of the adhesive can have a pronounced effect on both the rates of de-blocking and air oxidation of the leuco-form of the dye. Generally, the rates are faster in hydrophilic environments.

In order to evaluate the various novel blocked dyes as well as other parameters involved in their ultimate use, discs were initially prepared that did not contain the reflective layer in order to follow the kinetics of de-blocking and air oxidation using a UV/visible spectrometer (Varian Cary 50 Scan). The general synthetic scheme, (examples 1, 2) used to prepare the various derivatives of 2-(N-methylaminobenzene)-1-4-napthoquinone is given below. This same scheme was used to prepare the unmethylated derivatives by using aniline as the starting material. FIG. 4 represents data from a disc made as directed and then observed in air over a 70 hr period. Initially, there is no absorption in the visible region of the spectrum but after the 70 hr period complete oxidation of the de-blocked, leuco-dye has occurred as evidenced by the peak at 463 nm (the absorption peak of 2-(N-methylaminobenzene)-1-4-napthoquinone). Similar discs which were vacuum sealed in cryovac bags with oxygen scavengers remained colorless during this same time period both at room temperature and at 60° C. indicating that the transformation from a colorless to a colored state is oxygen driven. FIG. 5 indicates that the rate of de-blocking of the protected dyes is dependent on the base used. Thus by regulating the amine used it is possible to design the time frame for the de-blocking reaction. Likewise, if one keeps the base a constant in the adhesive mix and varies the protected dyes used, one observes various rates of oxidation (de-blocking) depending on the dye and protective group (see FIG. 60). Therefore by regulating both the base used and the blocking group used to protect the dye it is possible to provide limited play discs with designed time limits of play.

Example I

Preparation of
2-(N-methylaminobenzene)-1,4-naphthoquinone

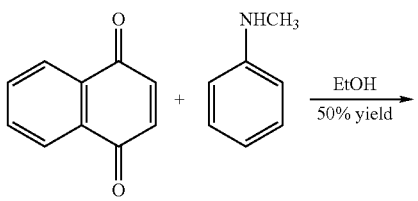

-continued

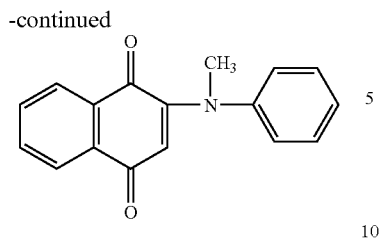

To a 250 ml round-bottomed flask is added 5.00 g (0.032 moles) of 1,4-naphthoquinone (Aldrich Chemicals, Milwaukee, Wis.), and 90 ml of 200 proof, anhydrous ethanol. This mixture is heated to reflux until complete solution occurs at which point the temperature is lowered to 50° C. This solution is stirred using a magnetic stirrer and 4.06 g (0.038 moles) of N-Methylaniline (Aldrich Chemicals, Milwaukee, Wis.) is added. This is stirred for 3 hrs at 50° C. and then the temperature is lowered to 40° C. for several hours and allowed to cool to room temperature overnight. A precipitate forms. The mixture is reheated to 40° C. for 2 more hours and allowed to cool to room temperature before filtering off 1.0 g of tan solid using a Buchner funnel and #4 filter paper. The filtrate is allowed to stir another 12 hrs at room temperature and then filtered to yield 2.45 g of orange crystals. The filtrate is concentrated down using a rotary evaporator to ~30 ml and let stand overnight. An additional 1.65 g of product is isolated for a total of 4.15 g (50% total yield). The dye can be recrystallized from methanol or ethanol and has an absorption max. in MeOH of 463 nm.

Example 2

Preparation of Chloroacetylated Dye 4-60

Step I

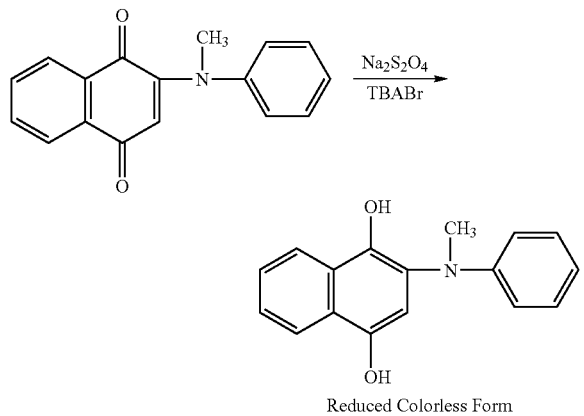

-continued

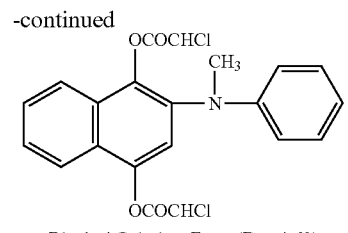

Blocked Colorless Form (Dye 4-60)

To a 100 ml addition funnel is added 50 ml of methylene chloride, 0.50 g (0.002 moles) of 2-(N-methylaminobenzene)-1,4-naphthoquinone, 50 ml of water, 0.30 g (0.001 moles) of tetrabutylammonium bromide (TBABr) and 0.75 g (0.004 moles) of sodium hydrosulfite (Aldrich Chemicals, Milwaukee, Wis.). This mixture is gently shaken until the methylene chloride layer changes color from orange to light yellow (the reduced naphthoquinone). The addition funnel is then placed on top of a medium fritted funnel containing 5 g of sodium sulfate drying agent that is attached to a 100 ml three-necked round-bottom flask containing 30 ml of methylene chloride kept at 5° C. using an ice bath. The entire system is purged with argon while the methylene chloride layer containing leuco-dye is passed from the addition funnel through the sodium sulfate pad into the cold flask. To this cooled solution is added 0.6 ml (0.004 moles) of triethylamine followed by 0.32 ml (0.004 moles) of chloroacetic acid (Aldrich Chemicals, Milwaukee, Wis.). This solution is stirred at 10° C. for 2 hrs and then allowed to warm to room temperature over the next 4 hours. The solution is then evaporated down to near dryness using a rotary evaporator. To this dark residue is added 50 ml of ether causing the formation of a white precipitate (triethyamine-hydrochloride). This is left overnight then filtered. The ether solution is evaporated to dryness on a rotary evaporator and then the residue is dissolved in 20 ml of a 6:4 mixture of methylene chloride/hexanes. This is then added to a 20×250 mm medium pressure chromatography column packed with 5-20µ silica gel which had been pre-wet with the same mixture of solvents. The material is then eluted with 7:3 methylene chloride/hexanes. The fractions containing pure compound are combined and evaporated to yield an oil which crystallizes on standing. The reaction and chromatography are monitored by TLC using silica gel coated plates and eluting with 7:3 methylene chloride/hexanes. This gives a product spot with an Rf=0.7 that turns orange when treated with 1 N sodium hydroxide. 6.1 g of product isolated as above was dissolved in 50 ml of n-butanol at reflux and let cool slowly at room temperature to yield 4.9 g of white crystals (M.P. 101-102° C.)

Example 3

Preparation of Discs Using Dye 4-60

The adhesive used in the manufacture of the discs was composed of:

| Components | Wgt % | Supplier |
| --- | --- | --- |
| CD9038 | 62.87 | Sartomer, West Chester, PA |
| SR494 | 8.30 | Sartomer, West Chester, PA |
| SR440 | 8.30 | Sartomer, West Chester, PA |

-continued

| Components | Wgt % | Supplier |
|---|---|---|
| Lowinox AH25 | 0.21 | Great Lakes Chemical, W. Lafayette, IN |
| Irgacure 819 | 0.83 | Ciba Geigy, Tarrytown, NY |
| 2-Mercaptobenzimidazole | 2.49 | Aldrich Chemicals, Milwaukee, WI |

4.5 g of Dye 4-60 is added to 124.5 g of the above formulation in a dark glass bottle and briefly heated to 60° C. This is then placed in a sonicator (Branson model 2200) in which the water level is above the level of the adhesive mix in the bottle and sonicated for 15 min. Complete solution of dye results. To this solution is added a mixture of 6.0 g of Sn(II) ethylhexanoate (Aldrich Chemicals, Milwaukee, Wis.) in 12.0 g of Tri(propylene)glycol (Aldrich Chemicals, Milwaukee, Wis.). This is sonicated for several minutes after hand shaking to blend. Finally, to this clear solution is added 3.0 g (2%) of powdered imidazole (Aldrich Chemicals, Milwaukee, Wis.) and the mix is sonicated for an additional 15 min.

A DVD clear half disc (an umetallized 0.6 mm thick and 120 mm diameter polycarbonate disc) is centered on a laboratory spin coating turntable. 0.60 ml of the above dye/adhesive mix is applied uniformly in a circular ring by a syringe at about 20 mm from the center of the disc. The disc to be bonded is then placed over the adhesive and the combination spun at roughly 60-200 rpm's until the adhesive covers the entire disc uniformly. At this point, the disc containing the adhesive is photo-cured with a Xenon Cool Cure XL-DVD flash lamp using a 2 sec exposure (10 pulses) set at its maximum setting. The process will yield a clear, fully cured acrylate bonded disc. Some discs were vacuum packed in cryovac bags containing oxygen scavengers in order to evaluate their stability in an inert system (no oxygen).

Compound 1

| R | $R_1$ | |
|---|---|---|
| $COC_6H_5$ | H, $CH_3$ | |
| $COCCl_3$ | H, $CH_3$ | |
| $COCH_3$ | H, $CH_3$ | |
| $COCF_3$ | H, $CH_3$ | |
| $COCH_2Cl$ | H, $CH_3$ | Dye 6-62, Dye 4-60 |
| $COCHCl_2$ | H | |
| $COCH_2OC_6H_5$ | H, $CH_3$ | Dye 4-67, |

Compound 2

| R | $R_1$ |
|---|---|
| $C(CH_3)_3$ | H |
| $C_6H_5$ | H |

Compound 3

| R | $R_1$ |
|---|---|
| $CH_2CCl_3$ | H |
| $(C_6H_5)_2C(CH_3)_3$ | H |
| $(CH_3)_3$ | H, $CH_3$ |
| $(C_3H_7)_3$ | H, $CH_3$ |

Manufacturing

Limited play optical media production involves a number of manufacturing elements. Typical of these elements are (i) premastering and/or authoring, which creates the data to be encoded on each replicated optical media and/or modifies and/or readies the data to be included on each replicated optical media so that the data is ready for glass mastering; (ii) glass mastering, which allows stampers to be created so that each replicated optical media can be moulded; (iii) replication, whereby individual optical media are moulded using stampers created in the glass mastering stage and followed by metallising and/or bonding and/or lacquer coating, in this element is also the inclusion of the read inhibiting reactive agent and/or material; (iv) printing of labels on each optical media; (v) packaging of each optical media into suitable packages; and (vi) quality assurance, which ensures the optical media meets necessary specifications regarding quality and/or playability and/or process controls.

The aforementioned elements need not occur at a single facility or under the control of single entity or single organization. Moreover, additional elements may be added to the process. Further, all the aforementioned elements are not necessary in order to have an operable optical media. For example, but not by way of limitation, it is not necessary that each optical media have a label printed on it. The above outlined elements need not be carried out serially and can be carried out in parallel.

Premastering.

Source data, the data to be encoded on the optical media, is used to create a disc image on a suitable tape or other format. The original master of the source data is copied to a specially prepared master, which is used to produce a master disc prior to replication. Formats include, for example, Digital Linear Tape (hereafter "DLT"), U-matic tape, DVD-R, DVD-RAM/-RW, CD, CD-R, 8 mm Exabyte, and DAT.

DLT is generally used for transferring DVD data for glass mastering.

U-matic tape is used as a digital audio media for mastering.

CD and CD-R discs contain necessary TOC and can be used as the direct input for CD audio and CD-ROM mastering.

DVD-R discs may be used to transfer the finished data for glass mastering for DVD-5 discs or DVD-10. DVD-9s cannot be mastered from DVD-R.

DVD-RAM and DVD-RW discs cannot be used as input media for mastering. However, data files can be copied from a DVD-RAM or DVD-RW and premastered to DLT or DVD-R.

8 mm Exabyte tape is physically identical to 8 mm videotape and can be used for mastering directly. Typically used for audio applications.

DAT may be used to master directly from provided certain parameters are adhered to, such as, certain audio rates are adhered to.

Glass Mastering.

Glass mastering is the process of transferring the premastered data into a stamper that is ready for replication. The glass master begins as a glass substrate. The surface of the substrate is cleaned and then coated with a uniform layer of photo-resist material. For example, in DVD applications the photo-resist layer thickness is 120 microns.

The glass master with the photo-resist is placed on the turntable of a laser beam recorder, where a laser is used to expose the photo-resist. The laser is modulated to expose the photo-resist where pits should be, while the glass master spins at exactly the correct linear velocity and is moved gradually and smoothly to maintain the correct track pitch and linear velocity.

After the laser recording the exposed photo-resist surface is developed to remove the photo-resist exposed by the laser, creating pits in the surface. The pits extend right through the photo-resist to the glass underneath. The glass itself is unaffected by the development process and acts merely as a carrier for the photo-resist. After the exposed photo-resist is removed the entire surface is metallised by sputtering a metal layer over the surface. Examples of metal used to sputter coat the surface include nickel and silver.

The metallized glass master is electroplated with a metal, typically nickel or silver, in a clean room environment to create a father stamper. This stamper can be used as the stamper for pressing finished discs; however, to protect the integrity of the data on the master additional steps are taken to create children stampers. The father stamper is used to create a mother stamper through the process of electroforming. Son stampers are created from the mother stamper, again through the process of electroforming. The son stampers are then used in the moulding in the replication of optical media. However, it is not always the case that son stampers will be used for replication and as will be further described in the below section.

Replication.

The finished stamper is fitted to a moulding machine ready to start moulding the optical media substrates. For example, one stamper is needed for CDs and one or two for DVDs. Optical media are made by first moulding the substrate and then metallising and/or otherwise coating at least one substrate surface with a reflective material. The metallising and/or reflective coating step can then be followed with lacquering and/or bonding.

Moisture is first removed from optical grade polycarbonate. The moisture free polycarbonate is injection moulded in a high pressure moulding machine, also known as a press, using the son stamper mounted in the mould fixed to the press. This mould is in two parts and provides a cavity, which ensures that perfectly moulded discs are produced with the correct dimension every time. One half of the mould contains the stamper (to form the pits) while the other half contains the mirror block to ensure a smooth surface.

The hydraulic press applies to a force to the two halves of the mould, which are closed. Molten polycarbonate is then injected into the cavity and held in place by the applied pressure while the disc cools and solidifies. During cooling the center hole is punched. After cooling, the press opens and the pressed disc is transferred to a conveyor to allow the disc to cool before the next stage. In the case of CDs, only one pressing is needed. In the case of DVDs, two pressings are needed and each half disc is half as thick as the single pressing of a CD.

The polycarbonate discs after moulding are transparent (or transparent at least to the intended reading beam of optical reading device the discs are intended for). In certain limited play optical media applications at least one of the polycarbonate disc halves is colored. The colorization of at least one polycarbonate disc half prevents photobleaching when the read inhibiting reactive agent and/or material is a photochromic dye. Further, the color of at least one polycarbonate disc half also can prevent a disc playing in a next generation optical media reading device that operates at a different laser wavelength. However, the color of the at least one polycarbonate disc half is selected so that the wavelength of the intended reading beam will not be interfered with so that the encoded information can be read until the read inhibiting agent and/or material is activated.

At least one polycarbonate disc half of the optical media is covered by a mirror surface to reflect laser light from a laser beam of an optical media reading device. The mirror surface allows the pits and/or other data features to be read by the laser light of an optical media reading device. Examples of mirror surfaces include, but not by way of limitation, aluminum and silver. For example, silver is coated on at least one polycarbonate surface by sputtering.

For single substrate optical media a protective coating is provided to protect the reflective layer from corrosive elements. For example, CDs typically use aluminum as the reflective layer. This layer in CDs is protected by a lacquer, which is spread as a liquid evenly across the surface of the disc by spin coating. The centrifugal force created by spinning the disc ensures that the lacquer covers the whole disc in an even layer. It is important that the lacquer overlap the aluminum thus sealing it from the elements. If left exposed the aluminum will start to oxidize within a few days. The lacquer is cured by ultra-violet light, which produces a hard protective surface. Similar methods can be employed with Blu-Ray discs.

For dual substrate optical media the two substrates are bonded together through the use of adhesives or other bonding agents. A number of bonding solutions are available and include, for example and not by way of limitation, hot melt bonding, radical UV cured bonding which involves a UV cured resin similar to normal lacquer, cationic UV bonding which involves screen printing the resin over both substrates and curing each with UV light and then pushing the discs together.

In one embodiment of the present invention, and as further described in U.S. Patent Application Nos. 20030152019, 20030123379, 20030123302, 20030213710, 20030129408, and 20030112737 and as hereinafter incorporated by reference in their entirety, the read inhibiting agent and/or material is a constituent of the bonding material that bonds the two polycarbonate halves together. In this embodiment, the bonding adhesive is composed of at least two components that are combined in a predefined manner and under specified conditions. The combination activates the components. To allow the combination of the at least two components in-line and during replication an auto dispense system is utilized. The auto dispense system can be a combination of pumps or other shaft driven dispense system that mixes at least two components in predefined amounts and dispenses the combined product through a static mixing tube. For example, the dispense system can be composed of a dispense pump for each component where each component dispense pump controls the volume of each component dispensed to make the adhesive; or a dispense pump that dispenses each component using a single actuator and according to volumetric methods. The auto dispense system also has the ability to purge the static mixing tube and associated lines so that the system remains clean and free from clogs or older material that may contaminate the system.

Variations on the above described replication process exist depending on the type of optical media to be replicated. For example, U.S. Patent Application Nos. 20030152019, 20030123379, 20030123302, 20030213710, 20030129408, and 20030112737, describes an inverted mastering process for manufacturing limited play DVD-5. U.S. Patent Application Nos. 20030152019, 20030123379, 20030123302, 20030213710, 20030129408, and 20030112737 are hereinafter incorporated by reference in their entirety. By way of background, a DVD disc may contain either one or two information layers for each substrate, resulting to different types of disc capacities, such as DVD-5 (single sided, single layer, 4.7 Gbyte capacity), DVD-9 (single sided, dual layer, 8.5 Gbyte capacity), DVD-10 (double sided, single layer, 9.4 Gbyte capacity), DVD-14 (double sided, one side single layer, one side dual layer, 13.2 Gbyte capacity), and DVD-18 (double sided, dual layer, 17 Gbyte capacity).

In one embodiment of the invention, the above process is modified by using the mother stamper to replicate the L1 disc substrate half of a DVD disc.

In a long playing standard DVD-5 information is encoded on the L0 side (the substrate side closest to the reading beam of the optical reading device) with "pits" and "lands" molded on the L0 substrate and metallized with a reflective coating. In this embodiment of the current invention, the mother stamper is used to mold the L1 side. This side is subsequently metallized and bonded with a blank (i.e., no data encoded substrate) L0 substrate. This results in the bonding layer in the optical path. Using the specified layer thickness of 0.055 mm+/−0.015, the thickness of the L0 substrate is targeted at 0.55 mm to 0.57 mm during molding, to yield a focal length of the disc thickness (including the bonding layer) consistent with standard DVD specifications, allowing the player to be in the normal focusing range for reading a L0 layer. Thus the player interprets the disc as a standard single layer DVD-5. Field experience has shown that spacer layer thickness can be maintained at 0.045 about 0.065 mm consistently in production. This controlled variation in production along with the reduced thickness of the molded disc keeps the focus and optics within the specifications set by the DVD licensing authority and the hardware manufacturers.

Labeling.

Optical media printing and finishing options vary, but all optical media can be printed on using similar technology. It is also possible to add serialization or other information to the optical media at this time.

The upper surface of a finished optical media can be printed with up to six colors by a flat silkscreen process or offset printer. Each color requires a different screen created from label films produced as color separations from the artwork. The inks can then be cured using UV light to produce a durable surface.

Serialization.

The burst cutting area is an annular area within the disc hub where a bar code or other identifying information or serialization can be written. The BCA can be written during mastering and will be common for all discs from that master or, more usually, will be written using a YAG laser to cut the barcode into the reflective layer of the finished disc.

In one embodiment of the present invention, serialization is an integral part in ensuring the quality of the limited play optical media manufactured. For example, input values for each raw material used for a production run are input into a data storage system. These input values will then be linked to a unique bar code and/or serial number that will be printed on the optical media. If a problem exists with the optical media the optical media can be traced back to its input values and run conditions to determine the source of problem. In this embodiment input values include, but are not limited to, information on (i) polycarbonate that is used to create the substrate including born on date, manufacturer lot number, standard material properties, material identification, and oxygen diffusion rates, room temperature and humidity storage, bar code information; (ii) packaging web material used to package the optical media and allow for a predefined shelf life including born on date, manufacturer lot number, material identification, certificate of conformance, storage and shipping conditions since manufacturing, room temperature and humidity storage conditions and bar code information; (iii) adhesive part A including bar code information, born on date, manufacture lot number, material identification, certificate of conformance, storage and shipping conditions since manufacturing, room temperature and humidity storage conditions and bar code information; information on visual inspection of container seals; (iv) adhesive part B including bar code information, born on date, manufacture lot number, material identification, certificate of conformance, storage and shipping conditions since manufacturing, room temperature and humidity storage conditions, and bar code information, information on visual inspection of container seals and ampule color, ampule spectral reference, measurement of absorbance spectrum, low temperature storage, dark storage conditions; (v) adhesive part C information including bar code label information, born on date, material identification, manufacture lot number, certificate of conformance, raw material references, visual inspection of container seals, room temperature and humidity storage conditions; (vi) purge material information including bar code information, born on date, certificate of conformance; (vii) reflective sputter target material information including bar code information, certificate of conformance, In addition, information relating to the internal tracking of the input materials once on site is cataloged. This information includes, for example and not by way of limitation, (i) polycarbonate material is scanned prior to loading dryer; (ii) packaging material is scanned and cataloged before loading onto packaging machine, room temperature and storage conditions are recorded; (iii) the adhesive is inspected and scanned before longing in auto dispense system and thus the replication machine information collected includes identification of part A and validation of shelf life, identification of part B and validation of shelf life including quality control absorbance spectrum taken a predetermined time prior to loading on replication machine, internal mixing system absorbance measurement, identification of part C and validation of shelf life, identification of purge material and validation of shelf life; (iv) reflective sputter target material is identified and validated prior to loading on replication machine.

Under this embodiment of the present invention, each replicated optical media is serialized with a unique identification number prior to in-line finished optical media scanning. The serialization forms an identifier to which the above inputs are traceable and for which the following manufacturing process variables are identified with the produced optical media.

These manufacturing process variables include, for example, (i) molding information, which includes lot indicator of polycarbonate source, actual process values, process set points, and substrate correlation reference information; (ii) replication information, which includes lot indicators for adhesive part A, part B, and part C, purge material, and sputter target material, process information such as actual process values (i.e., TCS and conveyor temperatures), process set points, finished optical media correlation reference; (iii) optical media inspection parameters and test results, such as, standard DVD-5 inspection parameters, optical layer thickness, reduced deviation, flow lines, particulates, manufacturing date and time stamp; (iv) packaging information, including lot indicators for both top and bottom web materials, process information from packaging machine, including date and time stamp, actual process values (i.e., forming temperature and sealing times); process set points and UV irradiator status.

Packaging.

Optical media can be machine packed in a number of different packages. Some examples include: jewel case, slimline case, amaray case, super jewel box plus, super jewel box king, card wallets, and card sleeves. Packaging may also include sealed materials enclosing the disc and enabling a controlled environment as described in U.S. Patent Application, Publication No. 2003/0213710, hereafter incorporated by reference in its entirety. The process parameters under which a limited play optical disc is package can influence the overall performance of the limited play optical disc. Process parameters, such as for example residual oxygen content, activation levels of scavenging materials included in the package, are recorded and stored to control batch quality. This information is part of the raw material input that is logged and linked to the disc through serialization.

Quality Assurance.

Quality assurance ensures that the optical media manufactured meets manufacturing specifications and allows monitoring of the processes involved in the manufacture of optical media and as such relates to all the above outlined elements. Quality assurance is done at the mastering stage to ensure that stampers with good pit geometry are created. Typical stampers are played on a disc stamper player. The first disc to be pressed is verified against the source to ensure that it has been mastered without errors. The pit geometry of the glass master can be inspected using a suitable high power microscope.

Optical media are inspected and tested against a set of predefined criteria. For example, DVD optical media inspection and measurements include measurement of tilt and bonding layer thickness. Test measurements include, for example, reflectivity, asymmetry checks, I3 signal readings, I14 signal readings, push pull readings, cross talk readings, jitter measurements, birefringence measurements, radial noise measurements, eccentricity, track pitch, scan velocity, begin of lead-in (hereafter "BLI") measurements, begin of program area (hereafter "BPL"), begin of lead-out (hereafter "BLO") measurements, radial and tangential tilt tolerances are recorded.

The above measured parameters can change with time and environmental conditions. Thus, part of the quality assurance includes measurements over time and across different testing environments. Such test involve, for example, placing sample discs in an oven at a specified temperature and humidity for a predefined period of time and then testing and measuring the sample discs again.

The foregoing disclosure is not limited the particular embodiments disclosed. The methods and system outlined above are not limited or required to be preformed in order and can be preformed in parallel and/or in a different order than that disclosed. The present invention relates to any method of tracking process and material inputs and linking those inputs to a manufactured limited play optical medium.

Accordingly, the present invention has been described at some degree of particularity directed to the exemplary embodiments of the present invention. It should be appreciated, though, that the present invention is defined by the following claims constructed in light of the prior art so that modifications or changes may be made to the exemplary embodiments of the present invention without departing from the inventive concepts contained herein.

What is claimed is:

1. An optical medium readable by at least one pre-selected optical beam comprising:
   a first substrate;
   a first data storage layer proximate to said first substrate, wherein said first data storage layer comprises an encoded information receiving layer and a reflective layer;
   a second data storage layer, wherein said second data storage layer comprises an encoded information receiving layer and a reflective layer;
   at least one intervening layer between said first data storage layer and said second data storage layer; and
   a read inhibiting agent, said read inhibiting agent in communication with at least one of said first data storage layer and second data storage layer, wherein said read inhibiting agent permits access to at least a portion of said at least one of said first data storage layer and second data storage layer for a predefined period of time and after such predefined period of time said read inhibiting agent irreversibly prohibits access to said at least a portion of said at least one of said first data storage layer and second data storage layer;
   wherein said first data storage layer and said second data storage layer are readable with different optical wavelengths.

2. The optical medium according to claim 1, wherein said at least one of said first data storage layer and second data storage layer comprises instructions that direct where said at least one pre-selected optical beam is located in relation to said first data storage layer or second data storage layer, the order of regions read, and the length of time the pre-selected beam remains located in a particular region.

3. The optical medium according to claim 2, wherein said instructions are encoded on the optical medium during the authoring of said first data storage layer and/or second data storage layer of the optical medium.

4. The optical medium according to claim 3, wherein said instructions direct the pre-selected optical beam to read regions of said optical medium where said first read inhibiting agent is located.

5. The optical medium according to claim 1, wherein at least one of said first data storage layer or second data storage layer is recordable.

6. The optical medium according to claim 5, wherein at least one of said first data storage layer and second data storage layer is not recordable.

7. The optical medium according to claim 1, wherein one of said first data storage layer or second data storage layer is not affected by the read inhibiting agent and is readable beyond the predefined period of time set by the read inhibiting agent.

8. The optical medium according to claim 1, further comprising a third data storage layer readable by the same preselected optical beam as said first data storage layer and intermediate between said first data storage layer and said second data storage layer.

9. The optical medium according to claim 8, wherein at least one of said first data storage layer, second data storage layer, and third data storage layer is a recordable layer.

10. The optical medium according to claim 8, further comprising a fourth data storage layer readable by the same pre-selected optical beam as said second data storage layer and intermediate between said third data storage layer and said second data storage layer.

11. The optical medium according to claim 10, wherein at least one of said first data storage layer, second data storage layer, third data storage layer, and fourth data storage layer is a recordable layer.

12. The optical medium according to claim 1, further comprising a second substrate, said second substrate adjacent to said second data storage layer.

13. The optical medium according to claim 12, wherein said second substrate comprises an incident surface and a non-incident surface and said first substrate comprises an incident surface and a non-incident surface.

14. The optical medium according to claim 13, wherein the first data storage layer is read by at least one pre-selected optical beam through the incident surface of the first substrate.

15. The optical medium according to claim 13, wherein the second data storage layer is read by said at least on pre-selected optical beam through the incident surface of the second substrate.

16. The optical medium according to claim 12, wherein the second data storage layer is read by said at least one pre-selected optical beam through the incident surface of the second substrate.

17. The optical medium according to claim 1, wherein the first data storage layer is a recordable layer.

18. The optical medium according to claim 1, further comprising a bonding layer between said first data storage layer and said second data storage layer.

19. The optical medium according to claim 18, wherein said read inhibiting agent is located in the bonding layer.

20. The optical medium according to claim 1, wherein said first data storage layer is a selected from one of the following optical medium formats Read Only Memory (ROM), Write Once, Read Many (WORM), Interactive (I), Erasable (E), CD-ROM, CD-WORM, CD-I, DVI, CD-EMO, OD3, ODD, Video Disk, IVD, Blu-ray, HD-DVD, DVD, DVD-R, DVD-Video, DVD-RAM, DVD-Audio, DVD-RAM, DVD-RW, DVD+RW, DVD+R, DVD-Video, SACD, holographic, and holographic versatile disc.

21. The optical medium according to claim 20, wherein said second data storage layer is selected from one of the following optical medium formats Read Only Memory (ROM), Write Once, Read Many (WORM), Interactive (I), Erasable (E), CD-ROM, CD-WORM, CD-I, DVI, CD-EMO, OD3, ODD, Video Disk, IVD, Blu-ray, HD-DVD, DVD, DVD-R, DVD-Video, DVD-RAM, DVD-Audio, DVD-RAM, DVD-RW, DVD+RW, DVD+R, DVD-Video, SACD, holographic, and holographic versatile disc.

* * * * *